US008903934B2

(12) United States Patent
Konno et al.

(10) Patent No.: US 8,903,934 B2
(45) Date of Patent: Dec. 2, 2014

(54) DATA EXCHANGE IN AN INFORMATION PROCESSING SYSTEM

(75) Inventors: Hideki Konno, Kyoto (JP); Tooru Ooe, Kyoto (JP); Masahiro Shoji, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 13/251,204

(22) Filed: Oct. 1, 2011

(65) Prior Publication Data

US 2012/0054297 A1    Mar. 1, 2012

Related U.S. Application Data

(63) Continuation of application No. 12/816,672, filed on Jun. 16, 2010.

(30) Foreign Application Priority Data

Jun. 19, 2009    (JP) .................................. 2009-146449

(51) Int. Cl.
G06F 15/167    (2006.01)
G06F 19/00    (2011.01)

(52) U.S. Cl.
USPC ........... 709/212; 709/213; 709/216; 709/217; 709/218; 463/42; 463/43

(58) Field of Classification Search
USPC ........... 709/212, 213, 216, 217, 218; 463/42, 463/43
See application file for complete search history.

(56) References Cited

U.S. PATENT DOCUMENTS

| 5,396,225 A | 3/1995 | Okada et al. |
| 5,618,045 A | 4/1997 | Kagan et al. |
| 5,666,293 A | 9/1997 | Metz et al. |
| 5,732,275 A | 3/1998 | Kullick et al. |
| 6,438,573 B1 | 8/2002 | Nilsen |

(Continued)

FOREIGN PATENT DOCUMENTS

| EP | 1 493 474 | 1/2005 |
| EP | 1 513 066 | 3/2005 |

(Continued)

OTHER PUBLICATIONS

Office Action for Japanese Patent Appln. No. 146449/2009, mailed Jan. 11, 2011.

(Continued)

*Primary Examiner* — Rupal Dharia
*Assistant Examiner* — Van Kim T Nguyen
(74) *Attorney, Agent, or Firm* — Nixon & Vanderhye, P.C.

(57) ABSTRACT

An example portable information processing apparatus is configured to selectively execute one or more application programs and includes a memory storing first data associated with an application program executed by the information processing apparatus. A communication unit is configured for wireless communication and a data transmission/reception control unit is configured to transmit the first data for use by an application program which is executed by another information processing apparatus and with which the first data is associated and/or to receive second data, originating from another information processing apparatus, for use by an application program which is executed by the information processing apparatus and with which the second data is associated. The first data is transmitted and/or the second data is received regardless of an execution state on the information processing apparatus of any application program with which the first and second data are associated.

26 Claims, 32 Drawing Sheets

(56) References Cited

U.S. PATENT DOCUMENTS

| | | | |
|---|---|---|---|
| 6,733,382 | B2 | 5/2004 | Oe et al. |
| 6,736,727 | B1 | 5/2004 | Doi et al. |
| 7,054,831 | B2 | 5/2006 | Koenig |
| 7,114,090 | B2 | 9/2006 | Kardach et al. |
| 7,290,072 | B2 | 10/2007 | Quraishi et al. |
| 7,346,708 | B2 | 3/2008 | Minamisawa |
| 7,457,410 | B2 | 11/2008 | Yamauchi et al. |
| 7,493,613 | B2 | 2/2009 | D'Souza et al. |
| 7,565,653 | B2 | 7/2009 | Inoue et al. |
| 7,620,027 | B2 | 11/2009 | Igarashi et al. |
| 7,704,147 | B2 | 4/2010 | Quraishi et al. |
| 7,725,078 | B2 | 5/2010 | Kuwahara et al. |
| 7,729,661 | B2 | 6/2010 | Tanaka et al. |
| 7,794,328 | B2 | 9/2010 | Horigome |
| 7,801,818 | B2 | 9/2010 | Tsukazaki et al. |
| 7,811,171 | B2 | 10/2010 | Mitsuyoshi et al. |
| 7,813,300 | B2 | 10/2010 | Takayama et al. |
| 7,819,750 | B2 | 10/2010 | Lam et al. |
| 7,854,657 | B2 | 12/2010 | Shiraiwa |
| 7,862,433 | B2 | 1/2011 | Sato et al. |
| 7,901,293 | B2 | 3/2011 | Oe |
| 7,929,911 | B2 | 4/2011 | Tanaka et al. |
| 7,934,995 | B2 | 5/2011 | Suzuki |
| 8,052,528 | B2 | 11/2011 | Shiraiwa et al. |
| 8,075,405 | B2 | 12/2011 | Sasaki et al. |
| 8,078,160 | B2 * | 12/2011 | Quinn ............................ 455/425 |
| 8,185,165 | B2 | 5/2012 | Beninghaus et al. |
| 8,229,962 | B1 | 7/2012 | Cavalancia, II |
| 8,261,258 | B1 | 9/2012 | Jianu et al. |
| 8,433,375 | B2 | 4/2013 | Yamazaki et al. |
| 8,505,008 | B2 | 8/2013 | Yamazaki et al. |
| 2001/0003714 | A1 | 6/2001 | Takata et al. |
| 2001/0048744 | A1 | 12/2001 | Kimura |
| 2002/0016166 | A1 | 2/2002 | Uchida et al. |
| 2002/0065137 | A1 | 5/2002 | Tonomura |
| 2002/0083160 | A1 | 6/2002 | Middleton |
| 2003/0033413 | A1 | 2/2003 | Willson, Jr. et al. |
| 2003/0038731 | A1 | 2/2003 | Sako et al. |
| 2003/0126218 | A1 | 7/2003 | Sakonsaku |
| 2004/0082383 | A1 | 4/2004 | Muncaster et al. |
| 2004/0122931 | A1 | 6/2004 | Rowland et al. |
| 2004/0127288 | A1 | 7/2004 | Furuhashi et al. |
| 2004/0151126 | A1 | 8/2004 | Matsubara |
| 2004/0224769 | A1 | 11/2004 | Hansen et al. |
| 2004/0259642 | A1 * | 12/2004 | Tanaka et al. ................... 463/42 |
| 2005/0070327 | A1 | 3/2005 | Watanabe |
| 2005/0073764 | A1 | 4/2005 | Ogawa et al. |
| 2005/0282639 | A1 | 12/2005 | Tanaka et al. |
| 2006/0068702 | A1 | 3/2006 | Miwa et al. |
| 2006/0106963 | A1 | 5/2006 | Sasaki et al. |
| 2006/0166739 | A1 | 7/2006 | Lin |
| 2006/0168574 | A1 | 7/2006 | Giannini et al. |
| 2006/0234631 | A1 | 10/2006 | Dieguez |
| 2006/0247059 | A1 | 11/2006 | Nogami et al. |
| 2006/0282518 | A1 | 12/2006 | Karaoguz et al. |
| 2006/0282834 | A1 | 12/2006 | Cheng et al. |
| 2007/0078004 | A1 | 4/2007 | Suzuki et al. |
| 2007/0105623 | A1 | 5/2007 | Tanaka et al. |
| 2007/0118587 | A1 | 5/2007 | Ishikawa et al. |
| 2007/0121534 | A1 | 5/2007 | James et al. |
| 2007/0123168 | A1 | 5/2007 | Takehara et al. |
| 2007/0136817 | A1 | 6/2007 | Nguyen |
| 2007/0149183 | A1 | 6/2007 | Dunko et al. |
| 2007/0174471 | A1 | 7/2007 | Van Rossum |
| 2007/0203969 | A1 * | 8/2007 | Wakasa et al. ................ 709/200 |
| 2007/0204279 | A1 | 8/2007 | Warshavsky et al. |
| 2007/0213975 | A1 | 9/2007 | Shimoda et al. |
| 2007/0232310 | A1 | 10/2007 | Schiff et al. |
| 2008/0119281 | A1 | 5/2008 | Hirose et al. |
| 2008/0123582 | A1 | 5/2008 | Maekawa |
| 2008/0139310 | A1 | 6/2008 | Kando et al. |
| 2008/0209071 | A1 | 8/2008 | Kubota |
| 2009/0037526 | A1 | 2/2009 | Elliott et al. |
| 2009/0058639 | A1 * | 3/2009 | Tanaka et al. ............ 340/539.22 |
| 2009/0061870 | A1 | 3/2009 | Finkelstein et al. |
| 2009/0093310 | A1 | 4/2009 | Tanaka et al. |
| 2009/0124393 | A1 | 5/2009 | Tanaka et al. |
| 2009/0137321 | A1 | 5/2009 | Katsume et al. |
| 2009/0143140 | A1 | 6/2009 | Kitahara |
| 2009/0158430 | A1 | 6/2009 | Borders |
| 2009/0186603 | A1 | 7/2009 | Usami et al. |
| 2009/0193365 | A1 | 7/2009 | Sugiura |
| 2009/0217307 | A1 | 8/2009 | Ooe |
| 2009/0253518 | A1 | 10/2009 | Sasaki et al. |
| 2009/0310594 | A1 | 12/2009 | Nakata et al. |
| 2010/0111057 | A1 | 5/2010 | Nakamura et al. |
| 2010/0130254 | A1 * | 5/2010 | Kamada et al. ................ 455/558 |
| 2010/0167697 | A1 | 7/2010 | Ishikawa et al. |
| 2010/0312817 | A1 | 12/2010 | Steakley |
| 2010/0325235 | A1 | 12/2010 | Konno et al. |
| 2011/0045910 | A1 * | 2/2011 | McKenna et al. ................ 463/42 |
| 2011/0060825 | A1 | 3/2011 | Ooe et al. |
| 2011/0070950 | A1 | 3/2011 | Tanaka et al. |
| 2011/0143840 | A1 | 6/2011 | Sotoike et al. |
| 2011/0176455 | A1 | 7/2011 | Matsunada |
| 2011/0205953 | A1 | 8/2011 | Kuwahara et al. |
| 2011/0231559 | A1 | 9/2011 | Yamaguchi |
| 2011/0292033 | A1 | 12/2011 | Umezu et al. |
| 2011/0295709 | A1 | 12/2011 | Kubo et al. |
| 2011/0306294 | A1 | 12/2011 | Yamazaki et al. |
| 2011/0307554 | A1 | 12/2011 | Konno et al. |
| 2011/0307884 | A1 | 12/2011 | Wabe |
| 2011/0307892 | A1 | 12/2011 | Yamazaki et al. |
| 2012/0010000 | A1 | 1/2012 | Masuda et al. |
| 2012/0011256 | A1 | 1/2012 | Masuda et al. |
| 2012/0021703 | A1 | 1/2012 | Yamazaki et al. |
| 2012/0071242 | A1 | 3/2012 | Fujiwara et al. |

FOREIGN PATENT DOCUMENTS

| | | |
|---|---|---|
| EP | 1 810 732 | 7/2007 |
| EP | 1 872 838 | 1/2008 |
| EP | 2 135 650 | 12/2009 |
| JP | 11-207031 | 8/1999 |
| JP | 2000-167233 | 6/2000 |
| JP | 2000-181822 | 6/2000 |
| JP | 2000-249569 | 9/2000 |
| JP | 2001-231067 | 5/2001 |
| JP | 2001-175556 | 6/2001 |
| JP | 2002-027552 | 1/2002 |
| JP | 2002-102530 | 4/2002 |
| JP | 2002-159739 | 6/2002 |
| JP | 2002-253866 | 9/2002 |
| JP | 2003-023661 | 1/2003 |
| JP | 2003-050771 | 2/2003 |
| JP | 2003-196217 | 7/2003 |
| JP | 2004-057515 | 2/2004 |
| JP | 2004-329948 | 11/2004 |
| JP | 2004-348203 | 12/2004 |
| JP | 2005-028103 | 2/2005 |
| JP | 2005-242399 | 9/2005 |
| JP | 2005-266160 | 9/2005 |
| JP | 2006-005630 | 1/2006 |
| JP | 2006-101474 | 4/2006 |
| JP | 2006-228113 | 8/2006 |
| JP | 2007-088900 | 4/2007 |
| JP | 2007-125185 | 5/2007 |
| JP | 2007-142613 | 6/2007 |
| JP | 2007-330642 | 12/2007 |
| JP | 2008-113259 | 5/2008 |
| JP | 2008-125659 | 6/2008 |
| JP | 2008-136737 | 6/2008 |
| JP | 2008-142181 | 6/2008 |
| JP | 2008-153905 | 7/2008 |
| JP | 2008-160303 | 7/2008 |
| JP | 2008-206800 | 9/2008 |
| JP | 2009-026178 | 2/2009 |
| JP | 2009-065306 | 3/2009 |
| JP | 2009-147828 | 7/2009 |
| JP | 2010-022704 | 2/2010 |
| JP | 2010-028171 | 2/2010 |
| WO | 2005/111815 | 11/2005 |
| WO | 2009/048473 | 4/2009 |
| WO | 2010/010645 | 1/2010 |

(56) References Cited

FOREIGN PATENT DOCUMENTS

OTHER PUBLICATIONS

Konno et al., U.S. Appl. No. 12/816,672, filed Jun. 16, 2010.
Ooe et al., U.S. Appl. No. 12/871,243, filed Aug. 30, 2010.
Kubo et al., U.S. Appl. No. 12/940,426, filed Nov. 5, 2010.
Yamazaki et al., U.S. Appl. No. 12/948,050, filed Nov. 17, 2010.
Yamazxaki et al., U.S. Appl. No. 12/948,371, filed Nov. 17, 2010.
Fujiwara et al., U.S. Appl. No. 12/969,855, filed Dec. 16, 2010.
Wabe et al., U.S. Appl. No. 13/027,723, filed Feb. 15, 2011.
Konno et al., U.S. Appl. No. 13/101,811, filed May 5, 2011.
Fujiwara et al., U.S. Appl. No. 13/111,033, filed May 19, 2011.
Konno et al., U.S. Appl. No. 13/251,204, filed Oct. 1, 2011.
Yamazaki et al., U.S. Appl. No. 13/251,205, filed Oct. 1, 2011.
Miki, "Oideyo Doubutsu No Mori Kanpeki Guidebook", First Edition, Enterbrain, Inc., Hamamura Kouichi, Jan. 9, 2006 (partial English-language translation), 6 pages.
Dragon Quest Monsters Joker 2, Weekly Famitsu, Enterbrain, Inc., Apr. 22, 2010, vol. 25, No. 18, Serial No. 1116, pp. 115-119, with a partial English translation, 8 pages.
Dragon Quest Monsters Joker 2, Nintendo Dream, Mainichi Communications, Inc., Jul. 1, 2010, vol. 15, No. 7, Serial No. 195, pp. 52-59, with a partial English translation, 12 pages.
Game Broadway Stage27, Gamaga, Softbank Creative Corp., Jun. 1, 2010, vol. 27, No. 6, Serial No. 475, pp. 36-37, with a partial English translation, 6 pages.
English-language machine translation of JP 11-207031.
English-language machine translation of JP 2006-005630.
English-language machine translation of JP 2006-228113.
English-language machine translation of JP 2007-330642.
English-language machine translation of JP 2008-113259.
English-language machine translation of JP 2008-160303.
English-language machine translation of JP 2009-026178.
English-language machine translation of JP 2002-102530.
Dissidia Final Fantasy Ultimania, Japan, Square Enix Co., Ltd., Feb. 19, 2009, First Edition, p. 502-503 and partial English-language translation thereof.
Decision to Grant Patent in JP 2009-146449 dated Nov. 15, 2011 and English-language translation thereof.
Bhupender Virk, "Development of Low Power Consumption Wireless IC for Realization of Sensor Network with Wireless LAN."
*Nikkei Electronics*, vol. 997, Feb. 9, 2009, pp. 87-94, published by Nikkei Business Publications, Inc., and partial English-language translation.
English-language machine translation of JP 2007-125185.
Konno et al., U.S. Appl. No. 12/816,672, filed Jun. 16, 2010—non-final office action mailed Sep. 12, 2013.
Ooe et al., U.S. Appl. No. 12/871,243, filed Aug. 30, 2010—RCE filed Nov. 29, 2013.
Kubo et al., U.S. Appl. No. 12/940,426, filed Nov. 5, 2010—allowed.
Fujiwara et al., U.S. Appl. No. 12/969,855, filed Dec. 16, 2010—awaiting USPTO action.
Wabe et al., U.S. Appl. No. 13/027,723, filed Feb. 15, 2011—non-final office action mailed Dec. 9, 2013.
Konno et al., U.S. Appl. No. 13/101,811, filed May 5, 2011—final office action mailed Sep. 18, 2013.
Fujiwara et al., U.S. Appl. No. 13/111,033, filed May 19, 2011—awaiting USPTO action.
Yamazaki et al., U.S. Appl. No. 13/251,205, filed Oct. 1, 2011—non-final office action mailed Sep. 12, 2013.
Ooe et al., U.S. Appl. No. 12/871,243, filed Aug. 30, 2010—allowed.
Kubo et al., U.S. Appl. No. 12/940,426, filed Nov. 5, 2010—RCE filed Jul. 22, 2013.
Wabe et al., U.S. Appl. No. 13/027,723, filed Feb. 15, 2011—RCE filed Oct. 21, 2013.
English-language machine translation of JP 2000-167233.
English-language machine translation of JP 2010-022704.
U.S. Appl. No. 12/816,672.
U.S. Appl. No. 12/871,243.
U.S. Appl. No. 12/940,426.
U.S. Appl. No. 12/948,080.
U.S. Appl. No. 12/948,371.
U.S. Appl. No. 12/969,855.
U.S. Appl. No. 13/027,723.
U.S. Appl. No. 13/111,033.
U.S. Appl. No. 13/251,205, non-final office action dated Mar. 22, 2012.
Saeki, K., "Apparent and Substantial Improvement in Function! Report on Nintendo DSi Giving Impression of Development," Impress Watch Corporation, GAME Watch, uploaded on Nov. 1, 2008 [retrieved Feb. 4, 2014]; http://game.watch.impress.co.jp/docs/20081101/dsil.htm with partial English-language translation thereof.
English-language machine translation of http://game.watch.impress.co.jp/docs/20081101/dsil.htm [retrieved Apr. 15, 2014].
Office Action dated Jul. 7, 2014 in U.S. Appl. No. 12/816,672.

* cited by examiner

| APPLICATION ID IDENTIFICATION INFORMATION | APPLICATION ID [0] LENGTH INFORMATION | APPLICATION ID [0] |

Da1# spans all three; De1, Db1, Dc1 label the columns.

(B)

| APPLICATION ID IDENTIFICATION INFORMATION | COMPARING METHOD |
| --- | --- |
| 0 | COMPARE APPLICATION IDS OF SAME LENGTH |
| 1 | COMPARE BITS OF PRESCRIBED LENGTH OF APPLICATION IDS OF SAME LENGTH |
| 2 | COMPARE BITS OF APPLICATION IDS OF SAME LENGTH BY A PRESCRIBED METHOD |

(C)

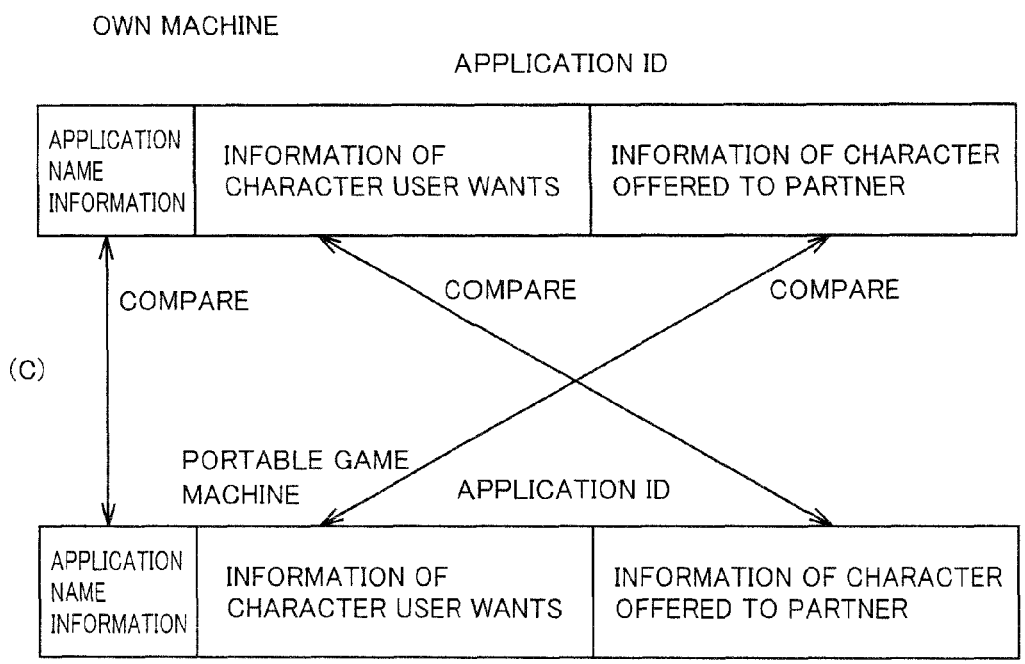

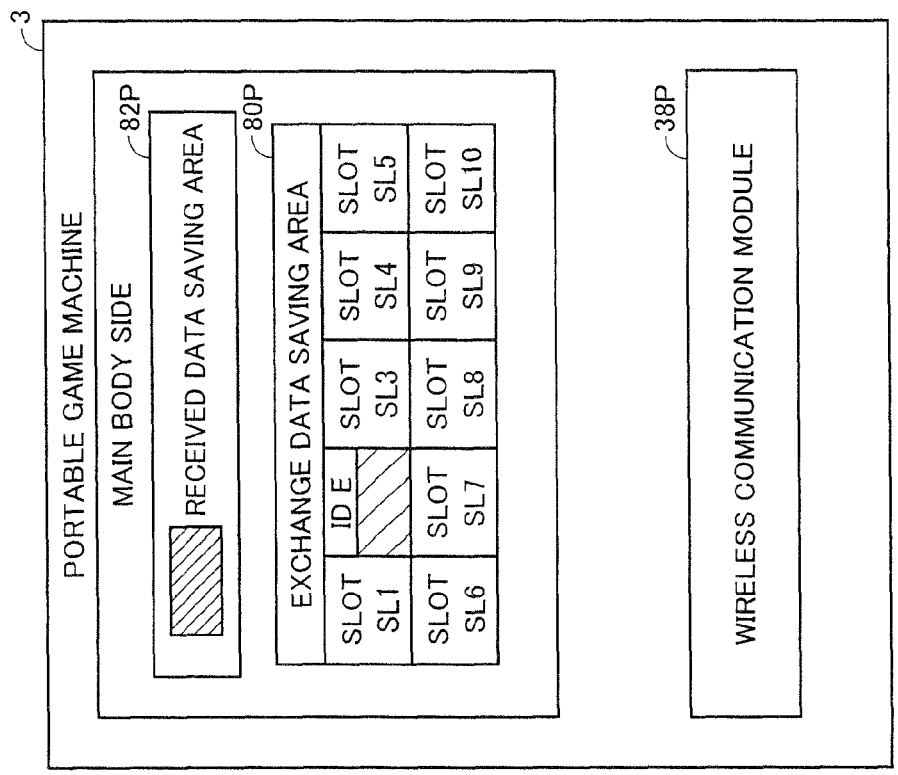
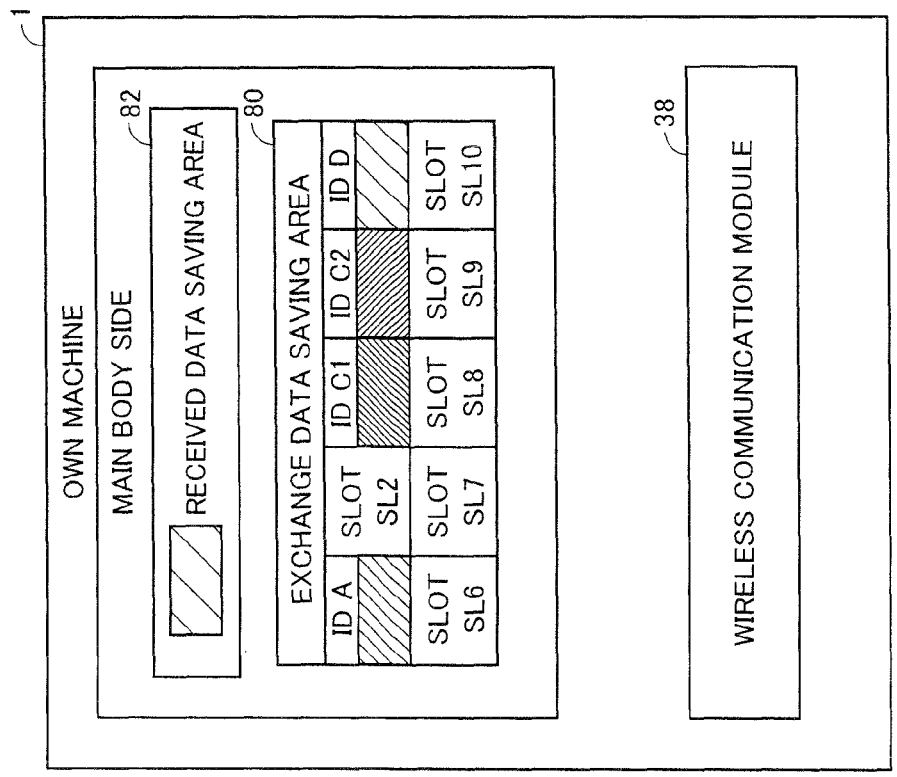
FIG.19

FIG.24
(A) COMMUNICATION PARTNER SEARCH PROCESS (1)
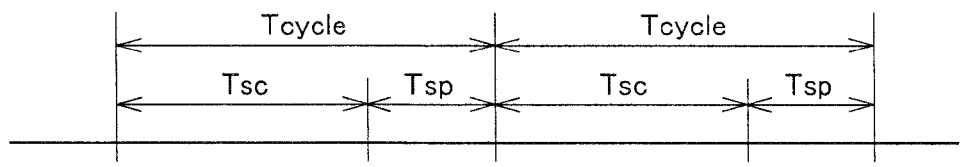
Tcycle : FIXED VALUE, FOR EXAMPLE, 4 sec.
Tsc: RANDOM VALUE BETWEEN 0~Tcycle
Tsp: Tcycle − Tsc
(B) COMMUNICATION PARTNER SEARCH PROCESS (2)
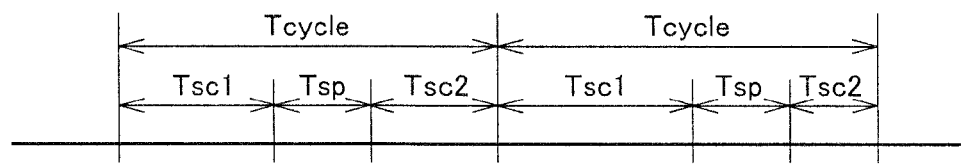
Tcycle : FIXED VALUE, FOR EXAMPLE, 4 sec.
Tsp: FIXED VALUE, FOR EXAMPLE, 96 ms.
Tsc1: RANDOM VALUE BETWEEN 0~(Tcycle − Tsp)
Tsc2: Tcycle − Tsc1 − Tsp

DATA EXCHANGE IN AN INFORMATION PROCESSING SYSTEM

CROSS-REFERENCE TO RELATED APPLICATIONS

This application is a continuation of application Ser. No. 10/816,672, filed Jun. 16, 2010, which claims the priority from Japanese Patent Application No. 2009-146449 filed with the Japan Patent Office on Jun. 19, 2009. The entire contents of each of these applications are hereby incorporated by reference.

BACKGROUND AND SUMMARY

The present invention relates to an information processing system and an information processing apparatus. More specifically, the present invention relates to an information processing system, an information processing apparatus and a method of controlling information processing system, including, for example, a plurality of portable information processing apparatuses capable of wireless communication with each other.

Conventionally, a system has been known that automatically executes communication when information processing apparatuses come close to each other. By way of example, Japanese Patent Laying-Open No. 2005-28103 discloses a system in which exchange conditions are verified by game devices communicating with each other, and when the exchange conditions are met, game data designated for exchange are exchanged between the game devices.

In the system described above, by the exchanging process, the game data designated for exchange can be exchanged only when a game application program (hereinafter also simply referred to as an application or an app) is executed by the portable devices with each other. Such exchange has been impossible between game devices playing different game applications.

The present invention was made to solve such a problem, and its object is to provide an information processing system, an information processing apparatus and a method of controlling information processing system, that can provide, no matter whether an application is being executed or not, data usable by the application to another information processing apparatus.

According to a first aspect, the present invention provides an information processing system including a plurality of application programs and a plurality of portable information processing apparatuses capable of selectively executing the application programs, wherein each of the information processing apparatuses includes a memory storing in a first area data usable by at least one application program among the plurality of application programs, as supply data to another information processing apparatus, a communication unit for wireless communication with another information processing apparatus, and a data transmission/reception control unit, for transmitting the supply data stored in the memory to another information processing apparatus and receiving supply data stored in the said another information processing apparatus, using the communication unit, no matter whether the application program is being executed or not.

According to the first aspect, no matter whether the application program is being executed by the portable game machine as the information processing apparatus, the received supply data stored in the first area of the memory is transmitted to another information processing apparatus, and the supply data stored in the said another information processing apparatus is received, using the communication unit. Specifically, using a wireless communication module 38, communication with another game machine is established, the exchange data stored in a slot SL of an exchange data saving area 80 is transmitted to the said another game machine, and the exchange data from the said another game machine is received, no matter whether the application program is being executed or not. Therefore, it is possible to exchange the exchange data regardless of execution/non-execution of the application program, and the exchange data can be readily exchanged.

Preferably, according to a second aspect, the information processing apparatus stores the received supply data stored in another information processing apparatus usable by at least one application program of the plurality of application programs, received by the data transmission/reception control unit, in a second area of the memory.

According to the second aspect, in the second area of the memory, the received supply data stored in another information processing apparatus, usable by at least one of a plurality of application programs, is stored. Therefore, the exchange data received from another game machine is stored in a received data saving area 82, and the exchange data can be used in a corresponding application held by the own game machine. This adds zest to the application using the exchange data.

Preferably, according to a third aspect, the information processing apparatus further includes a processing unit selectively executing the plurality of application programs. The application program causes the processing unit to execute a process for storing data usable by the application program, in the first area of the memory as supply data.

Preferably, according to a fourth aspect, the supply data is stored in the first area of the memory in a state allowing identification of the application program related to the supply data.

Preferably, according to a fifth aspect, the information processing apparatus further includes a processing unit selectively executing the plurality of application programs. The application program causes the processing unit to execute a process for storing data usable by the application program, in the first area of the memory in a state allowing identification of the application program of its own, as supply data.

According to the third to fifth aspects, the application program causes the processing unit to execute a process for storing the data usable by the application program as supply data, in the memory. Therefore, while an application program is being executed in a game machine, it is possible to store the exchange data in data saving area 80. By way of example, it is possible to store the exchange data in relation to an event of the game, which adds zest to the storage of exchange data.

Preferably, according to a sixth aspect, the information processing apparatus further includes a processing unit selectively executing the plurality of application programs. A first application program of the plurality of application programs causes the processing unit to execute a process for storing data usable by the first application program as a first supply data in a first area of the memory. A second application program of the plurality of application programs causes the processing unit to execute a process for storing data usable by the second application program as a second supply data in the first area of the memory.

According to the sixth aspect, the application program causes the processing unit to execute a process for storing data usable by the first and second application programs, as first and second supply data, in the memory. Therefore, it is possible to have exchange data of a plurality of application programs stored in exchange data saving area 80, which adds zest to the storage of exchange data.

Preferably, according to a seventh aspect, the memory stores the plurality of application programs, and has areas used respectively by the plurality of application programs allocated.

According to the seventh aspect, a plurality of application programs are stored in the memory. Therefore, it is possible to provide storage areas as an internal application saving area and an exchange data saving area, in one saving data memory 34. Since one memory is used in place of separate memories, the layout area for the memory can be reduced.

Preferably, according to an eighth aspect, the information processing apparatus further includes a processing unit selectively executing the plurality of application programs. The application program causes the processing unit to execute a process for storing the supply data based on the application data stored in the memory, in a first area of the memory.

According to the eighth aspect, the application program causes the processing unit to execute the process for storing, in the memory, the supply data based on the application data stored in the memory. Therefore, items, character data and the like obtained by the user in the game as application data can be used as the exchange data, which adds zest to the storage of exchange data.

Preferably, according to a ninth aspect, the information processing apparatus determines, at the time of execution of an application program by the information processing apparatus, whether or not supply data of the corresponding application program has been received, and if it is determined that the supply data of the corresponding application program has been received, reads the received supply data of the corresponding application program.

Preferably, according to a tenth aspect, the information processing apparatus further includes a processing unit selectively executing the plurality of application programs. The application program causes the processing unit to execute a process for determining, at the time of execution of the application program, whether or not supply data of the corresponding application program has been received, and if it is determined that the supply data of the corresponding application program has been received, to execute a process for reading the received supply data of the corresponding application data.

According to the ninth and tenth aspects, when the application program is executed, the information processing apparatus determines whether or not the supply data of the corresponding application program is received, and if it is determined that the supply data of the corresponding application program is received, it reads the supply data of the corresponding application program. Therefore, when the application program is executed, it is possible to determine whether the exchange data usable by the corresponding application program is received in the received data saving area 82, and if received, it is possible to read and use the exchange data. This adds zest to the application program using the exchange data.

Preferably, according to an eleventh aspect, when communication becomes possible with another information processing apparatus, the data transmission/reception control unit executes a process for establishing connection by wireless communication with the said another information processing apparatus.

Preferably, according to a twelfth aspect, a plurality of supply data are stored in a first area of the memory. The data transmission/reception control unit transmits each of the plurality of supply data when connection with another information processing apparatus is established.

According to the eleventh and twelfth aspects, the data transmission/reception control unit transmits each of the plurality of supply data, when connection with another information processing apparatus is established. Therefore, each of the exchange data stored in a plurality of slots SL of exchange data saving area 80 can be transmitted when connection is established. Thus, the exchange data can be collectively exchanged, and hence, exchange of exchange data can readily be executed.

Preferably, according to a thirteenth aspect, based on comparison between attribute information of supply data stored in a first area of the memory and attribute information of supply data stored in a first area of the memory of another information processing apparatus, using the communication unit, the data transmission/reception control unit transmits the supply data stored in the first area of the memory to the said another information processing apparatus and receives the supply data stored in the first area of the memory of the said another information apparatus.

Preferably, according to a fourteenth aspect, identification data for identifying each application program is set for each supply data. Based on comparison between the identification data of supply data stored in a first area of the memory and the identification data of supply data stored in a first area of the memory of another information processing apparatus, if the identification data match, the data transmission/reception control unit transmits the supply data corresponding to the matched identification data stored in the first area of the memory to the said another information processing apparatus, and receives the supply data corresponding to the matched identification data stored in the first area of the memory of the said another information processing apparatus.

According to the thirteenth and fourteenth aspects, based on the comparison between the attribute information (identification data) of the supply data and the attribute data (identification data) of the supply data stored in the first area of the memory of another information processing apparatus, the supply data stored in the first area is transmitted to another information processing apparatus and the supply data stored in the said another information processing apparatus is received. If compared pieces of application identification information related to the exchange data match, it is possible to recognize that the exchange data correspond to the same application. Thus, by exchanging the exchange data corresponding to the same application, it is possible to add zest to the exchange of exchange data.

Preferably, according to a fifteenth aspect, the communication unit executes a comparing process in accordance with a comparing method designated for the identification data of the supply data, among a preset plurality of comparing methods, on the identification data of the supply data stored in the first area of the memory and the identification data of the supply data stored in the first area of the memory of the said another information processing apparatus.

According to the fifteenth aspect, the communication unit executes the comparing process in accordance with the designated method of comparison, among the plurality of preset methods of comparison. Therefore, not only the comparison of entire application identification data but also comparison of only a part of the data becomes possible. As a result, the data exchange process can be done quickly, which adds zest to the exchange of exchange data. Further, it is possible to set the exchange conditions in the application identification data and to compare the exchange conditions to find a match. Thus, more sophisticated exchange processing becomes possible, which adds zest to the exchange of exchange data.

Preferably, according to a sixteenth aspect, the information processing apparatus further includes a wireless module. The wireless module repeatedly searches for another communicable information processing apparatus using the communication unit, and when communication with another information processing apparatus becomes possible, based on comparison between attribute information of supply data stored in a first area of the memory and attribute information of supply data stored in a first area of the memory of the said another information processing apparatus, if the attribute information match, instructs the data transmission/reception control unit to execute data communication to/from the said another information processing apparatus.

According to the sixteenth aspect, the wireless module repeatedly searches for another communicable information processing apparatus and, if communication with another information processing apparatus becomes possible, based on the comparison between the attribute information of the supply data and the attribute information of the supply data of the said another information processing apparatus, if these pieces of information match, it instructs the data transmission/reception control unit to execute data communication. Therefore, wireless communication module 38 searches for a partner of communication, and if the application identification data of exchange data of its own matches the application identification data of exchange data held by the communication partner, it notifies CPU 31 as the main body of the match. Therefore, if the pieces of information do not match, CPU 31 in the sleeping state is not activated, whereby power consumption of the game machine body can be reduced.

Preferably, according to a seventeenth aspect, each of the information processing apparatuses has apparatus identification information set to enable identification of each of the information processing apparatuses. The apparatus identification information of another information processing apparatus with which communication has been done is stored in a third area of the memory. Based on comparison between the apparatus identification information stored in the third area of the memory and the apparatus identification information of another information processing apparatus, using the communication unit, the data transmission/reception control unit does not transmit the supply data stored in the first area to another information processing apparatus that corresponds to the apparatus identification information stored in the third area of the memory.

According to the seventeenth aspect, the information processing apparatus stores the apparatus identification information of another information processing apparatus with which it communicated in the past, and based on the comparison between the stored apparatus identification information and the apparatus identification information of another information processing apparatus with which communication is to be done this time, it refrains from transmitting the supply data to the said another information processing apparatus if it corresponds to the stored apparatus identification information. Specifically, the exchange data is not transmitted to a game machine corresponding to a MAC address included in an MAC address list stored in an MAC address saving area 88. Therefore, the exchange data exchanging process with the same game machine is not repeated a number of times, and efficient exchange of exchange data becomes possible.

Preferably, according to an eighteenth aspect, the apparatus identification information stored in the third area of the memory is erased under prescribed conditions.

Preferably, according to a nineteenth aspect, the apparatus identification information stored in the third area of the memory is erased after a prescribed time period.

According to the eighteenth and nineteenth aspects, the apparatus identification information stored in the third area of the memory is erased after the lapse of a prescribed time period. Therefore, the MAC address stored in MAC address list saving area 88 is reset. Therefore, it is possible to execute data communication with an apparatus with which a communication process has been done in the past. By way of example, even an apparatus with which data exchange has been done in the past may be in a different state after the time period (new exchange data may be set), and hence, it may be possible to transmit/receive exchange data. Therefore, whether or not exchange of exchange data is possible is again determined, and if possible, exchange of exchange data is executed. This adds zest to the exchange of exchange data.

Preferably, according to a twentieth aspect, each of the information processing apparatuses has apparatus identification information set to enable identification of each of the information processing apparatuses. The apparatus identification information of another information processing apparatus with which communication has been done is stored in a third area of the memory. The information processing apparatus further includes a wireless module. The wireless module repeatedly searches for another communicable information processing apparatus, using the communication unit, and when communication with another information processing apparatus becomes possible, based on comparison between the apparatus identification information stored in the third area of the memory and the apparatus identification information of the said another information processing apparatus, if the identification information matches, the wireless module does not instruct the data transmission/reception control unit to execute data communication to/from the said another information processing apparatus.

According to the twentieth aspect, the wireless module repeatedly searches for another communicable information processing apparatus. If communication with another information processing apparatus becomes possible, from the comparison between the apparatus identification information of another information apparatus with which it communicated in the past and the apparatus identification information of another information apparatus with which communication is to be done this time, if these pieces of information match, the wireless module does not issue any instruction to execute data communication, to the data transmission/reception control unit. Therefore, while wireless communication module 38 searches for a communication partner, a game machine corresponding to the MAC address included in the MAC address list stored in the MAC address saving area 88 is not notified to CPU 31 as the main body, since it is a past communication partner. Therefore, the exchange data exchanging process with the same game machine is not repeated a number of times, and efficient exchange of exchange data becomes possible. Further, CPU 31 in the sleeping state is not activated, whereby power consumption of the game machine body can be reduced.

Preferably, according to a twenty-first aspect, the information processing system further includes a distribution terminal capable of transmitting distribution data. The communication unit is capable of switching between another information processing apparatus and the distribution terminal. The data transmission/reception control unit receives, no matter whether the application is being executed or not, the distribution data transmitted from the distribution terminal using the communication unit, when the communication unit is switched to wireless communication with the distribution terminal.

According to the twenty-first aspect, if communication is switched to wireless communication with a distributing terminal, the distribution data distributed from the distributing terminal is received. Therefore, the distribution data transmitted from a fixed terminal 5 can be received. This adds zest to exchange of exchange data and to acquisition of distribution data.

Preferably, according to a twenty-second aspect, the communication unit outputs a first search signal for searching for another information processing apparatus when wireless communication with the said another information processing apparatus is to be executed, and waits until a second search signal for searching for the information processing apparatus is input from the distribution terminal when wireless communication with the distribution terminal is to be executed.

Preferably, according to a twenty-third aspect, the communication unit repeatedly transmits the first search signal for searching for another information processing apparatus to unspecified partners in a first period of executing wireless communication with another information processing apparatus, and waits until the first search signal repeatedly transmitted from another information processing apparatus is input in a second period, and in a third period of executing wireless communication with the distribution terminal, waits until the second search signal transmitted repeatedly from the distribution terminal is input.

According to the twenty-second and twenty-third aspects, in a first time period in which wireless communication with another information processing apparatus is executed, a first search signal for searching for another information processing apparatus is transmitted repeatedly to unspecified partners. In a third time period in which wireless communication with a distribution terminal is executed, input of a second search signal repeatedly transmitted from the distribution terminal is waited. Therefore, when distribution data from a fixed terminal 5 is to be acquired, different from data communication between game machines, it is necessary to wait until a connection request is made by fixed terminal 5. Specifically, the connection request signal is transmitted only from fixed terminal 5 as an attached device, whereby efficient data communication can be executed.

Preferably, according to a twenty-fourth aspect, at least one of the application programs is an external application program stored in a detachable external storage device, executed attached to the information processing apparatus, and data usable by the external application program is stored as supply data in a first area of the memory. The data transmission/reception control unit transmits, no matter whether the external storage device is attached or not, the supply data stored in the first area of the memory to another information processing apparatus, and receives supply data stored in the said another information processing apparatus, using the communication unit.

According to the twenty-fourth aspect, no matter whether the external storage device is attached or not, using the communication unit, the data transmission/reception control unit transmits the supply data stored in the memory to another information processing apparatus and receives the supply data stored in the said another information processing apparatus. Therefore, no matter whether a memory card 26 is attached or not, it is possible to exchange the exchange data with another game machine. Thus, it is unnecessary to have memory card 26 attached, which is convenient. Further, since what will be exchanged is unknown, higher zest can be added.

Preferably, according to a twenty-fifth aspect, when supply data stored in another information processing apparatus is received, the data transmission/reception control unit erases the supply data stored in the first area of the memory.

According to the twenty-fifth aspect, when the supply data stored in another information processing apparatus is received, the supply data stored in the memory is erased. Therefore, if the exchange data is stored in received data saving area 82, the exchange data that has been stored in a slot SL of exchange data saving area 80 is deleted, whereby exchange is done, which adds zest to the exchange of exchange data.

Preferably, according to a twenty-sixth aspect, the information processing apparatus further includes a processing unit selectively executing the plurality of application programs. The application program causes the processing unit to execute a process for erasing the supply data stored in a first area of the memory, usable by the application program.

According to the twenty-sixth aspect, the application program causes the processing unit to execute a process for erasing the supply data stored in the memory usable by the application program. Therefore, by executing the application program of the game machine, the supply data stored in the slot of exchange data saving area 80 can be erased, whereby exchange is done, which adds zest to the exchange of exchange data.

Preferably, according to a twenty-seventh aspect, the present invention provides a portable information processing apparatus capable of selectively executing a plurality of application programs, including: a memory storing data usable by at least one application program among the plurality of application program, as supply data another information processing apparatus; a communication unit for wireless communication with the said another information processing apparatus; and a data transmission/reception control unit, for transmitting the supply data stored in the memory to the said another information processing apparatus and receiving supply data stored in the said another information processing apparatus, using the communication unit, no matter whether the application program is being executed or not.

According to the twenty-seventh aspect, no matter whether the portable game machine as the information processing apparatus is executing an application program or not, the supply data stored in the memory is transmitted to another information processing apparatus, and supply data stored in the said another information apparatus is received, using the communication unit. Specifically, using wireless communication module 38, no matter whether an application program is being executed or not, communication with another game machine is done, the exchange data stored in a slot SL of exchange data saving area 80 is transmitted to another game machine, and the exchange data from another game machine is received. Therefore, no matter whether the application program is executed or not, the exchange data can be exchanged, and the exchange data can readily be exchanged.

Preferably, according to a twenty-eighth aspect, the present invention provides a portable information processing apparatus capable of executing a prescribed application program stored in a detachable storage medium, including: a memory storing data usable by the prescribed application program as supply data to another the information processing apparatus when the storage medium is attached; a communication unit for wireless communication with another information processing apparatus; and a data transmission/reception control unit, for transmitting the supply data stored in the memory to the said another information processing apparatus and receiving supply data stored in the said another information processing apparatus, using the communication unit, no matter whether the storage medium is attached or not.

According to the twenty-eighth aspect, no matter whether a storage medium is attached or not to the portable game machine as the information processing apparatus, using the communication unit, the supply data stored in the memory is transmitted to another information processing apparatus, and supply data stored in another information processing apparatus is received. Specifically, using wireless communication module 38, no matter whether a storage medium is attached or not, communication with another game machine is done, the exchange data stored in a slot SL of exchange data saving area 80 is transmitted to another game machine, and the exchange data from another game machine is received. Therefore, no matter whether the application program is executed or not, the exchange data can be exchanged, and the exchange data can readily be exchanged.

Preferably, according to a twenty-ninth aspect, the present invention provides a method of controlling an information processing system including a plurality of application programs and a plurality of portable information processing apparatuses capable of selectively executing the application programs. Each of the information processing apparatuses includes a memory storing data usable by at least one application program among the plurality of application program as supply data to another information processing apparatus, and a communication unit. The method includes the communication step of wireless communication with the said another information processing apparatus by the communication unit, the step of transmitting the supply data stored in the memory to the said another information processing apparatus using the communication unit, no matter whether the application program is being executed or not, and the step of receiving supply data stored in the said another information processing apparatus using the communication unit, no matter whether the application program is being executed or not.

According to the twenty-ninth aspect, no matter whether the application program is executed by the portable game machine as the information processing apparatus, using the communication unit, the supply data stored in the memory is transmitted to another information processing apparatus, and supply data stored in another information processing apparatus is received. Specifically, using wireless communication module 38, no matter whether the application program is being executed or not, the exchange data stored in a slot SL of exchange data saving area 80 is transmitted to another game machine, and the exchange data from another game machine is received. Therefore, no matter whether the application program is executed or not, the exchange data can be exchanged, and the exchange data can readily be exchanged.

According to the present invention, no matter whether an application is executed or not, the information processing apparatus and the information processing system can provide data usable by the application to another information processing apparatus.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 16 illustrates a different manner of comparison of application identification information (ID) in accordance with an embodiment of the present invention.

FIG. 19 is a (third) illustration representing a process for exchanging exchange data between game machines in accordance with an embodiment of the present invention.

FIG. 24 illustrates a communication partner search process.

DETAILED DESCRIPTION OF EXAMPLE EMBODIMENTS

Figure 1:
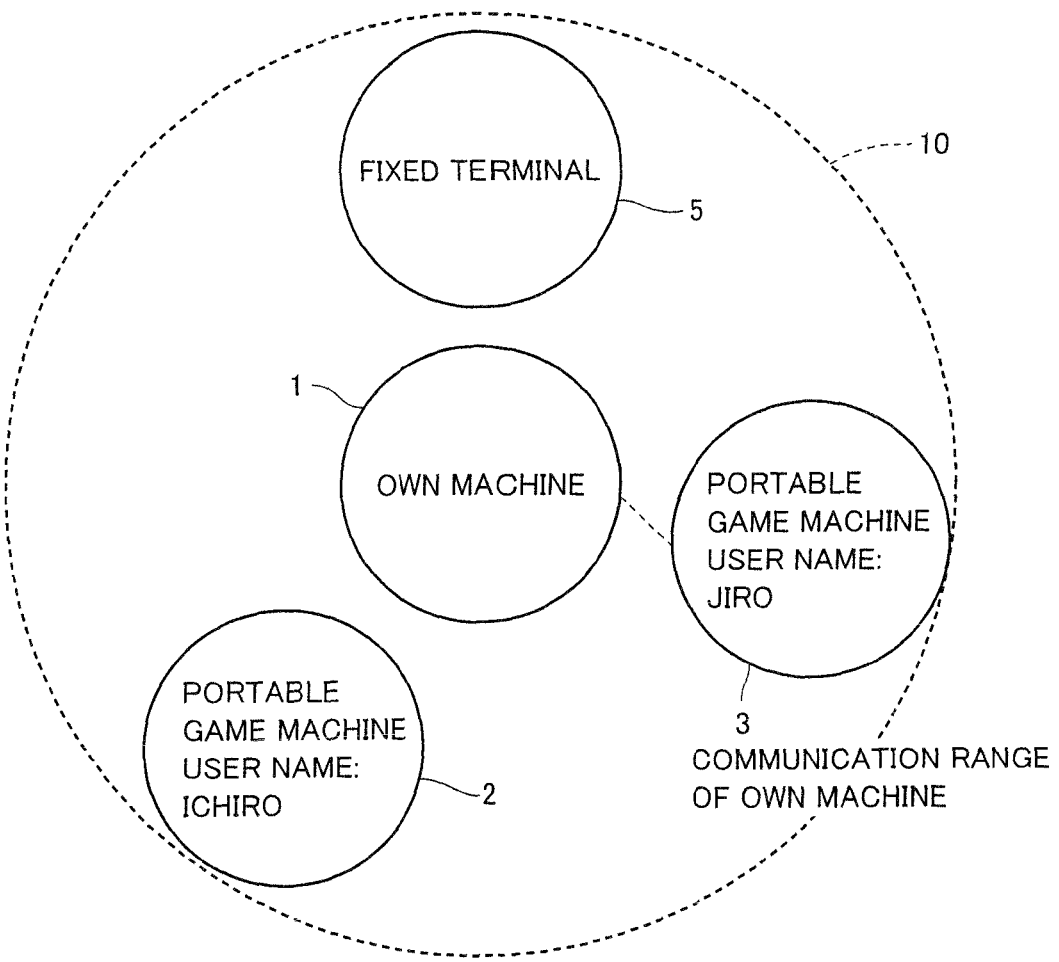
FIG. 1 is an illustration of a typical example of information processing system in accordance with the present invention.

In the following, embodiments of the present invention will be described in detail with reference to the figures. The same or corresponding portions in the figures are denoted by the same reference characters, and description thereof will not be repeated.

<Overall Configuration>

First, a typical example of an information processing system in accordance with the present invention will be described with reference to FIG. 1.

Referring to FIG. 1, an information processing system in accordance with an embodiment of the present invention includes a plurality of portable information processing apparatuses. Here, portable game machines (hereinafter also simply referred to as game machines) 1 to 3 are shown as examples of the plurality of portable information processing apparatuses. Through three game machines are shown here, the least required number is two. A configuration including additional portable game machines is also possible.

In the information processing system in accordance with the embodiment of the present invention, a fixed terminal 5 capable of wireless communication with the game machines as portable information processing apparatuses is provided, though the fixed terminal is not an indispensable component.

Game machines 1 to 3 are capable of giving/receiving data by executing wireless communication with each other. Here, an example will be described in which game machine 1 (hereinafter also referred to as an own machine) communicates with other game machines and with fixed terminal 5.

In FIG. 1, a range of communication 10 when game machine 1 (own machine) executes wireless communication is plotted in a dotted line. Specifically, in the example shown in FIG. 1, game machine 1 (own machine) can communicate with each of game machines 2 and 3 and with fixed terminal 5. In FIG. 1, in the communication range 10 of own game machine 1, there are game machines 2 and 3 corresponding to user names "Ichiro" and "Jiro" and game machine 1 is shown to be engaged in wireless communication with game machine 3 having the user name "Jiro".

Game machines 1 and 3 execute wireless communication with each other to exchange data (supply data) with each other. The details thereof will be described later.

As will be described later, fixed terminal 5 distributes prescribed distribution data to game machines therearound. The game machine, receiving the distribution data distributed from fixed terminal 5, can use the obtained distribution data.

<Game Machine Configuration>

Figure 2:
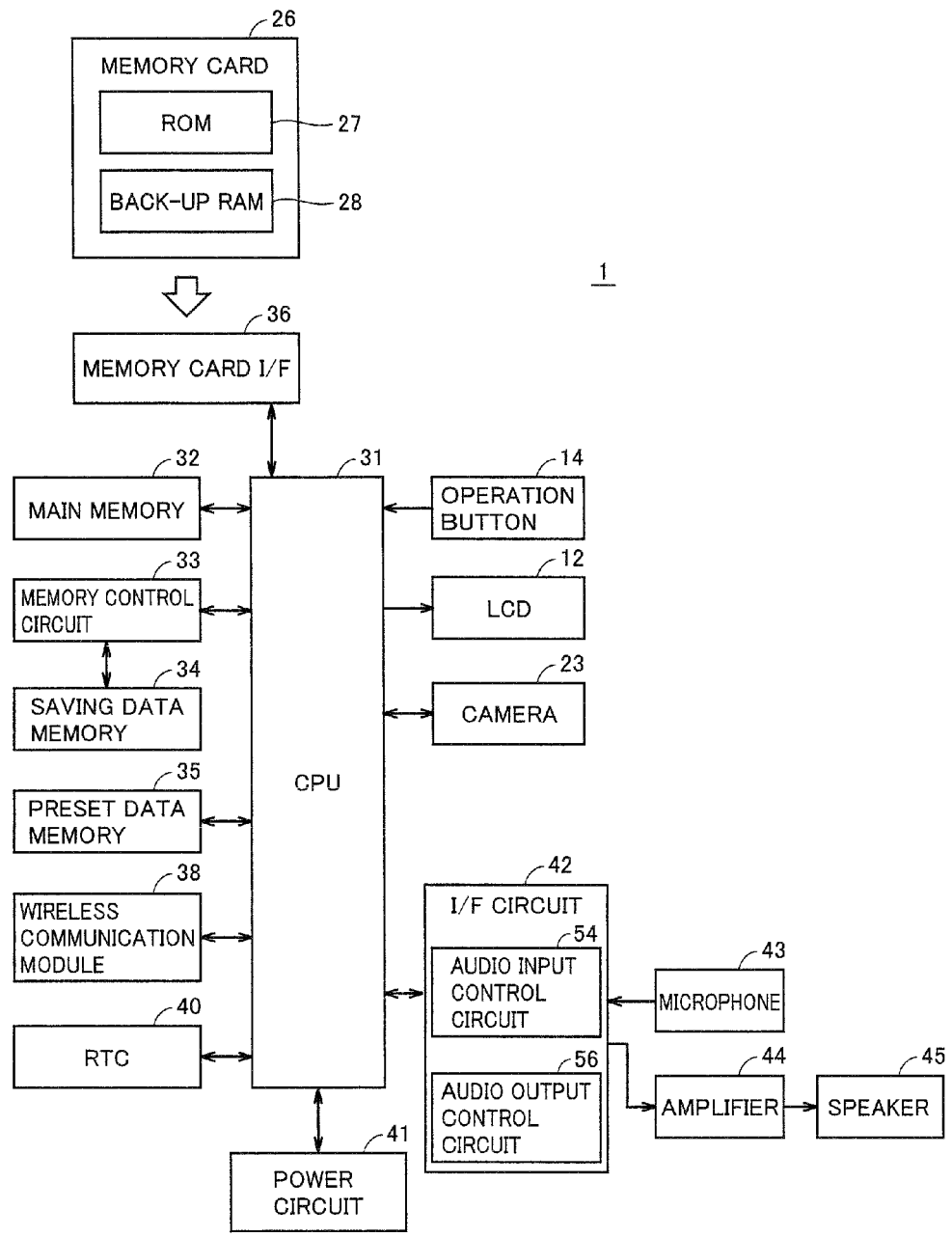
FIG. 2 is a schematic block diagram showing a configuration of a game machine 1 in accordance with an embodiment.

Referring to FIG. 2, a schematic block diagram showing the configuration of game machine 1 in accordance with an embodiment of the present invention will be described. Game machines 2 and 3 have the same configurations and, therefore, detailed description thereof will not be given here.

Referring to FIG. 2, game machine 1 includes: a CPU 31; a main memory 32; a memory control circuit 33; a saving data memory 34; a preset data memory 35; a memory card interface (memory card I/F) 36; a wireless communication module 38; a real time clock (RTC) 40; and a power circuit 41.

CPU 31 is operation processing means for executing a program. In the present embodiment, the program is stored in a memory (for example, saving data memory 34), a memory card 26 or the like. The program executed by CPU 31 may be recorded in advance in a memory in game machine 1, or it may be obtained from memory card 26, or it may be obtained from another device through communication with the device. CPU 31 is capable of multi-processing. More specifically, it can execute the game exchange process, which will be described later, on the background, while it is executing a game process.

To CPU 31, main memory 32, memory control circuit 33 and preset data memory 35 are connected. Further, saving data memory 34 is connected to memory control circuit 33.

Main memory 32 is storage means used as a work area and buffer area for CPU 31. Specifically, main memory 32 stores various data used for the information processing described above, and stores programs obtained from the outside (from memory card 26 or other devices). In the present embodiment, a PSRAM (Pseudo-RAM) is used, for example, as main memory 32.

As will be described later, saving data memory 34 is storage means for storing a program executed by CPU 31 and data such as images picked-up by a camera 23.

Saving data memory 34 is implemented by a non-volatile storage medium and, by way of example, it is implemented by an NAND type flash memory in the present embodiment. Memory control circuit 33 is a circuit controlling reading and writing of data to/from saving data memory 34, in accordance with instructions from CPU 31.

Preset data memory 35 is storage means for storing data (preset data) including various parameters set in advance in game machine 1. As preset data memory 35, a flash memory connected to CPU 31 by an SPI (Serial Peripheral Interface) may be used.

Memory card I/F 36 is connected to CPU 31. Memory card I/F 36 performs reading/writing of data to/from memory card 26 connected to a connector, in accordance with instructions from CPU 31.

Wireless communication module 38 in accordance with the present embodiment has a function of performing wireless communication with game machines of the same type, as will be described later.

To CPU 31, RTC 40 and power circuit 41 are further connected. RTC 40 counts time and outputs the result to CPU 31. By way of example, CPU 31 may calculate the current time (date) and the like based on the time counted by RTC 40. Power circuit 41 controls electric power supplied from a power source provided in game machine 1, and supplies electric power to each component of game machine 1.

Further, game machine 1 includes a microphone 43 and an amplifier 44. Microphone 43 and amplifier 44 are connected to an I/F circuit 42. Microphone 43 detects user's voice uttered to game machine 1, and outputs an audio signal representing the voice to I/F circuit 42. Amplifier 44 amplifies the audio signal from I/F circuit 42 and outputs it from a speaker 45. I/F circuit 42 is connected to CPU 31.

I/F circuit 42 includes an audio input control circuit 54 receiving an input of audio signal from microphone 43, and an audio output control circuit 56 controlling an output of audio signal to amplifier 44.

Audio input control circuit 54 detects an input level of an audio signal from microphone 43, performs A/D conversion of the audio signal, or converts the audio signal to audio data of a prescribed format.

Audio output control circuit 56 adjusts the audio signal to be output to amplifier 44, depending on whether the output signal is in stereo setting or monaural setting.

Operation button 14 includes a plurality of operation buttons, not shown, and connected to CPU 31. From operation button 14 to CPU 31, operation data representing an input state of each operation button (whether it is pressed or not) is output. Receiving the operation data from operation button 14, CPU 31 executes a process in accordance with the input to operation button 14.

Camera 23 is connected to CPU 31. Camera 23 picks-up an image in accordance with an instruction from CPU 31, and outputs the picked-up image data to CPU 31. By way of example, CPU 31 issues an image pick-up instruction to camera 23, and the camera, receiving the image pick-up instruction, picks up an image and transmits image data to CPU 31.

Further, an LCD 12 is connected to CPU 31. LCD 12 displays operation images and the like, not shown, in accordance with instructions from CPU 31.

Memory card 26 is detachable to a connector, not shown, and when connected to connector, it is connected to memory card I/F 36. Memory card 26 includes an ROM 27 and a back-up RAM 28, and in ROM 27, an application and the like to be executed by game machine 1 are set (stored) in advance. In ROM 27, an application identification information (ID) for identifying an application stored in ROM 27 is stored. Further, in back-up RAM 28, pending data or resulting data of an application are stored (saved). Further, as will be described later, back-up RAM 28 stores an exchange flag data, if data (exchange data) to be offered to another game machine is stored in the game machine at the time of execution of the application.

Figure 3:
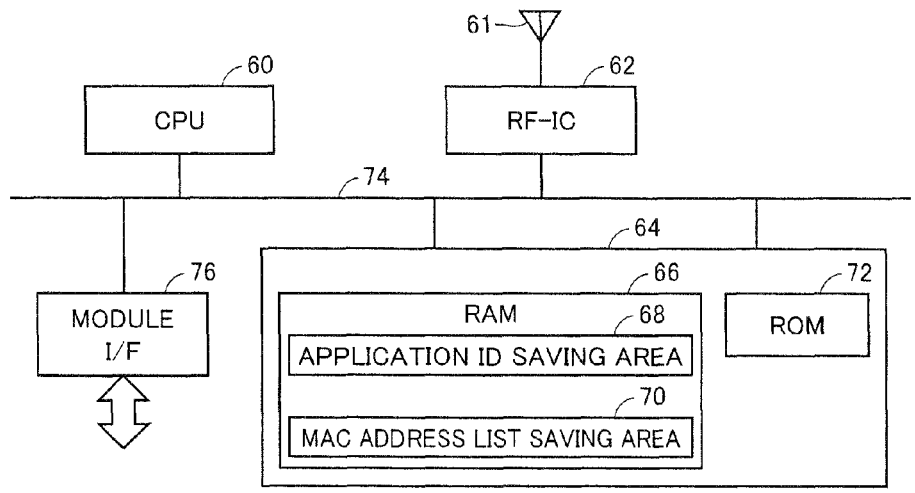
FIG. 3 shows a configuration of wireless communication module 38 in accordance with an embodiment.

Referring to FIG. 3, a configuration of wireless communication module 38 in accordance with the present embodiment will be described.

Referring to FIG. 3, wireless communication module 38 in accordance with an embodiment of the present invention includes: a CPU 60; an RF (Radio Frequency)-IC 62; a memory control unit 64; a module I/F 76, and an internal bus 74 connected to these components.

Memory control unit 64 includes an RAM 66 and an ROM 72. As will be described later, RAM 66 is provided with an application ID saving area 68 and an MAC address list saving area 70.

CPU 60 is operation processing means for executing a program related to wireless communication.

CPU 60 is capable of realizing prescribed functions of wireless communication by a program read from ROM 72 stored in memory control unit 64. Specifically, an application for executing communication between portable terminals and an application for executing communication between a portable terminal and a fixed terminal, as will be described later, are stored.

When CPU 60 executes the application for executing communication between portable terminals, a process of searching for a communication partner to exchange the exchange data (hereinafter also referred to as the exchange partner searching process) is executed in wireless communication module 38. If a communication partner to exchange the exchange data is found by the exchange partner searching process by wireless communication module 38, a notice is sent to CPU 31 as the main body of game machine 1 as will be described later, and the process for giving/receiving the exchange data is executed. More specifically, in accordance with an instruction from CPU 31 as the main body, a process for establishing connection with the communication partner is executed, and after the connection is established, the process for giving/receiving the exchange data is executed.

Similarly, when CPU 60 executes the application for executing communication between a portable terminal and a fixed terminal, a process of searching for a communication partner that provides distribution data (hereinafter also referred to as the distribution partner searching process) is executed in wireless communication module 38. If a communication partner that provides the distribution data is found by the distribution partner searching process by wireless communication module 38, a notice is sent to CPU 31 as the main body of game machine 1 as will be described later, and the process for obtaining distribution data is executed. More specifically, in accordance with an instruction from CPU 31 as the main body, a process for establishing connection with a fixed terminal as the communication partner is executed, and after the connection is established, the process for obtaining distribution data is executed.

RF-IC 62 modulates data transmitted in accordance with an instruction of CPU 60 to another game machine, and transmits radio wave from an antenna 61. The radio wave intensity, however, is very weak and it is set to a small value that can be used by a user without any license under the provision of Radio Law. Further, wireless communication module 38 receives radio wave transmitted from another game machine, for example, at antenna 61, and the received data is demodulated at RF-IC 62. The demodulated received data is stored in RAM 66 of memory control unit 64.

Module I/F 76 is an interface between wireless communication module 38 and the main body such as CPU 31 of game machine 1, and through module I/F 76, the received data received at antenna 61 of wireless communication module and stored in RAM 66 is output to CPU 31 and the like as the main body of game machine 1. Further, in accordance with an instruction from CPU 31, supply data (hereinafter also referred to as exchange data) stored in saving data memory 34 is input to wireless communication module 38 through module I/F 76, and the data can be output as transmission data, through antenna 61 to another, external game machine, for example, as described above.

The data transmitted to another, external game machine is not limited to data input in accordance with an instruction of CPU 31 as the main body of game machine 1 through module I/F 76. Exchange determination data (wireless frame of FIG. 13) generated based on data stored in RAM 66 or the like provided in memory control unit 64 in accordance with an instruction of CPU 60 in wireless communication module 38 is also output as transmission data. As will be described later, the exchange determination data (wireless frame of FIG. 13) is output as a connection request signal from a machine as a client.

Figure 4:
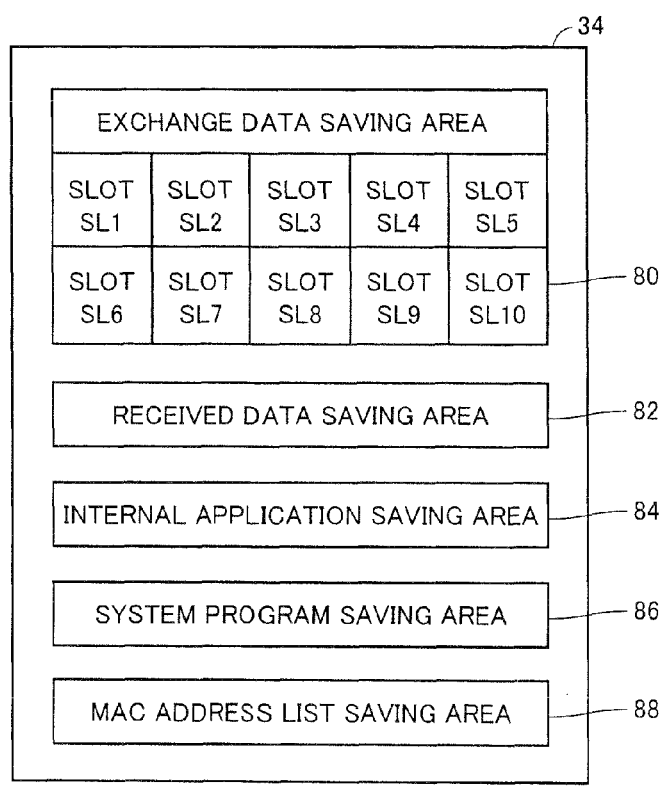
FIG. 4 shows a memory map of a saving data memory 34 in accordance with an embodiment.

Referring to FIG. 4, a memory map of saving data memory 34 in accordance with the present embodiment will be described.

Referring to FIG. 4, saving data memory 34 includes: an exchange data saving area 80; a received data saving area 82; an internal application saving area 84; a system program saving area 86; and an MAC address list saving area 88.

Exchange data saving area 80 is an area for saving exchange data used when data exchange with another game machine is executed.

In exchange data saving area 80, a plurality of slots SL1 to SL10 are provided as a plurality of storage areas. Each slot SL is an area storing data usable by the application as exchange data offered to another game machine. The data actually used by the application is stored in a state associated with an application identification data (ID) identifying the corresponding application.

Received data saving area 82 is an area for saving exchange data transmitted from another game machine, when data exchange with another game machine is executed.

Internal application saving area 84 is an area saving a plurality of applications necessary for realizing various functions of game machine 1, stored in advance in game machine 1. Internal application saving area 84 includes a saving area for saving application body and a saving area provided application by application, for saving save data exclusively used by the corresponding application (application-dedicated storage area).

Therefore, it follows that when a plurality of applications are saved in internal application saving area 84, a plurality of saving areas are provided, corresponding to respective applications.

System program saving area 86 is an area saving main body function programs for realizing the main body function of the information processing apparatus, including a menu program for selecting an application to be activated and programs for executing the data giving/receiving process for giving/receiving exchange data to/from the communication partner having the exchange data and the program for executing the data obtaining process obtaining the distribution data from a communication partner.

MAC address list saving area 88 is an area for saving MAC address allowing wireless communication module 38 to identify a game machine as a partner communicated in the past. A MAC address stored in MAC address list saving area 88 is used in a communication initialization process when the data communication process, which will be described later, is executed.

The data in MAC address list saving area 88 can be erased in accordance with an instruction from CPU 31 by a prescribed operation instruction by the user. Further, it may be erased after the lapse of a prescribed time period. When data in MAC address list saving area 88 is erased, an MAC address list stored in MAC address list saving area 70 of RAM 66 is also erased, in accordance with an instruction from CPU 31 as the main body.

In the present example, erasure of MAC address list stored in MAC address list saving area 70 in accordance with an instruction from CPU 31 will be described. It is also possible to reset and erase the MAC address list stored in MAC address list saving area 70 of RAM 66 in accordance with an instruction from CPU 60 after a prescribed time period in wireless communication module 38, rather than the instruction from CPU 31.

<Storage in Exchange Data Saving Area 80>

Figure 5:
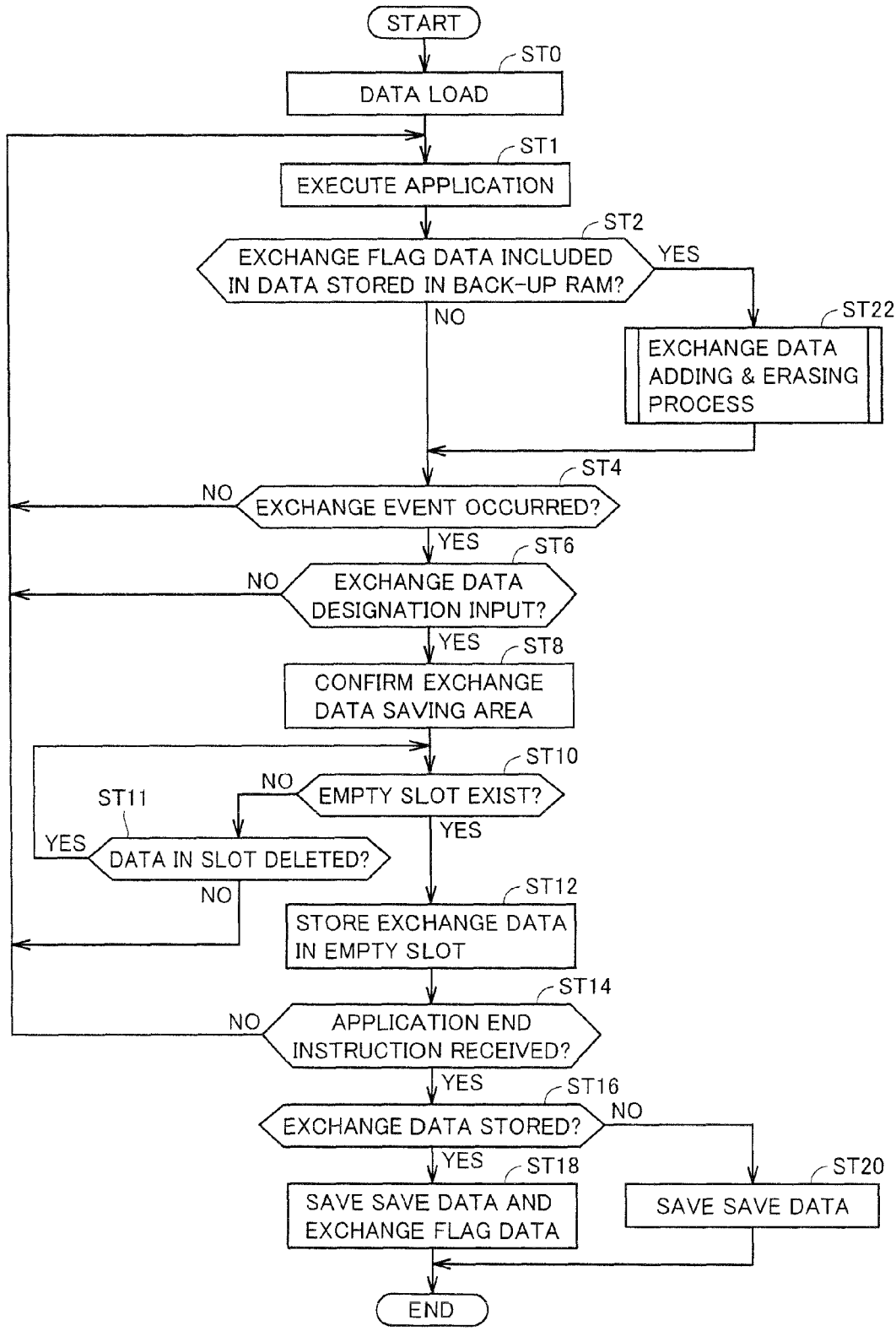
FIG. 5 represents a process for storing exchange data in exchange data saving area 80.

Referring to FIG. 5, a process for storing exchange data in exchange data saving area 80 will be described.

In the present example, when a user, executing an application in game machine 1, operates data usable by the application as exchange supply data to an external game machine, the designated exchange data is stored in exchange data saving area 80. By way of example, execution of an application stored in the ROM of memory card 26 will be described.

When main power of game machine 1 is turned on and the user executes a prescribed operation, CPU 31 of game machine 1 loads data that has been stored in memory card 26 (step ST0). Specifically, part of application data stored in ROM 27 of memory card 26 and save data including result data and pending data that can be used for the next application stored in back-up RAM 28 are developed on main memory 32. The process up to loading of data stored in memory card 26 corresponds to the function executed by the main body function program saved in system program saving area 86. Processes carried out thereafter, including the function of storing the exchange data or the functions of adding or erasing the exchange data as will be described later are functions executed by an application stored in ROM 27 of memory card 26.

Next, based on the data developed on main memory 32, an application is executed (step ST1).

When the application is executed, first, CPU 31 determines whether or not the data stored in back-up RAM 28 includes an exchange flag data, indicating that the exchange data has been stored in exchange data saving area 80 (step ST2).

If it is determined at step ST2 that the data stored in back-up RAM 28 includes an exchange flag data, indicating that the exchange data has been stored in exchange data saving area 80 (YES at step ST1), CPU 31 executes exchange data adding process and erasing process (step ST22). These processes will be described later. After execution of the adding and erasing processes, the flow proceeds to step ST4.

If it is determined by CPU 31 at step ST2 that the data stored in back-up RAM 28 does not include an exchange flag data indicating that the exchange data has been stored in exchange data saving area 80 (NO at step ST2), the flow proceeds to step ST4.

CPU 31 determines whether or not an event of registering exchange data (hereinafter also referred to as exchange data registration event) occurred by the execution of the application (step ST4). Specifically, during execution of the application, whether or not transition is made to a scene urging storage of data usable by the application that is being executed as exchange data in exchange data saving area 80 is determined.

Here, the exchange data refers to data used in the application program. More preferably, it refers to the data obtained or formed by the user while executing the application program.

Though not shown, an example of the exchange data registration event is as follows. A list of data usable by the application including data obtained or formed during the game through execution of the application, stored in the back-up RAM, is displayed on LCD 12, and the user selects data that may be offered to others.

Storage of the exchange data will be described later. By way of example, an item the user got in the game, or data of a character grown through the progress of the game may be offered as exchange data. A user message may be added to an item. Specifically, a user may write a message on a "letter" item, and the message may be stored as exchange data. By offering items and characters reflecting the status of game progress as exchange data, user-by-user individuality can be exhibited, adding zest to the exchange.

The exchange data registration event may be expressed as an event in the game. By way of example, when a user makes an operation of placing or depositing an item or a character at a prescribed location, the data corresponding to the item or character may be stored as exchange data in exchange data saving area 80. For instance, a "letter" item may be put in a bottle and thrown to the sea to create a dramatic atmosphere in the game, and the data of "letter" item thrown to the sea may be stored as the exchange data in exchange data saving area 80.

If it is determined that the exchange event occurred (YES at step ST4), CPU 31 determines whether or not an input designating the exchange data is received (step ST6).

If it is determined that the exchange event has not occurred (NO at step ST4), CPU 31 returns to step ST2 and executes a normal application. For example, it executes a game process of operating an object in a virtual space based on the user operation.

Next, at step ST6, if it is determined that an input designating exchange data is received (YES at step ST6), CPU 31 confirms the exchange data saving area 80 (step ST8).

If it is determined at step ST6 that the input designating exchange data is not received (NO at step ST6), it means that the user does not want exchange and, CPU 31 returns to step ST2 and executes a normal application.

Next, CPU 31 confirms exchange data saving area 80, and determines whether or not there is an empty slot in exchange data saving area 80 (step ST10).

If it is determined at step ST10 that exchange data saving area 80 has an empty slot (YES at step ST10), CPU 31 stores the exchange data in the empty slot (step ST12).

If it is determined at step ST10 that exchange data saving area 80 has no empty slot (NO at step ST10), CPU 31 determines whether or not data in a slot is deleted (step ST11). Though not shown, it is possible to notify the user that no slot is empty, and to urge the user to designate deletion of data in any slot. When such designation is made, the data in the corresponding slot is deleted.

If it is determined at step ST11 that data in a slot is deleted, CPU 31 returns to step ST 10. Then, the exchange data is stored in the empty slot.

If it is determined at step ST11 that data in the slot is not deleted, CPU 31 returns to step ST2 and executes the normal application.

Next, CPU 31 determines whether or not an instruction to end the application is received from the user (step ST14).

If it is determined at step ST14 that an instruction to end the application is received from the user, the flow proceeds to the next step ST16. If it is determined at step ST14 that an instruction to end the application is not received from the user (NO at step ST14), CPU 31 returns to step ST2 and executes the normal application.

Next, at step ST16, whether or not the exchange data is stored in exchange data saving area 80 is determined. If it is determined that the exchange data is stored in exchange data saving area 80 (YES at step ST16), CPU 31 saves an exchange flag data indicating that the exchange data has been stored in exchange data saving area 80, together with save data (for example, data to be used in the application such as obtained items and characters, sentences and pictures formed), in back-up RAM 28 (step ST18). Then, the process ends (END). If it is determined that the exchange data is not stored in exchange data saving area 80 (NO at step ST16), CPU 31 saves only the save data in back-up RAM 28 (step ST20). Then, the process ends (END).

By this process, the exchange flag data is saved in back-up RAM 28. Therefore, in the process of determination at step ST2, if the exchange flag data is included, the processes of adding and erasing exchange data can be executed.

Though a process for storing the exchange data in exchange data saving area 80 when an application stored in the ROM of memory card 26 is executed has been described as an example, the application is not limited to one that is stored in memory card 26. The process for storing exchange data when an application stored in internal application saving area 84 is executed can be realized, by using a saving area for saving the save data of the application, provided application by application in internal application saving area 84, in correspondence with the back-up RAM described above.

In the example above, the functions of adding and erasing exchange data are described as executed by the application stored in the ROM 27 of memory card 26. The functions may be executed by the main body function program saved in system program saving area 86. Specifically, after the data stored in memory card 26 is loaded, whether or not the exchange flag data exists in the developed data is determined, the processes for adding and erasing exchange data are executed, and thereafter, the application may be executed.

Figure 6:
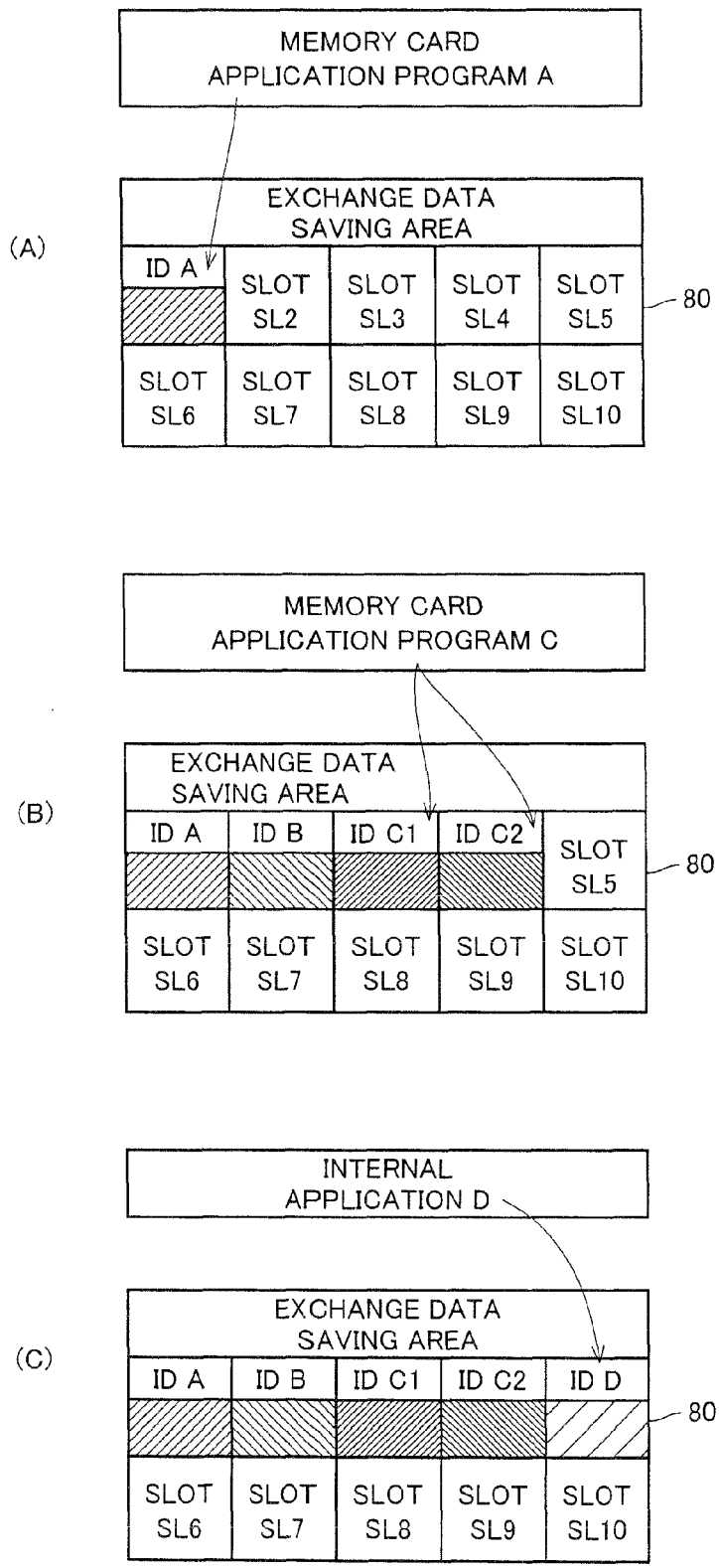
FIG. 6 shows storage of exchange data in exchange data saving area 80 by an application.

Referring to FIG. 6, an example will be described in which the exchange data is stored in exchange data saving area 80 by the application.

FIG. 6(A) shows an example in which an application of application name A stored in the memory card described above is executed, and exchange data is stored in correspondence with the application name A as the application identification information (ID), in a slot SL1 of exchange data saving area 80. Though the application name is the same as the application identification information for the simplicity of description in the present example, these are not necessarily the same, and may be different from each other.

Further, it is not necessary that one exchange data is stored for one application. FIG. 6(B) shows an example in which an application C stored in the memory card described above is executed and exchange data corresponding to the application name C as the application identification information (ID) are stored in two slots SL3 and SL4 of exchange data saving area 80. As will be described later, when data having attached information in addition to the application name C as the application identification information (ID) are registered in slots SL3 and SL4, it becomes possible to utilize more sophisticated exchange conditions (see FIG. 16(C)). It is noted that numerals used here indicate the first data, second data . . . etc., and the same application name may be used as application identification information.

Further, the application is not limited to the applications in a memory card. FIG. 6(C) shows an example in which an internal application D stored in internal application saving area 84 of game machine 1 is executed and the exchange data corresponding to application name D as the application identification information (ID) is stored in a slot SL5 of exchange data saving area 80.

The exchange data stored in each slot of exchange data saving area 80 in the present example is transmitted to another game machine when prescribed conditions are satisfied.

<Data Communication Process by Wireless Communication Module 38>

Figure 7:
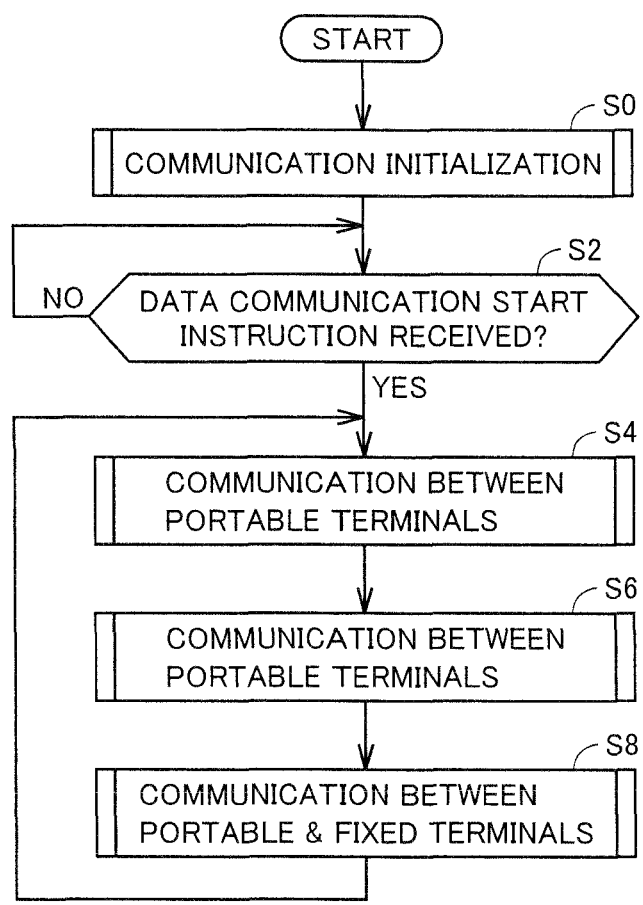
FIG. 7 is a flowchart representing a data communication process executed by wireless communication module 38 in accordance with an embodiment of the present invention.

Referring to FIG. 7, the flow of data communication process executed by wireless communication module 38 in accordance with the present embodiment will be described. The data communication process of the present example is executable no matter whether or not an application is being executed by CPU 31 on the main body. Specifically, wireless communication module 38 can operate in parallel with CPU 31 on the main body side.

Here, an example will be described in which when CPU 31 on the main body side is executing an application and CPU 31 on the main body side executes an application using wireless communication module 38, the data communication is not executed, and the data communication is executed in other situations. The operation is not limited thereto. The data communication may be executed when an application is executed using wireless communication module 38.

The situation where an application using wireless communication module 38 is executed means, for example, when an interactive game is executed with another game machine through wireless communication module 38, and other situations include when CPU 31 on the main body side executes an application not using wireless communication module 38, or when an application is not executed, that is, when CPU 31 is in a power saving mode or in a sleeping state.

Referring to FIG. 7, first, communication initialization process necessary for executing data communication in accordance with the present embodiment is executed (step S0). The communication initialization process (FIG. 8) will be described later. The process is realized by CPU 31 executing a system program stored in system program saving area 86 described above. Subsequent communication between portable terminals (FIG. 10) and communication between portable and fixed terminals (FIG. 30), which will be described later, are realized by CPU 60 of wireless communication module 38 executing an application stored in ROM 72.

The present flow starts automatically when, for example, the power is turned on and wireless communication is effectively set.

Next, CPU 60 of wireless communication module 38 determines whether or not an instruction to start data communication is received from CPU 31 (step S2). By way of example, if it is determined that an application using wireless communication module 38 is not executed, CPU 31 outputs an instruction to start data communication to wireless module 38. Specifically, the instruction to start data communication is output generally at the time of power on. If it is determined that the instruction to start data communication is received from CPU 31, CPU 60 executes communication between portable terminals (step S4). Then, it again executes communication between portable terminals (step S6). Then, it executes communication between portable and fixed terminals (step S8). Thereafter, it returns to step S4, and executes communication between portable terminals.

Therefore, no matter whether or not any application is being executed by CPU 31 on the main body side, wireless communication module 38 continuously executes the communication between portable terminals and communication between portable and fixed terminals, for example, when no application is being executed, or when the main body side is in a power saving mode.

When CPU 31 on the main body side is to execute an application using wireless communication module 38, it may instruct wireless communication module 38 to stop data communication and after the data communication is terminated, CPU 31 may execute different data communication based on the application.

When the different data communication ends, CPU 31 may output an instruction to start data communication after the communication initialization mentioned above, and data communication including communication between portable terminals and communication between portable and fixed terminals may be resumed.

Figure 8:
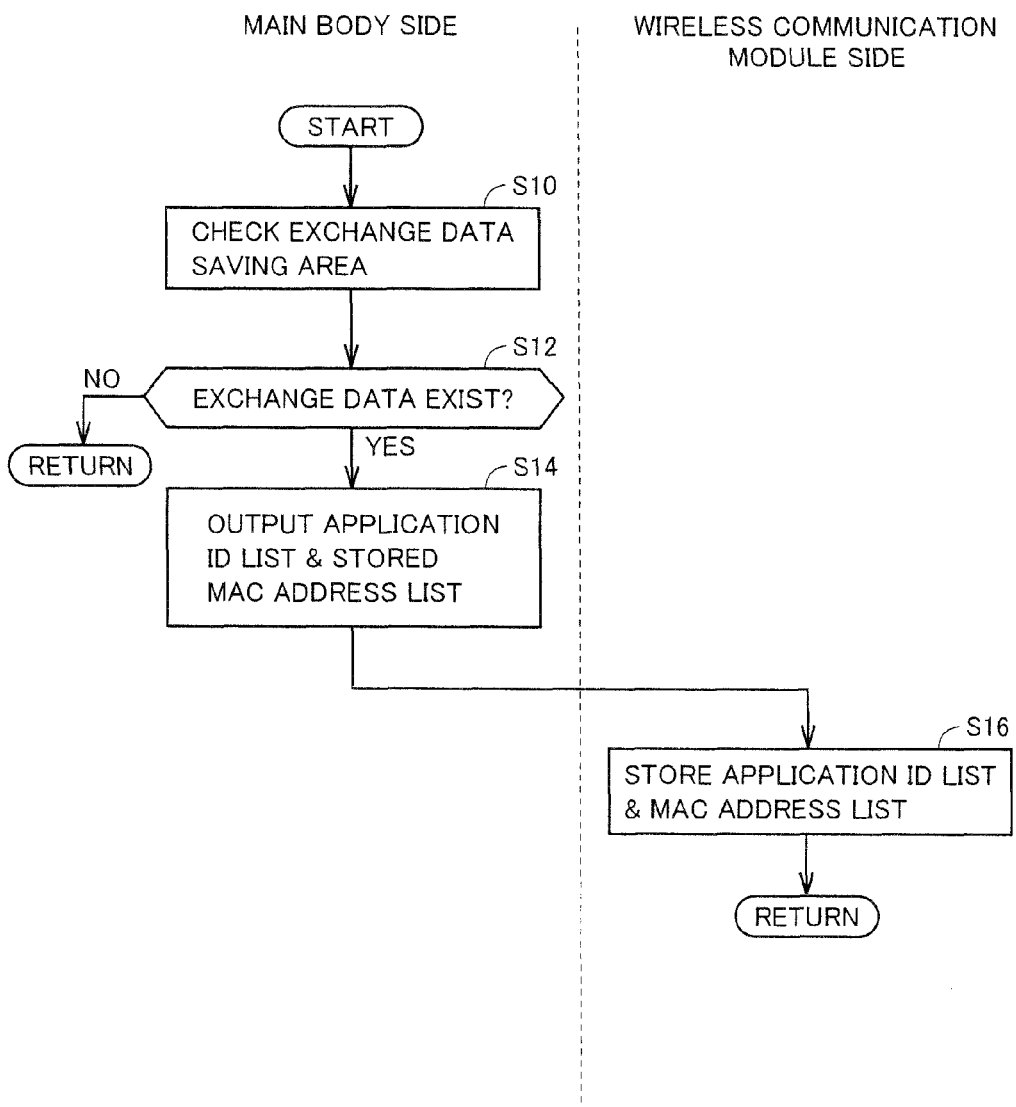
FIG. 8 represents a process of communication initialization in accordance with an embodiment of the present invention.

Referring to FIG. 8, the communication initialization process in accordance with an embodiment of the present invention will be described. As mentioned above, the communication initialization process is realized by CPU 31 executing the system program stored in system program saving area 86, and even processes related to wireless communication module 38 are also executed and processed in accordance with instructions from CPU 31 as functions on the main body side.

Referring to FIG. 8, first, CPU 31 on the main body side checks exchange data saving area 80 of saving data memory 34 (step S10). Thereafter, CPU 31 determines whether or not exchange data exists in exchange data saving area 80 of saving data memory 34 (step S12).

If it is determined at step S12 that exchange data exists in a slot of exchange data saving area 80 (YES at step S12), CPU 31 outputs, to wireless communication module 38, each piece of application identification information (ID) corresponding to each data stored in the slot, that is, a list of application identification information (ID) and an MAC address list stored in MAC address list saving area 88 of saving data memory 34.

On the side of wireless communication module, CPU 60 of wireless communication module 38 stores the list of application identification information (ID) and the MAC address list output from CPU 31 on the main body side, to application ID saving area 68 and MAC address list saving area 70 of RAM 66, respectively (step S16). Then, the process ends (RETURN).

This process makes it ready to start data communication. Specifically, CPU 60 of wireless communication module 38 is now capable of generating exchange determination data for data communication process and transmitting it to another game machine.

Specifically, CPU 60 is now able to transmit the exchange determination data, including the application identification information (ID) corresponding to the actual exchange data stored in the slots of exchange data saving area 80, stored in application ID saving area 68, to another game machine. When a plurality of exchange data are stored in the slots of exchange data saving area 80, application identification information (ID) corresponding to each of the data is included in the exchange determination data.

Receiving the exchange determination data, the said another game machine confirms the application identification information (ID) as the data content, compares it with the application identification information (ID) corresponding to the exchange data held in the said another game machine, and if the pieces of information match, the said another game machine can determine that exchange data can be exchanged and if they do not match, that exchange data cannot be exchanged.

Further, as the MAC address list output from CPU 31 on the main body side is stored in MAC address list saving area 70, it becomes possible to realize the MAC address filtering process, which will be described later If it is determined at step S12 that exchange data does not exist in any slot of exchange data saving area 80 (NO at step S12), CPU 31 ends the process without performing the process steps above (RETURN). Here, since no exchange data is in the slot, the process for giving/receiving the exchange data to/from another game machine in accordance with the communication between portable terminals as will be described later is not executed. It is possible, however, to receive distribution data in accordance with the communication between portable and fixed terminals, which will be described later.

In this example, in preparation for the data communication, as the communication initialization process, the list of application identification information (ID) and the list of MAC address are stored in application ID saving area 68 and MAC address list saving area 70 of RAM 66, respectively, before starting communication. The timing may be different, and the communication initialization process may be executed when an application program stores exchange data in exchange data saving area 80.

Figure 9:
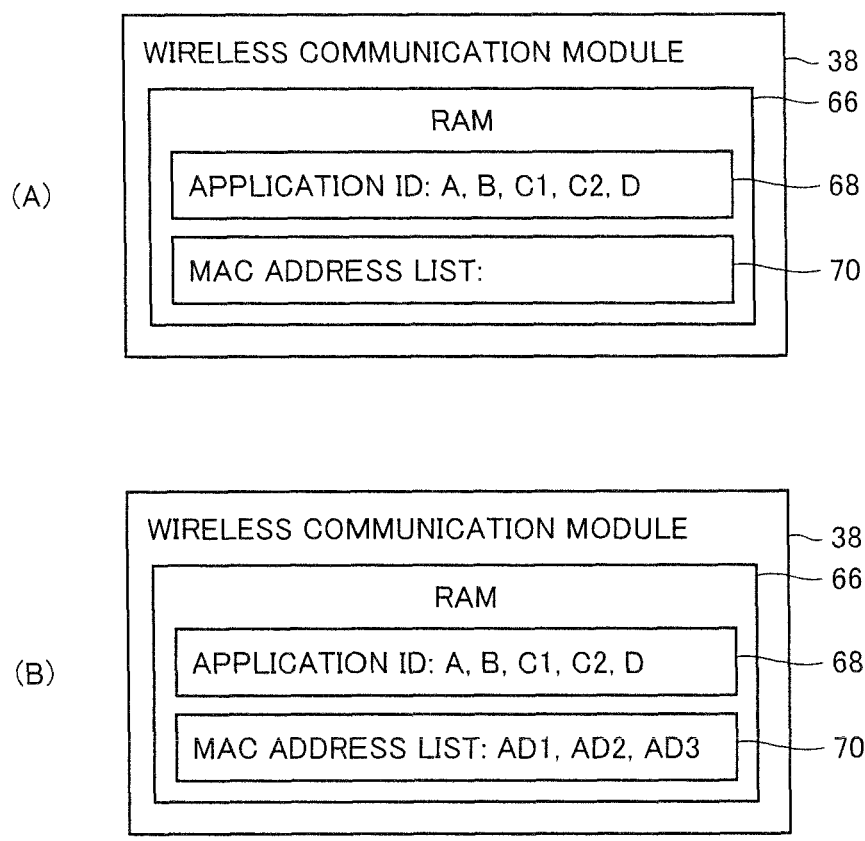
FIG. 9 shows data stored in an RAM 66 by the communication initializing process.

Referring to FIG. 9, the data stored in RAM 66 by the communication initialization process will be described.

Referring to FIG. 9(A), here, an example is shown in which pieces of application identification information (ID) A, B, C1, C2 and D are stored in application ID saving area 68 of RAM 66.

In FIG. 9(A), nothing is stored in the MAC address list.

FIG. 9(B) shows an example in which pieces of application identification information (ID) described with reference to FIG. 9(A) are stored in application ID saving area 68, and MAC addresses AD1, AD2 and AD3 as a list of MAC addresses are stored in MAC address list saving area 70. The data of MAC address list is used for MAC address filtering realized by comparison of MAC addresses in the communication between portable terminals, as will be described later.

Figure 10:
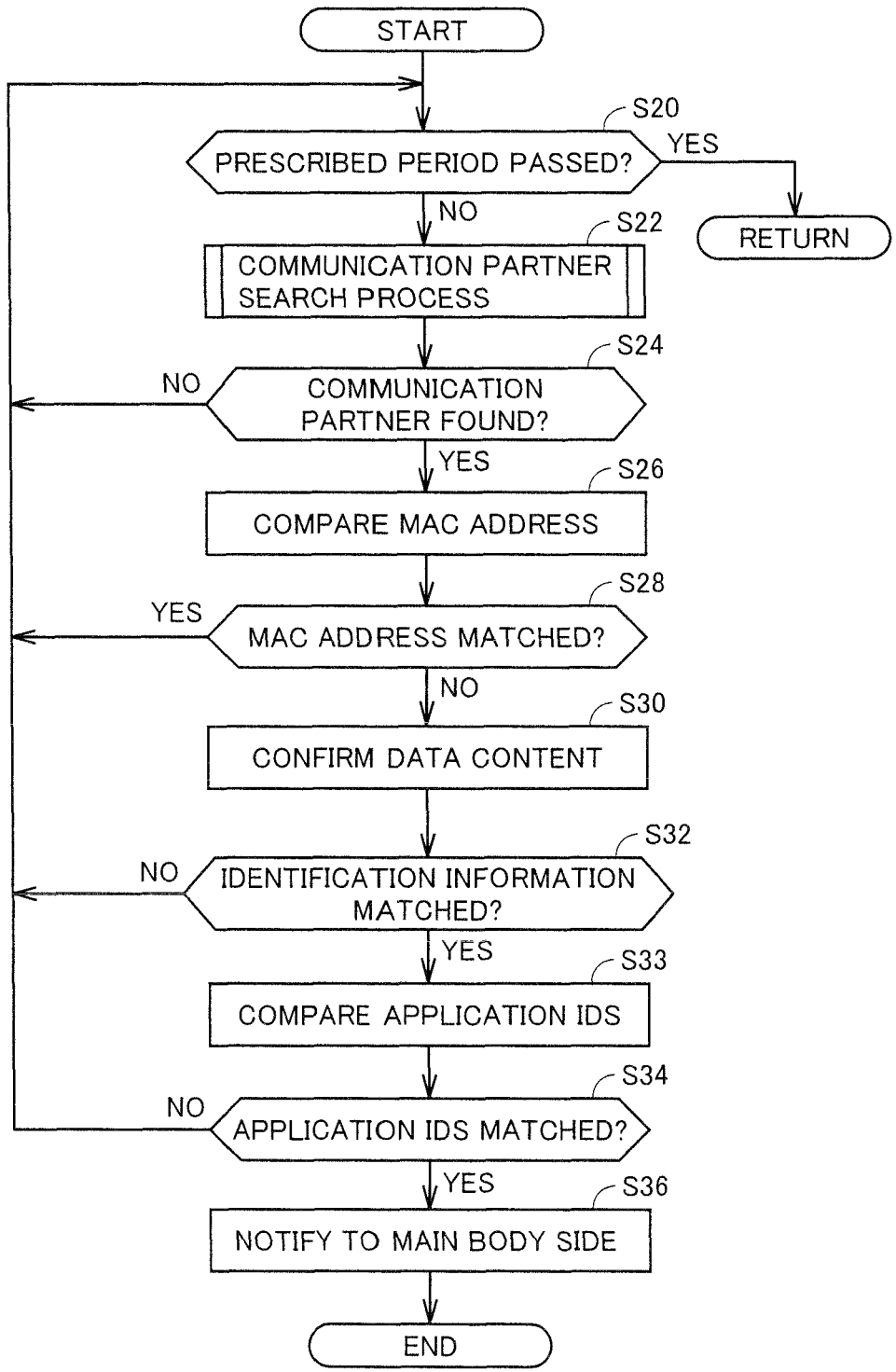
FIG. 10 represents communication between portable terminals in accordance with an embodiment of the present invention.

Referring to FIG. 10, the communication between portable terminals in accordance with an embodiment of the present invention will be described. The process involves the exchange partner searching process by wireless communication module 38 searching for a communication partner to exchange the exchange data, which is realized by CPU 60 executing an application for executing the process between portable terminals stored in ROM 72.

Referring to FIG. 10, first, CPU 60 determines whether or not a prescribed time period has passed (step S20). If it is determined at step S20 that the prescribed time period has not yet passed (NO at step S20), CPU 60 executes a communication partner search process, searching for a communication partner (another game machine) (step S22). The communication partner search process will be described later.

Next, CPU 60 determines whether or not a communication partner is found by the communication partner search process (step S24).

If a communication partner is found at step S24 (YES at step S24), CPU 60 compares MAC addresses (step S26). Specifically, it compares the MAC address included in the received data, as will be described later, with the MAC address stored in MAC address list saving area 70 described above. As described above, the MAC address is identification information identifying the object of communication, and a unique MAC address is allotted to each game machine.

Next, CPU 60 determines whether or not the MAC address of the said another game machine included in the received data matches the MAC address stored in the MAC address list (step S28).

If it is determined at step S28 that MAC addresses match (YES at step S28), CPU 60 returns to step S20. Specifically, communication with the said another game machine corresponding to the MAC address is terminated, without executing subsequent process steps.

Figure 11:
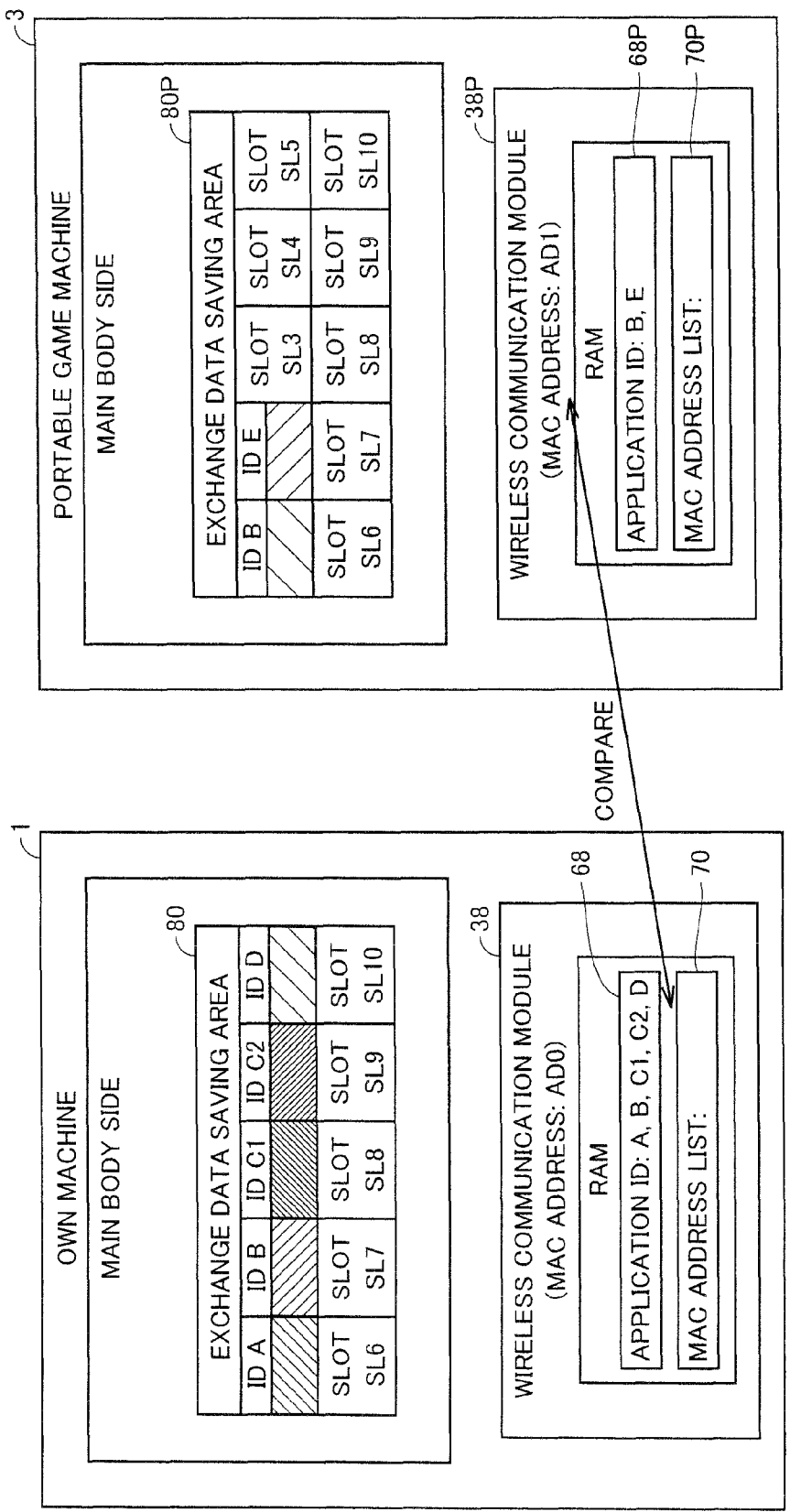
FIG. 11 shows concept of MAC address comparison in accordance with an embodiment of the present invention.

Referring to FIG. 11, a concept of comparing MAC addresses in accordance with an embodiment of the present invention will be described.

In the present example, communication connection between game machine 1 and a game machine 3 as another game machine and communication partner, will be described.

Referring to FIG. 11, here, exchange data are stored in slots SL1 to SL5 of exchange data saving area 80, on the side of game machine 1.

As described with reference to FIG. 9(A), in application ID saving area 68 of RAM 66 of wireless communication module 38, pieces of application identification information (ID) A, B, C1, C2 and D are stored.

Nothing is stored in the MAC address list.

Next, the side of game machine 3 will be described. Here, corresponding components of game machine 3 are denoted by the same reference characters with additional letter "P". Specifically, exchange data saving area 80 of game machine 1 corresponds to exchange data saving area 80P of game machine 3.

Further, wireless communication module 38 of game machine 1 corresponds to wireless communication module 38P of game machine 3. The same applies to other components.

Here, an example is shown in which exchange data are stored in slots SL1 and SL2 of exchange data saving area 80P of game machine 3.

In accordance with the same system, on the side of game machine 3 also, pieces of application identification information (ID) B and E are stored in application ID saving area 68P of wireless communication module 38P.

Nothing is stored in the MAC address list. Here, it is assumed that MAC address of the own machine, that is, game machine 1, is set to AD0.

Further, it is assumed that the MAC address of game machine 3 is set to AD1.

Here, MAC address AD1 of game machine 3 is not registered in the MAC address list of game machine 1 and, therefore, it is determined that MAC addresses do not match. Then, the process proceeds to the next step.

In the present example, the determination of MAC address list registration is described to be done by game machine 1. It is noted that the similar process is also executed on the side of game machine 3.

Figure 12:
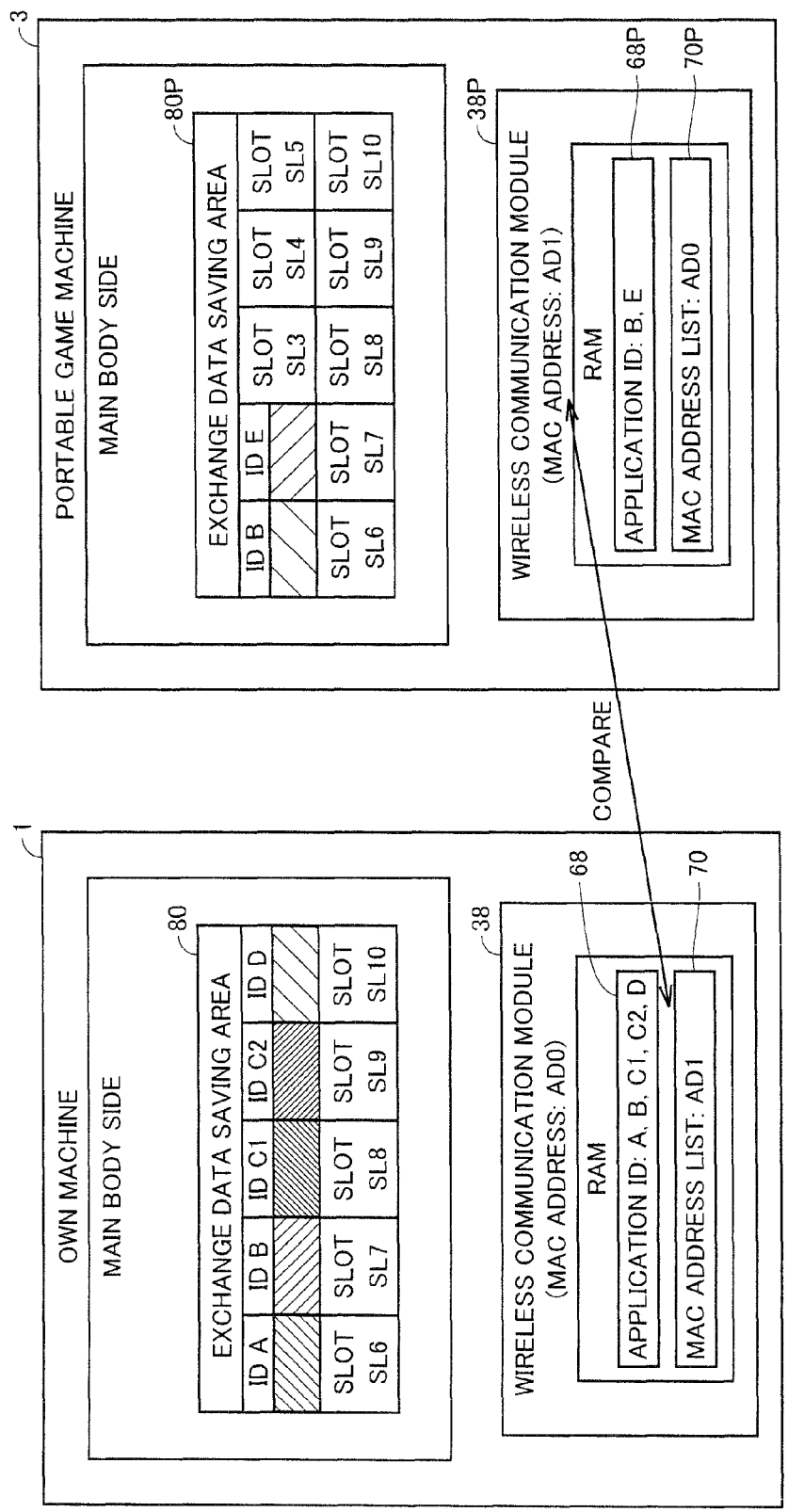
FIG. 12 shows another concept of MAC address comparison in accordance with an embodiment of the present invention.

Referring to FIG. 12, another concept of comparing MAC addresses in accordance with an embodiment of the present invention will be described.

As compared with the configuration of FIG. 11, the configuration of FIG. 12 is different in content registered in the MAC address list. Specifically, here an example is shown in which MAC address AD1 is registered in MAC address list saving area 70 of wireless communication module 38.

Similarly, in MAC address list saving area 70P on the side of game machine 3, MAC address AD0 is registered.

Here, since MAC address AD1 of game machine 3 is registered in the MAC address list of game machine 1, it is determined that MAC addresses match.

Therefore, here, subsequent process steps are not executed, and the process for establishing connection is not performed with game machine 3 as another game machine corresponding to the MAC address. Specifically, substantial communication is not executed with a game machine registered in the MAC address list.

Specifically, that a machine has the matching MAC address means communication has been done with the machine in the past, and that giving/receiving of exchange data has been done, or that communication was terminated because of lack of exchangeable data.

Therefore, in the game machine in accordance with the present embodiment, game machines in the communication area are repeatedly searched, and if a game machine is found, it is set as a communication candidate. By such an approach, it is possible that one same game machine is searched and found repeatedly. The MAC address filtering process described above prevents accumulative communication with the same game machine and, hence, efficient and effective data communication becomes possible.

As described above, the MAC address list stored in MAC address list saving area 70 of RAM 66 can be reset and erased after the lapse of a prescribed time period. Once the list is erased, it becomes possible to execute data communication with a machine with which communication process was done in the past. Specifically, the situation of the machine with which giving/receiving of exchange data was done in the past may have been changed in the prescribed time period (for example, new exchange data may have been set), and giving/receiving of exchange data may be possible. Therefore, whether or not exchange of exchange data is possible is again determined, and if possible, giving/receiving of exchange data may be executed.

Again referring to FIG. 10, if it is determined that MAC addresses do not match at step S28 (NO at step S28), CPU 60 confirms the content of received data (step S30).

Figure 13:
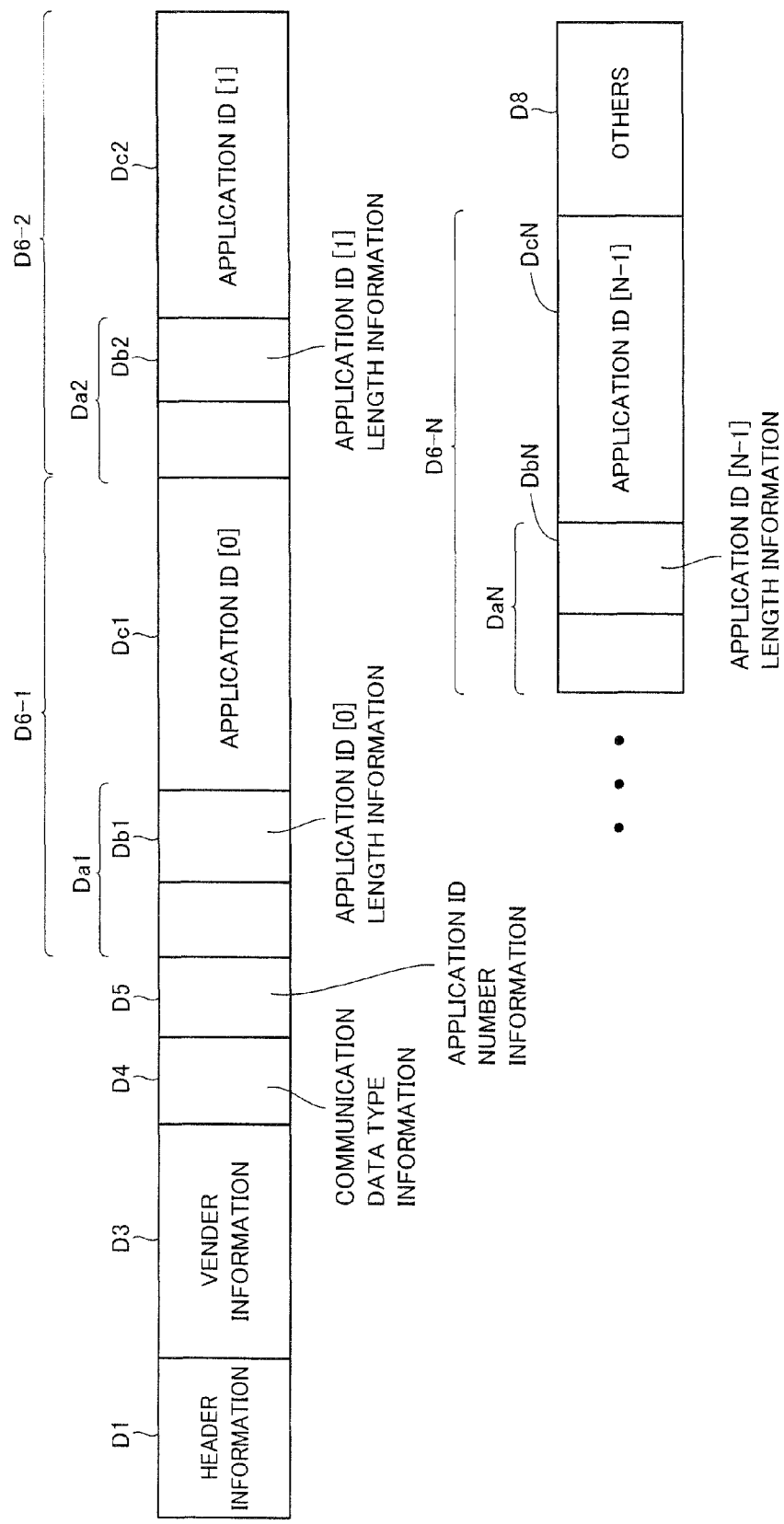
FIG. 13 shows a configuration of a wireless frame received by a game machine in the communication between portable terminals in accordance with an embodiment of the present invention.

Referring to FIG. 13, configuration of a wireless frame received by the game machine in the communication between portable terminals in accordance with an embodiment of the present invention will be described.

Referring to FIG. 13, first, header information D1 is provided at the head. This section includes data length and the MAC address described above.

Next, vender information D3 is provided, for identifying a company name or the like providing the data.

Next, communication data type information D4 follows, indicating the type of communication data included in the received data. In the communication between portable terminals, information indicating communication data of communication between portable terminals is stored.

Next, application ID number information D5 is provided, indicating the number of pieces of application identification information (ID) that follows.

Then, N pieces of application identification information (ID) 6-1 to 6-N are provided.

Though an example including N pieces of application identification information (ID) is shown here, what is necessary is at least one piece of information.

As regards the application identification information (ID), by way of example, application identification information (ID) 6-1 is divided into header information Da1 and application ID data Dc1 as the data body, of application identification information (ID) 6-1. Header information Da1 includes length information Db1 indicating the length of application ID data.

Similarly, application identification information (ID) 6-2 is divided into header information Da2 and application ID data Dc2 as the data body, of application identification information (ID) 6-2. Header information Da2 includes length information Db2 indicating the length of application ID data. The same applies to other pieces of application identification information (ID) and, therefore, details thereof will not be repeated.

Since the application identification information (ID) is included as data in the wireless frame, it is possible for the side receiving the wireless frame to determine whether exchange data of the same application is included, based on the application identification information (ID). What is required here is simply to determine matching or not matching. Therefore, it is unnecessary to transmit the application identification information (ID) itself. By way of example, a hash value based on hash function may be transmitted, and data comparison may be made on the receiving side. Similar approach is possible for other pieces of information.

Further, "others" information D7 is provided. As "others" information, data including an identification code used for wireless communication, SSID (Service Set Identifier), and wireless channel (frequency) set for avoiding radio wave interference are stored.

The wireless frame is transmitted to unspecified destinations (game machines), and received by unspecified destinations (game machines). As will be described later, the game machine as the master side (base) repeats transmission without specifying addresses. A game machine (client) receiving the wireless frame transmits a wireless frame based on the data of itself to the game machine (base) that transmitted the wireless frame, and as the data is given/received, unspecified game machines execute communication process with each other.

Though a wireless frame including one IE (Information Element) data (vender information, communication data type information indicating type of communication data, application identification information) has been described as an example here, the frame is not limited to the above. A wireless frame including a plurality of other IE data used for wireless communication may be used. In that case, header information of wireless frame will be added to the plurality of IE data.

Again referring to FIG. 10, next, CPU 60 determines whether or not the pieces of identification information included in the received data match (step S32). Specifically, it determines whether or not the pieces of vender information, indicating a company or the like providing the data described with reference to FIG. 13 match. That the pieces of vender information match means sources of transmitted data are devices of the same type allowing communication connection, and that the pieces of information do not match means sources of transmitted data are devices of totally different types, and connection for communication is impossible.

Further, it determines whether pieces of communication data type information indicating the type of communication data match. That the pieces of communication data type information match means the data are data for communication between portable terminals. As will be described later, in the communication between portable and fixed terminals, the communication data type information included in the data output from fixed terminal 5 is different. Therefore, if the data output from fixed terminal 5 happens to be received in the communication intended between portable terminals, the data can be rejected as the communication data type information is different, and thus, communication only with the game machine of the same type is possible. It is assumed that the vendor information as the object of comparison on the side of game machine 1 is registered in advance in ROM 72. Further, the communication data type information as the object of comparison on the side of game machine 1 is also registered in advance in ROM 72. CPU 60 switches the communication data type information depending on whether the communication is between portable terminals or between a portable terminal and a fixed terminal, and determines whether or not the type matches the communication data type information included in the received data.

Specifically, if it is determined at step S32 that the pieces of identification information do not match (NO at step S32), CPU 60 returns the control again to step S20. Therefore, subsequent process steps are not executed with a machine that cannot be connected for communication, and communication ends.

Next, if it is determined at step S32 that pieces of identification information match (YES at step S32), pieces of application identification information (ID) are compared (step S33).

Then, CPU 60 determines whether or not the pieces of application identification information (ID) match (step S34). Specifically, the list of application identification information (ID) stored in application ID saving area 68 of itself is compared with the list of application identification information (ID) included in the received data, to find at least one matching ID. Specifically, here, it is determined whether the machines have exchange data that can be exchanged with each other through communication connection. If the application identification information (ID) is the same, it means that the exchanged data can be used by executing the same application. Even if the application identification information (ID) is not the same, the determination at step S34 may be YES, if there is a data-compatible application and the application identification information (ID) represents such a compatible application.

Figure 14:
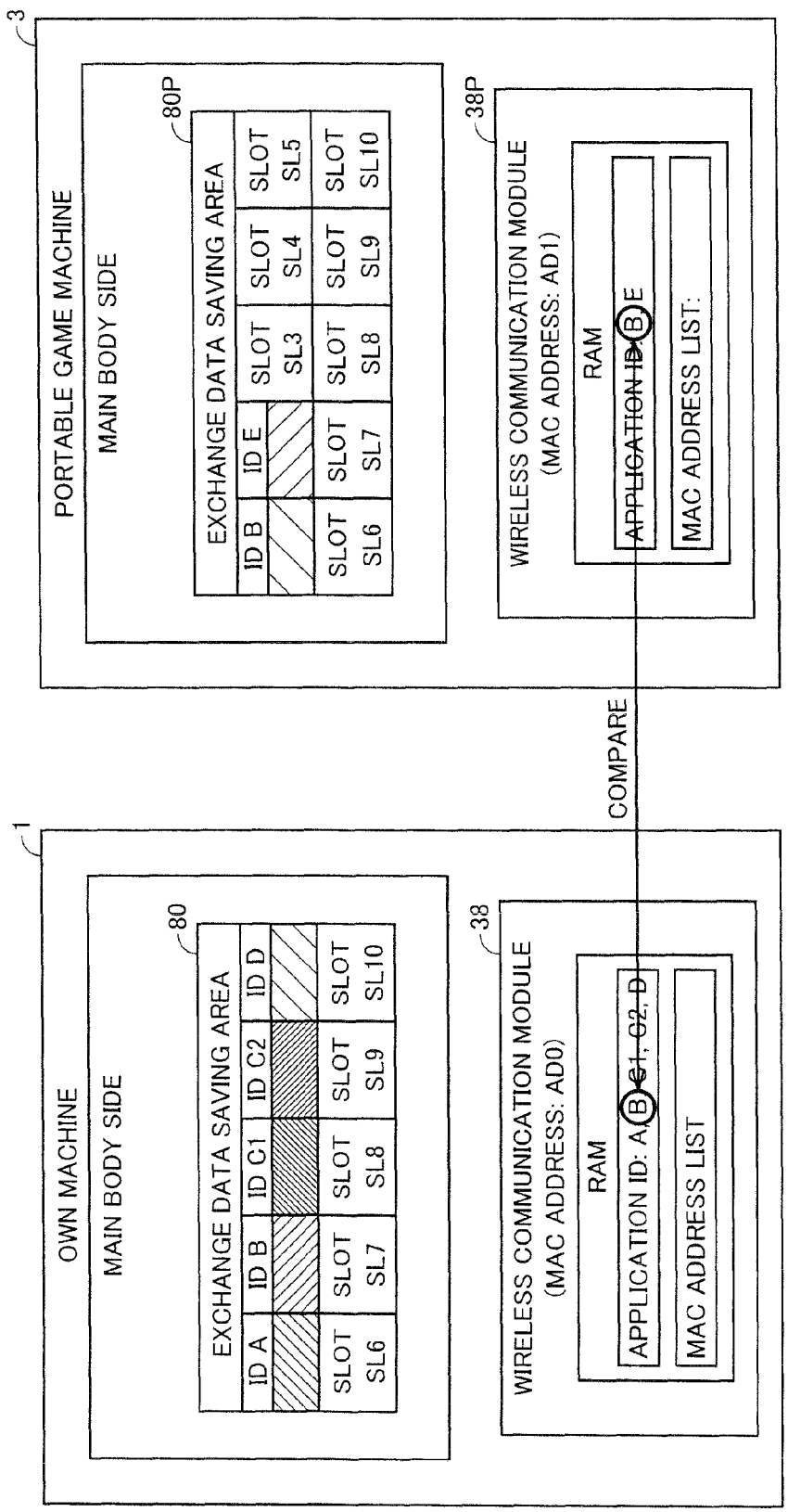
FIG. 14 shows a concept of comparison of application identification information (ID) in accordance with an embodiment of the present invention.

Referring to FIG. 14, a concept of comparing the application identification information (ID) in accordance with an embodiment of the present invention will be described.

FIG. 14 shows situations of game machines 1 and 3 similar to the example of FIG. 11. In application ID saving area 68 of RAM 66 of wireless communication module 38, pieces of application identification information (ID) A, B, C1, C2 and D are stored. In application ID saving area 68P of wireless communication module 38P of game machine 3, pieces of application identification information (ID) B and E are stored.

Here, as described above, determination is made as to whether the application identification information (ID) included in the received data matches the application identification information (ID) stored in application ID saving area 68. In this example, the piece of application identification information (ID) B matches.

Again referring to FIG. 10, if it is determined that pieces of application identification information (ID) match (YES at step S34), CPU 60 notifies (sends a notice to) the main body side that another game machine having exchange data corresponding to the matching application identification information (ID) is found (step S36). Then, the process ends (END).

The subsequent process for giving/receiving data, in which connection with another game machine as the communication partner is established and giving/receiving of exchange data corresponding to the matching application identification information (ID) is executed, is executed as an application of CPU 31 on the main body side, using wireless communication module 38.

Therefore, with this notice that another game machine having the exchange data is found given to the main body side, data communication executed independently by CPU 60 of wireless communication module 38, that is, the exchange partner searching process of searching for a communication partner to exchange the exchange data carried out by wireless communication module 38, is completed.

If it is determined at step S34 that application IDs do not match (NO at step S34), CPU 60 returns the control to step S20.

With this process, only when a communication partner capable of exchange is found through the exchange partner searching process by wireless communication module 38, a notice is issued to CPU 31 as the main body, connection with the communication partner is established, and giving/receiving of exchange data is executed. Assume that CPU 31 as the main body is in a sleeping state, and a communication partner is found by the exchange partner searching process by wireless communication module 38. Even in that case, if the exchange is impossible, notice to CPU 31 as the main body is not issued, and communication connection is not established. Therefore, power consumption of game machine 1 as a whole can be reduced.

Here, comparison of application identification information (ID) mentioned above will be described.

Figure 15:
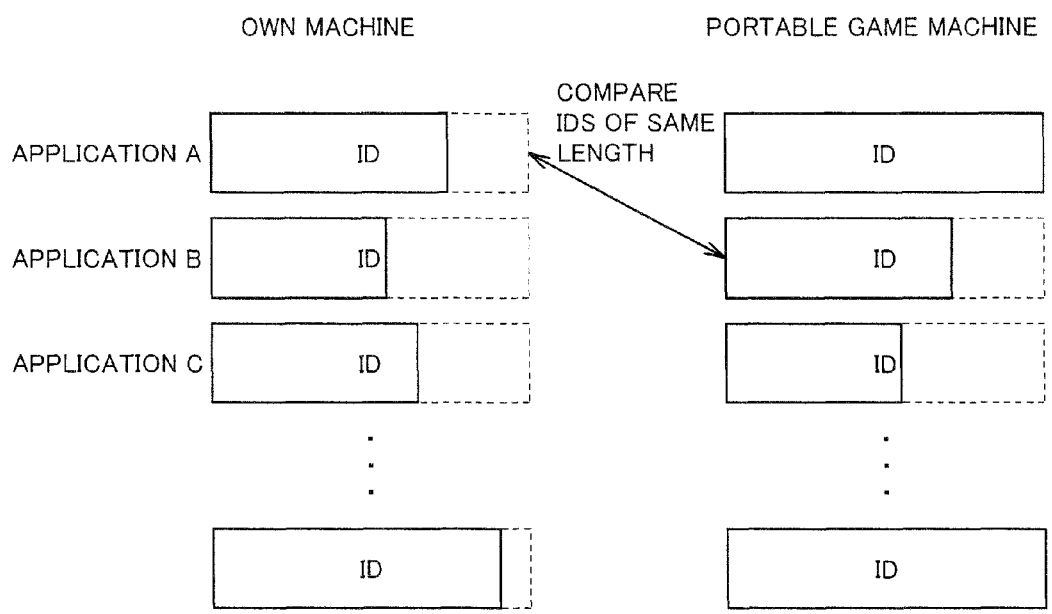
FIG. 15 illustrates a manner of comparison of application identification information (ID) in accordance with an embodiment of the present invention.

Referring to FIG. 15, comparison of application identification information (ID) in accordance with an embodiment of the present invention will be described.

As shown in FIG. 15, when pieces of application identification information (ID) of game machine 1 as the own machine and pieces of application identification information (ID) included in the data received from game machine 3 are to be compared, pieces of application ID data having the same length are compared.

Specifically, using the length information indicating the length of application ID data described above, included in application identification information (ID), data comparison is done only with the application ID having the matching length information.

Since data of the same length are used, it is unnecessary to execute comparison with application ID data of different length. Therefore, it becomes possible to quickly determine whether pieces of application identification information (ID) match.

Referring to FIG. 16, another manner of comparison of application identification information (ID) in accordance with an embodiment of the present invention will be described.

FIG. 16(A) shows an example of application identification information (ID) 6-1 having the header information Da1 changed to header information Da1#. Specifically, it is different in that application ID type information is additionally included in the header information. Other parts are the same.

FIG. 16(B) shows a table representing values stored in the application ID type information and corresponding methods of comparison.

Specifically, if the application ID type information is "0", application ID data of the same length are compared entirely.

Here, if the application ID type information is "1", only a part of the data (for example, only a predetermined number of bits) of the application ID data of the same length are compared.

If the application ID type information is "2", bit comparison is executed in accordance with a prescribed method different from that when application ID identification information is "0", on the application ID data of the same length.

If the application ID type information is "0", the method is the same as described with reference to FIG. 15. If the application ID type information is "1", bits of a prescribed length of the application ID data of the same length are compared, and if the bits of the prescribed length match, it is determined that the application ID data match. That the application ID data have the same length and the data of prescribed length of bits thereof are the same, it is highly likely that the application ID data are the same. Thus, it is possible to more quickly determine whether or not the pieces of application identification information match.

FIG. 16(C) shows bit comparison when the application ID type information is "2".

Referring to FIG. 16(C), this example shows application ID data including not only the application specifying information (application name information) for specifying the application such as the application name but also appendix information.

As the appendix information, a piece of information related to a character which the user of own machine wants, and a piece of information related to a character which the user of own machine offers, are stored using at least a part of application ID data of the own machine.

On the side of another game machine, not only the application name information but also appendix information is stored, including a piece of character information the user of another game machine wants and a piece of character information the user of another game machine offers, using at least a part of application ID data.

Then, determination is made as to whether the pieces of application name information match, as to whether the piece of character information the user wants included in the application ID data of the own machine matches the piece of character information offered included in the application ID data of another game machine, and as to whether the piece of character information offered included in the application ID data of the own machine matches the piece of character information wanted included in the application ID data of another game machine. If the pieces of application information match and pieces of character information as exchange conditions also match, it is determined that pieces of application identification information (ID) match.

By the comparing method described above, before actually exchanging the exchange data between game machine 1 as the own machine and game machine 3 as another game machine, if it is determined based on the content of exchange data to be exchanged that the exchange data are mutually desired data, satisfaction of exchange conditions is notified to the main body. If either one does not wish exchange, communication ends as the exchange conditions are not satisfied. Therefore, it becomes possible to exchange only the exchange data wanted by the users. Specifically, by setting sophisticated conditions, it becomes possible to avoid undesirable process for giving/receiving data, and hence, zest in using the game machine as the information processing apparatus increases.

Figure 17:
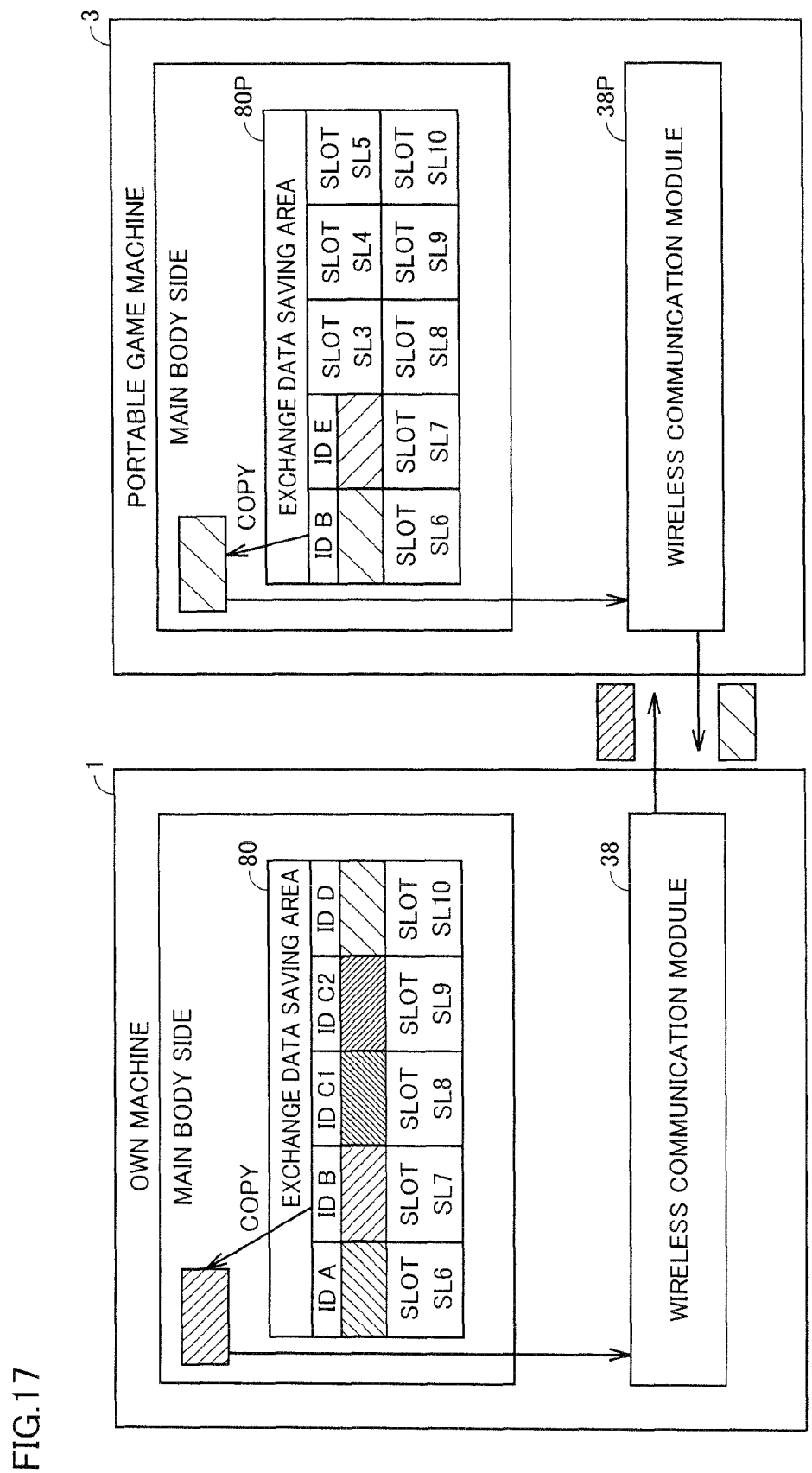
FIG. 17 is a (first) illustration representing a process for exchanging exchange data between game machines in accordance with an embodiment of the present invention.
Figure 18:
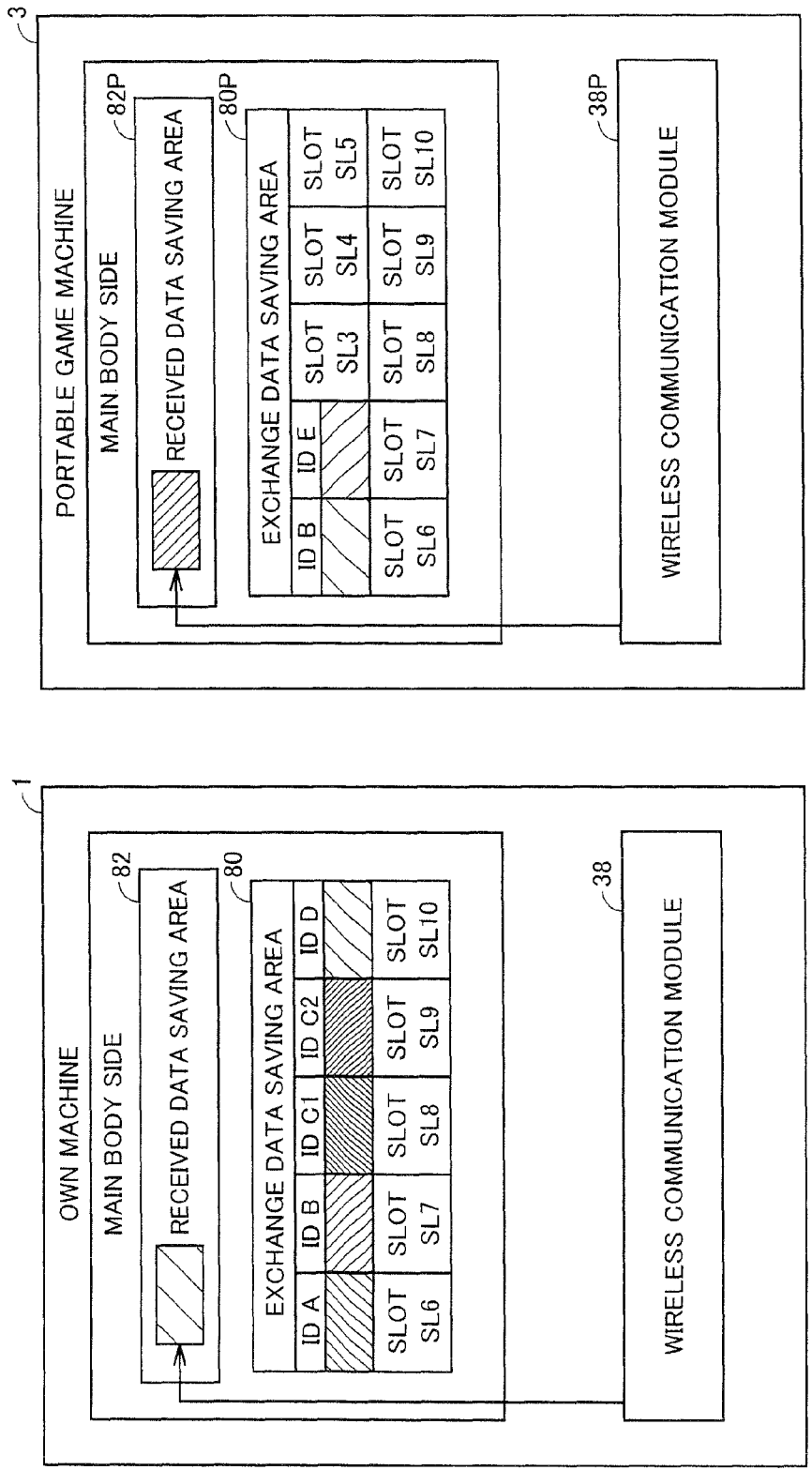
FIG. 18 is a (second) illustration representing a process for exchanging exchange data between game machines in accordance with an embodiment of the present invention.

Referring to FIGS. 17 to 19, the process for exchanging exchange data between the game machines in accordance with the present embodiment will be described.

In this example, execution of the process for giving/receiving exchange data between game machine 1 and game machine 3 as another game machine and a communication partner, will be described.

As described above, receiving a notice from wireless communication module 38 that another game machine having the exchange data corresponding to the matching application identification information (ID) has been found, CPU 31 executes the process for giving/receiving data.

Referring to FIG. 17, first, data is read from a slot (exchange data saving area 80) storing the exchange data corresponding to the matching application identification information (ID), and copied. By way of example, copy data is formed in main memory 32. Then, the copy data is transmitted to game machine 3 through wireless communication module 38.

In game machine 3 also, a notice that another game machine having the exchange data corresponding to the matching application identification information (ID) has been found is output from wireless communication module 38P to the main body, as in game machine 1.

Then, on the main body side, data is read from a slot (exchange data saving area 80) storing the exchange data corresponding to the matching application identification information (ID), and copied. The copy data is transmitted to game machine 1 through wireless communication module 38P.

Referring to FIG. 18, CPU 31 as the main body of game machine 1 obtains the exchange data transmitted from game machine 3 through wireless communication module 38, and stores, together with the application identification information (ID), in received data saving area 82.

Similarly, the CPU as the main body of game machine 3 obtains the exchange data transmitted from game machine 1 through wireless communication module 38P, and stores, together with the application identification information (ID), in received data saving area 82P.

Then, referring to FIG. 19, the data in the slot that has stored the exchange data in exchange data saving area 80 of game machine 1 is erased. In the present example, data in the area corresponding to slot SL2 of exchange data saving area 80 is erased.

Similarly, the data in the slot that has stored the exchange data in exchange data saving area 80P of game machine 3 is erased. In the present example, data in the area corresponding to slot SL1 of exchange data saving area 80P is erased.

By this process, the exchange data that has been transmitted to the communication partner is erased, and hence, the exchange data exchanging process is completed.

As will be described later, erasure of exchange data is carried out as the data in the exchange data saving area is erased when the application using the exchange data that has been stored in the slot is activated and the application is executed.

Though the exchange data is erased in the present example, the exchange data may not be erased but maintained as it is. In that case, what takes place is not an exchange data exchanging process but giving/receiving of replicated data.

Though an example in which one exchange data corresponding to matching application identification information (ID) is subjected to the exchange process is described here, what is exchanged is not limited to one exchange data. If a plurality of exchange data exist corresponding to the matching application identification information (ID), similar process is carried out for each exchange data.

Figure 20:
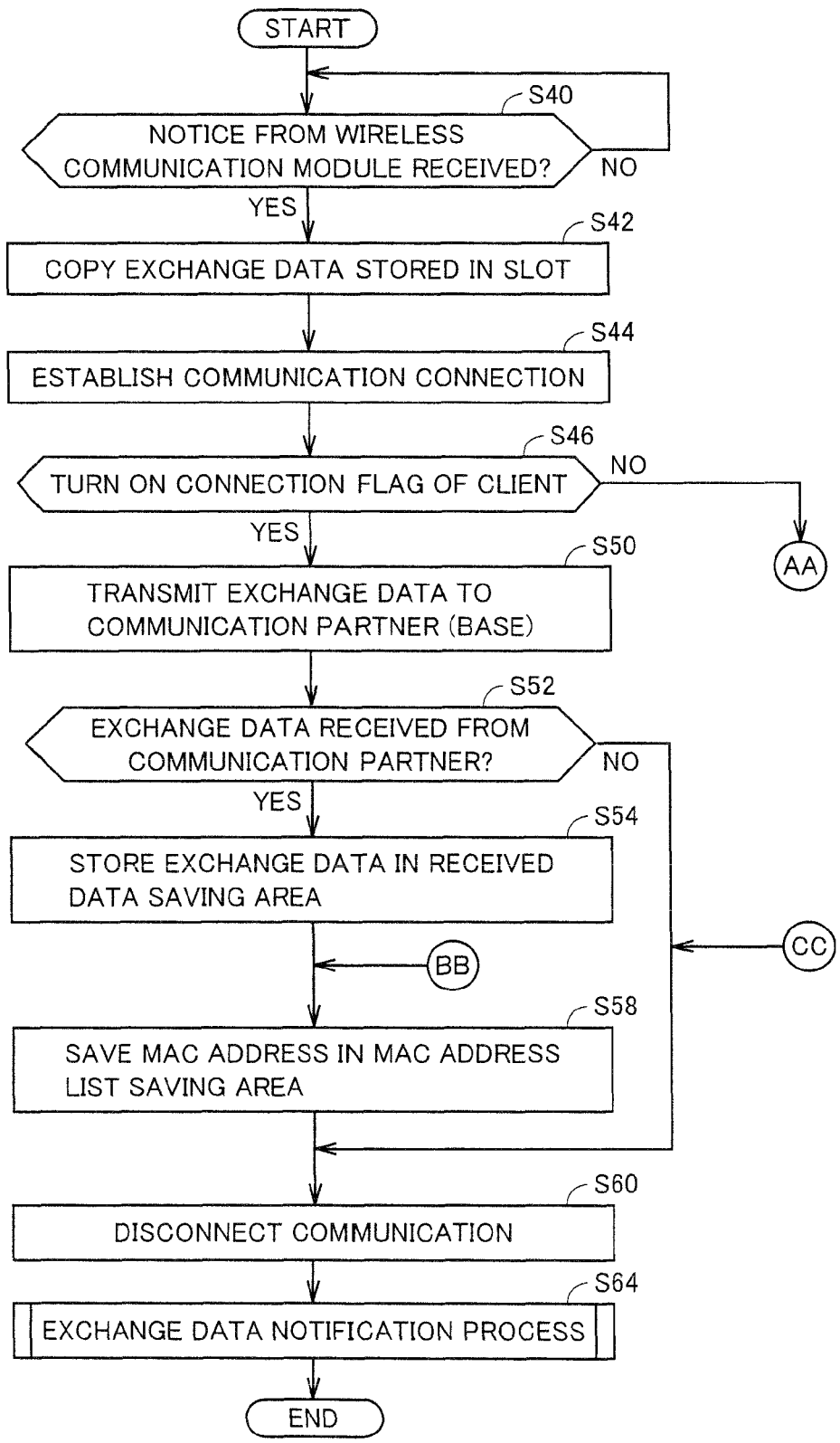
FIG. 20 is a (first) flowchart of an exchange data giving/receiving process.
Figure 21:
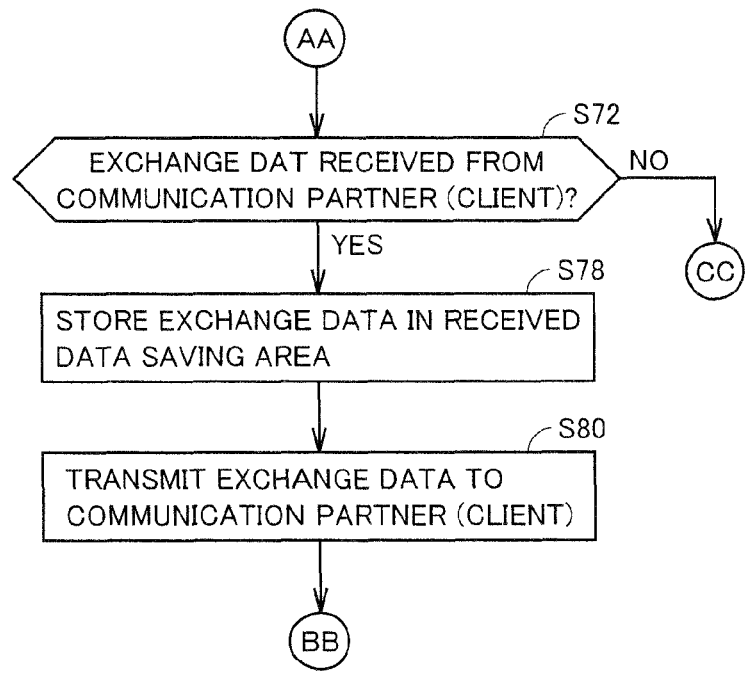
FIG. 21 is a (second) flowchart of an exchange data giving/receiving process.

Referring to FIGS. 20 and 21, the process flow of giving/receiving data as above will be described. The data giving/receiving process is realized by CPU 31 executing a system program stored in system program saving area 86 mentioned above. The data giving/receiving process starts, for example, when the main body is activated, and it is continuously executed on the background.

Referring to FIG. 20, first, CPU 31 determines whether or not there is any notice from wireless communication module 38 (step S40).

If it is determined that a notice is received from wireless communication module 38 (YES at step S40), CPU 31 copies the exchange data corresponding to the matching application identification information (ID) stored in a slot, from exchange data saving area 80 (step S42). Specifically, as described with reference to FIG. 17, CPU 31 forms copy data in main memory 32.

Next, based on connection information such as MAC address of the communication partner included in the notice that a game machine having the exchange data has been found transmitted from wireless communication module 38, CPU 31 establishes communication connection with the communication partner (step S44). Here, an example in which connection with the communication partner is established after receiving the notice that a game machine is found is described, that is, an example in which connection is executed by CPU 31, is described. It is also possible to execute the process for establishing connection with the communication partner before receiving the notice that a game machine is found, for example, between steps S34 and S36 of FIG. 10, by wireless communication module 38.

Of the two game machines executing the process for giving/receiving data, one serves as a base and one as a client. Here, it is assumed that a game machine as a client, which issued the connection request signal, outputs the exchange data to the game machine as the base. Here, description will be given assuming that game machine 1 is a client.

Next, CPU 31 determines whether or not a connection flag of a client is on, to determine whether the own machine is a base or a client (step S46). Setting of the connection flag will be described later.

If the connection flag of a client is on, that is, if it is determined that the own machine is a client (YES at step S46), it transmits the exchange data to the communication partner (base) (step S50).

If the connection flag as a client is not on, that is, if it is determined that the own machine is a base (NO at step S46), the flow proceeds to "AA". The process steps after "AA" are processes on the base side, which will be described later.

Next, CPU 31 determines whether or not the exchange data has been received within a prescribed time period from the communication partner (base) (step S52).

If it is determined at step S52 that the exchange data has been received within the prescribed time period (YES at step S52), CPU 31 stores the exchange data in received data saving area 82 (step S54). Specifically, as described with reference to FIG. 18, the exchange data received through wireless communication module 38 is stored together with the application identification information (ID) in received data saving area 82.

Next, CPU 31 stores the MAC address identifying the communication partner in MAC address list saving area 88 provided in saving data memory 34 (step S58). The MAC address saved in MAC address list saving area 88 comes to be included as a part of the MAC address list, and used in the communication initializing process described above.

By the communication initializing process, the MAC address list is saved in MAC address list saving area 70 and, therefore, by the MAC address filtering process described above, accumulative communication with the same game machine can be prevented and, hence, efficient and effective data communication can be executed.

In the present example, the MAC address list stored in MAC address list saving area 88 provided in saving memory 34 on the main body side and the MAC address list stored in MAC address list of wireless communication module 38 are the same, and the method described above may be realized using only the MAC address list saving area 70.

On the other hand, by providing MAC address saving area in saving memory 34 on the main body side and saving the MAC address in MAC address saving area 88, it becomes possible to facilitate edition of MAC address data such as addition or deletion, than data edition in MAC address saving area 70 that requires an access to wireless communication module 38.

Next, CPU 31 disconnects communication with the communication partner (base) (step S60). By this process, the process for giving/receiving the exchange data with the communication process ends.

Next, CPU 31 executes an exchange data notification process (step S64). The exchange data notification process will be described later. Then, the process ends. (END).

If it is determined at step S52 that CPU 31 has not received the exchange data from the communication partner (base) within the prescribed time period (NO at step S52), the control proceeds to step S60. In that case, it means that the exchange data could not be successfully received and, therefore, communication is disconnected without saving the MAC address in MAC address list saving area 70. Therefore, it is possible to again execute the process described above in accordance with communication between portable terminals, to resume the process for giving/receiving the exchange data.

Next, the process on the base side will be described.

Here, a process when game machine 1 serves as a base will be described.

On the base side, the process steps S40 to S44 described with reference to FIG. 20 are the same as the client side process.

Referring to FIG. 21, if the connection flag of a client is not on, that is, connection flag as a base is on and it is determined that the own machine is a base (NO at step S46), CPU 31 determines whether or not the exchange data has been received within a prescribed time period from the communication partner (client) (step S72).

Next, if it is determined at step S72 that the exchange data has been received within the prescribed time period from the communication partner (client) (YES at step S72), the exchange data is stored together with the application identification information (ID) in data saving area 82 (step S78).

Next, CPU 31 transmits the exchange data to the communication partner (client) (step S80).

Next, the flow proceeds to "BB". Specifically, the flow proceeds to step S58 of FIG. 20. The following process steps are the same as described above.

If it is determined at step S72 that the exchange data has not been received within the prescribed time period from the communication partner (client) (NO at S72), CPU 31 next proceeds to "CC". Specifically, the flow proceeds to step S60 of FIG. 20.

Figure 22:
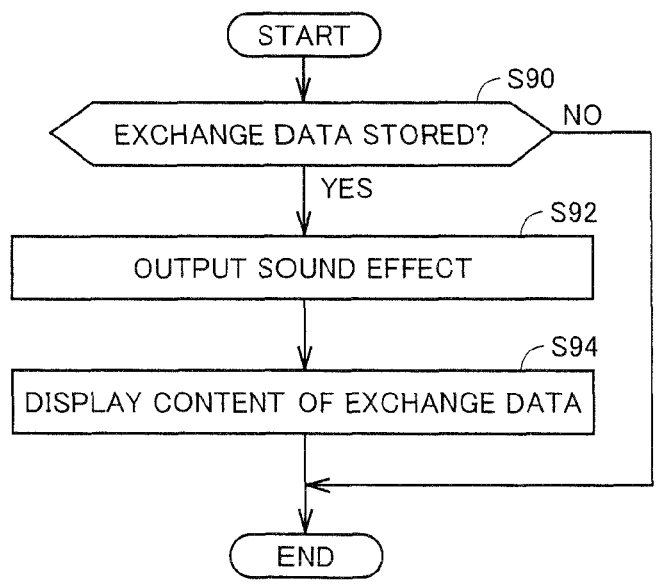
FIG. 22 represents an exchange data notifying process in accordance with an embodiment of the present invention.

Referring to FIG. 22, the exchange data notification process in accordance with an embodiment of the present invention will be described. The exchange data notification process is realized by CPU 31 executing a system program stored in system program saving area 86 mentioned above.

Referring to FIG. 22, CPU 31 determines whether or not the exchange data is stored in received data saving area 82 (step S90).

Then, if it is determined that the exchange data has been stored in received data saving area 82 (YES at step S90), CPU 31 output a sound effect (step S92). Specifically, CPU 31 instructs output of a sound prepared in advance from speaker 45 described with reference to FIG. 2. Then, CPU 31 displays the content of exchanged data (step S94). Specifically, CPU 31 instructs LCD 12 to output a display indicating presence of the exchange data. Then, the process ends (END).

By the output of sound effect from speaker 45 and the display on LCD 12, the user can recognize that the exchange data is stored.

That the exchange of exchange data is done is notified to the user by audio and visual notification using the sound effect from speaker 45 and the display on LCD 12 in the present example. Either one of these may be sufficient. Alternatively, exchange of exchange data may be notified to the user by sense of touch, by vibrating the game machine utilizing the vibration function.

As the exchange data is stored, it is assumed that the user activates the application that can use the exchange data. When the application is activated, the exchange data that has been stored in the exchange data saving area is erased.

Figure 23:
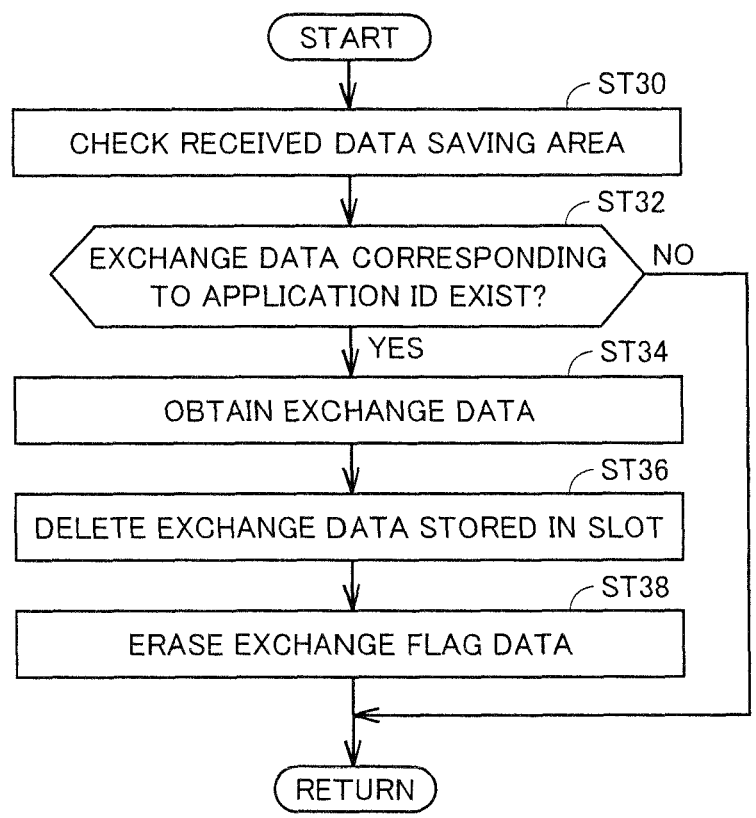
FIG. 23 represents the exchange data adding and erasing process shown in FIG. 5.

Referring to FIG. 23, the process for adding and erasing the exchange data described with reference to FIG. 5 will be described.

As described above, the process for adding and erasing the exchange data is realized by CPU 31 executing an application program stored in ROM 27 of memory card 26.

Referring to FIG. 23, first, CPU 31 checks the received data saving area 82 (step ST30).

Then, CPU 31 determines whether or not the exchange data that corresponds to the application ID of the application that is being executed with the data loaded exists in received data saving area 82 (step ST32).

Next, if it is determined that the exchange data corresponding to the application ID exists in received data saving area 82, CPU 31 obtained the exchange data (step ST34).

By these process steps, it becomes possible to execute the application using the obtained exchange data.

Here, the obtained exchange data may be transferred and saved as save data, in a save area (back-up RAM) of its own. Further, with this operation, the exchange data in received data saving area 82 may be erased.

Here, an example is described in which whether or not the exchange data exists in received data saving area 82 is determined, and if it exists in received data saving area 82, the exchange data is saved. At this time, the fact that the exchange data has been obtained (more preferably, content of the obtained exchange data) may be presented to the user. Further, it is possible to urge the user to select whether or not the exchange data is to be used.

Next, CPU 31 deletes the exchange data that corresponds to the application ID stored in the slot (step ST36).

Here, the exchange data stored as save data in the save area (back-up RAM) of its own may be deleted.

By this process, the exchange data corresponding to the application ID that has been stored in the slot of exchange data saving area 80 is deleted and, thus, the process for giving/receiving the exchange data is completed.

Next, as the exchange data that has been stored in exchange data saving area 80 is deleted, CPU 31 erases the exchange flag data that has been stored in back-up RAM 28 (step ST38).

Then, the process ends (RETURN).

Then, the flow proceeds to step ST4, as described with reference to FIG. 5.

Here, an example has been described in which at the time of activating the application, the received data saving area 82 is checked based on presence/absence of the exchange flag data, and if the exchange data exists, the exchange data stored in the received data saving area 82 is obtained and the exchange data stored in exchange data saving area 80 is deleted. It is also possible to delete the exchange data stored in exchange data saving area 80 even if the application is not activated. By way of example, in response to CPU 31 storing exchange data from another game machine in received data saving area 82, an instruction may be issued to delete the exchange data stored in exchange data saving area 80.

<Communication Partner Search Process>

Next, referring to FIGS. 24 to 27, the communication partner search process at step S22 (FIG. 10) mentioned above will be described.

In this process, game machine 1 as a base or a client executes data communication for searching for a communicable partner with other game machines.

Trying data communication, game machine 1 transmits a connection request signal including exchange determination data, to unidentified addresses, to search for another game machine existing in communication range 10 (though a method of periodically and repeatedly transmit the connection request signal including the exchange determination signal will be described in the present example, a so-called probe request method may be used). The exchange determination data is the wireless frame including the application identification information and the like described with reference to FIG. 13.

In this example, it is assumed that the game machine as a client transmits the connection request including the exchange determination data. The game machine as the base waits until the connection request signal including the exchange determination data is received. If the signal is received, in response, it transmits a connection response signal including the exchange determination data of the game machine as the base, to the game machine as the client.

By the transmission/reception of the connection request signal and the connection response signal, data communication between the game machines as the base and client becomes possible. Though an example in which the connection request signal is transmitted from the game machine as a client and the connection response signal is transmitted by the game machine as a base is described here, the relation between the base and client may be reversed.

In the communication partner search process, each game machine 1 alternately repeats the process of operating as a base to receive the search from a client, and the process of operating as a client to search for a base.

Specifically, using a prescribed time period (Tcycle of FIG. 24) as one period, part of each period is used as a period for a client operation (Tsp in FIG. 24) and remaining part is used as a period for a base operation (Tsc). Here, connection is possible between a game machine operating as a client and a game machine operating as a base, while connection is impossible between a game machine operating as a client and another game machine operating as a client, and between a game machine operating as a base and another game machine operating as a base.

Therefore, if the period for operating as a client and the period for operating as a base are fixed, data communication is impossible between game machines that happen to have the periods fixed in matching manner.

In order to prevent such a problem, the ratio or arrangement of the period for operating as a client and the period for operating as a base is set to be changed at random.

A method of changing the ratio at random corresponds to "communication partner search process (1)" shown in FIG. 24(A), and a method of changing the arrangement at random corresponds to "communication partner search process (2)" shown in FIG. 24(B).

Referring to FIG. 24(A), in communication search process (1), the ratio of Tsp and Tsc is determined at random. The time period of this process is determined to be a fixed value of Tcycle (for example, 4 seconds), the length of Tsc is determined to be a random value of 0 to Tcycle, and the length of Tsp is determined to be (Tcycle−Tsc). Further, Tsc and Tsp are set in this order in Tcycle. Since the length of Tsc is determined at random every time, the length of Tsp is also determined at random. Thus, the situation in which data communication cannot be executed with another game machine existing in communication range 10 can be avoided. If the time period Tsp becomes too short, it becomes difficult to accurately search for another game machine, preventing execution of data communication with another game machine. Therefore, it may be preferable to set a minimum period of Tsp and if such period cannot be ensured, the value Tsc may be determined again.

Though Tsc and Tsp are determined in this order to set Tcycle here, it may be set with the order reversed.

Referring to FIG. 24(B), in communication search process (2), arrangement of Tsp and Tsc is determined at random, as described above. In other words, the length of Tsp is fixed, and the position of starting Tsp in Tcycle is set at random. Specifically, as shown in FIG. 24(B), in communication partner search process (2), Tcycle (here, a fixed value set to 4 seconds) includes Tsp determined to be a fixed value, and Tsc1 and Tsc2 determined at random and provided before and after Tsp. Specifically, in Tcycle, Tsc1, Tsp and Tsc2 are provided in this order. Further, the length of Tsc1 is determined at random between 0 to (Tcycle−Tsp), and the length of Tsc2 is determined by subtracting the randomly determined Tsc1 and Tsp from Tcycle.

Though the start position of Tsp is set at random as Tsc and Tsp are determined in this order to set Tcycle here, the start position of Tsc may be set at random if Tcycle is set with Tsp and Tsc determined in this order.

In communication partner search process (1) or (2), in the time period Tsp, game machine 1 repeats the process of transmitting the connection request signal including the exchange determination data to unspecified addresses and thereafter trying to receive the connection response signal including the exchange determination data transmitted from another game machine 3. In the time period Tsc, game machine 1 repeats the process of trying to receive the connection request signal including the exchange determination data transmitted from another game machine and if the signal is successfully received, transmitting a connection response signal including the exchange determination data.

Further, in order to prevent wasteful power consumption, game machine 1 is adapted to transmit the connection request signal including the exchange determination signal at every prescribed period (in this example, 64 ms), while it is operating as a client. Specifically, data transmission is done intermittently.

In the following, communication partner search process (1) and communication partner search process (2) will be described in detail with reference to flowcharts, respectively.

Figure 25:
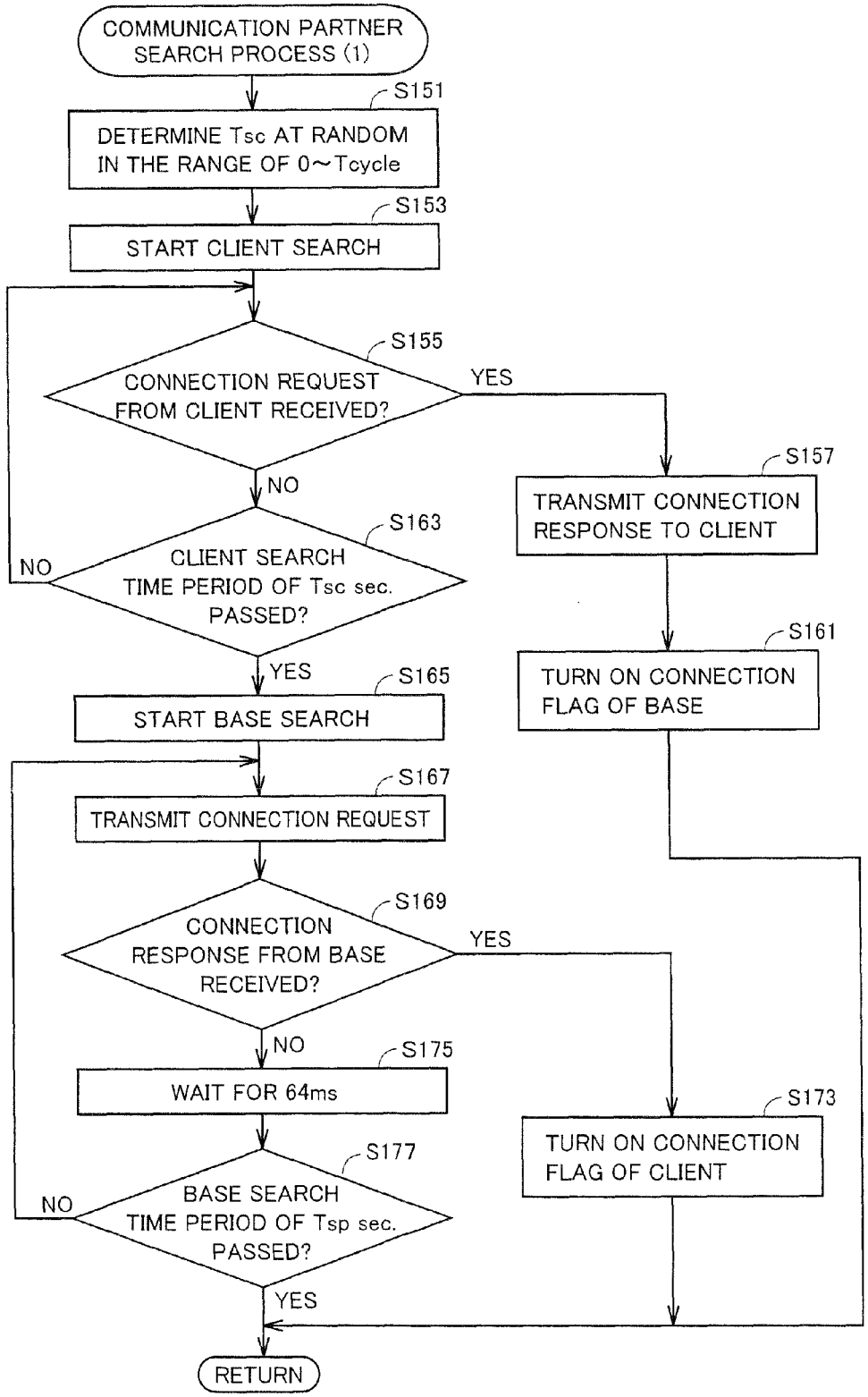
FIG. 25 is a flowchart representing a communication partner search process (1).

FIG. 25 is a flowchart representing communication partner search process (1).

Referring to FIG. 25, when communication partner search process (1) starts, at step S151, Tsc is determined at random between 0 to Tcycle. Though not shown, since Tcycle is a fixed value, when Tsc is determined, Tsp is also determined.

Following steps S153 to S163 are the process steps executed in Tsc mentioned above, in which the game machine operates as a base and searches for a client. Steps S165 to S177 are the process steps executed in Tsp mentioned above, in which the game machine operates as a client and searches for a base.

At step S153, searching for a client starts. Though not shown, a timer circuit starts here. Next, at step S155, whether or not the connection request signal including the exchange determination data has been received from a client is determined.

If the connection request signal including the exchange determination data has been received from a client (YES at S155), a connection response signal including the exchange determination signal is transmitted to the client at step S157, and a connection flag as a base is turned on at step S161 and the communication partner search process (1) returns. Specifically, it is made clear that the game machine is capable of communication connection as a base to another game machine.

Though not shown in FIG. 25, when communication partner search process (1) starts, the connection flag as a client is turned off (reset) (the same applies to the connection flag as a base, as will be described later).

If a connection request signal including the exchange determination data is not received from any client (NO at S155), at step S163, whether or not the time period of Tsc seconds as the client search time period, that is, the period in which the game machine is a base and connection from another game machine is tried, has passed is determined.

If the client search time period Tsc has not been expired at step S163 (NO at S163), the flow directly returns to step S155.

If the client search time period of Tsc seconds has passed (YES at step S163), searching for a base starts at step S165, that is, the timer circuit is reset and started, and at step S167, the connection request signal including the exchange determination data is transmitted to unspecified addresses.

Next, at step S169, whether or not the connection response signal including the exchange determination data is received from a base is determined. If the connection response signal including the exchange determination data is received from a base (YES at S169), the connection flag as a client is turned on at step S173, and communication partner search process (1) is returned. Specifically, it is made clear that the game machine is capable of communication connection as a client to another game machine.

If the connection response signal including the exchange determination data is not received from a base (NO at step S169), at step S175, the control waits for 64 ms, and at step S177, whether or not the time period of Tsp seconds, that is, base search time period in which the game machine as a client tries to connect to another game machine, has passed is determined.

If the base search time period of Tsp seconds has not yet passed (NO at step S177), the flow directly returns to step S167.

If the base search time period of Tsp seconds has passed (YES at step S177), it is determined that the time period Tcycle has passed, and communication partner search process (1) is returned.

Since the flow waits for 64 ms at step S175, the process of repeating transmission of the connection request signal including the exchange determination data to unspecified addresses at step S167 comes to be done intermittently, whereby power consumption can be reduced.

Figure 26:
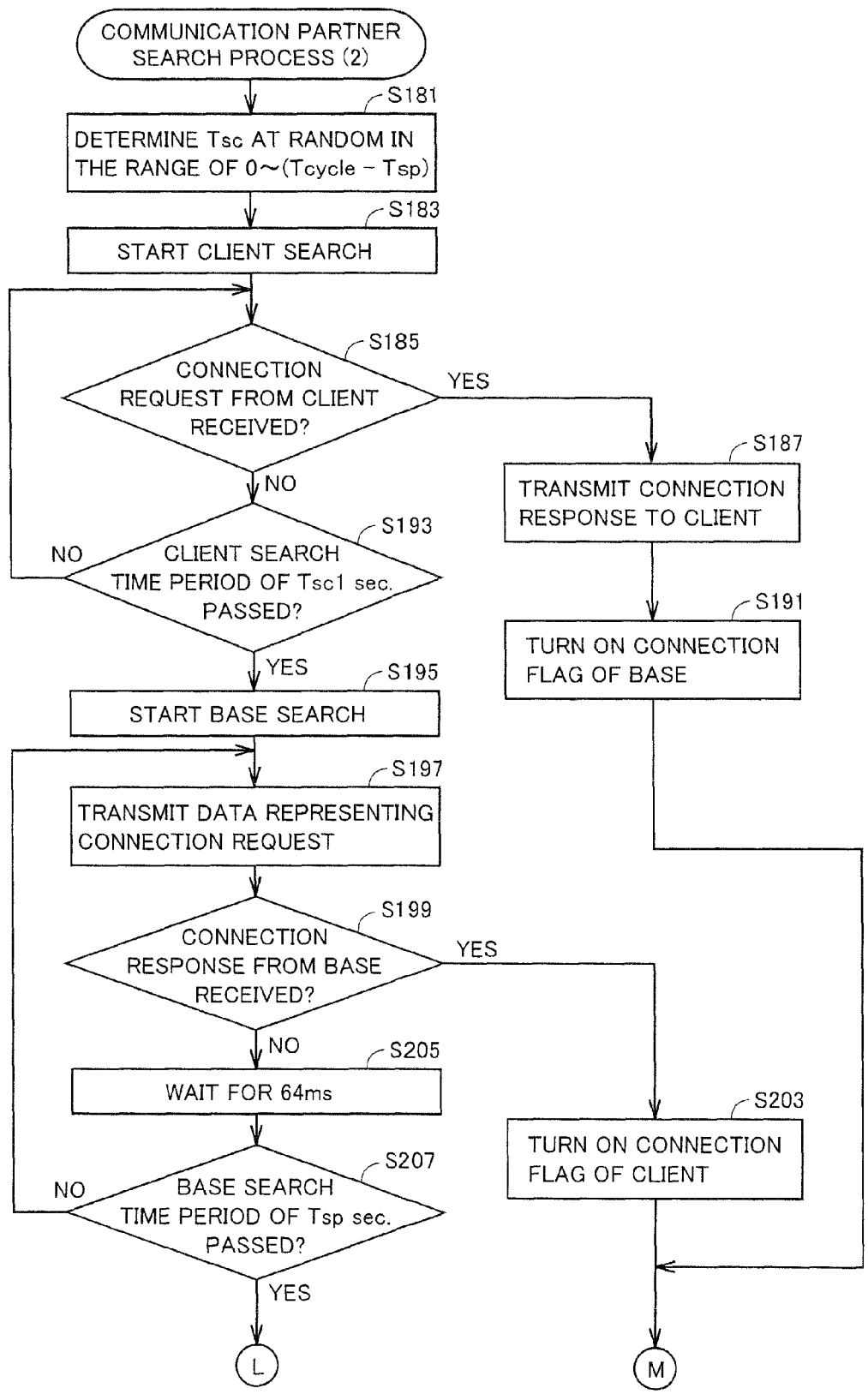
FIG. 26 is a (first) flowchart representing a communication partner search process (2).
Figure 27:
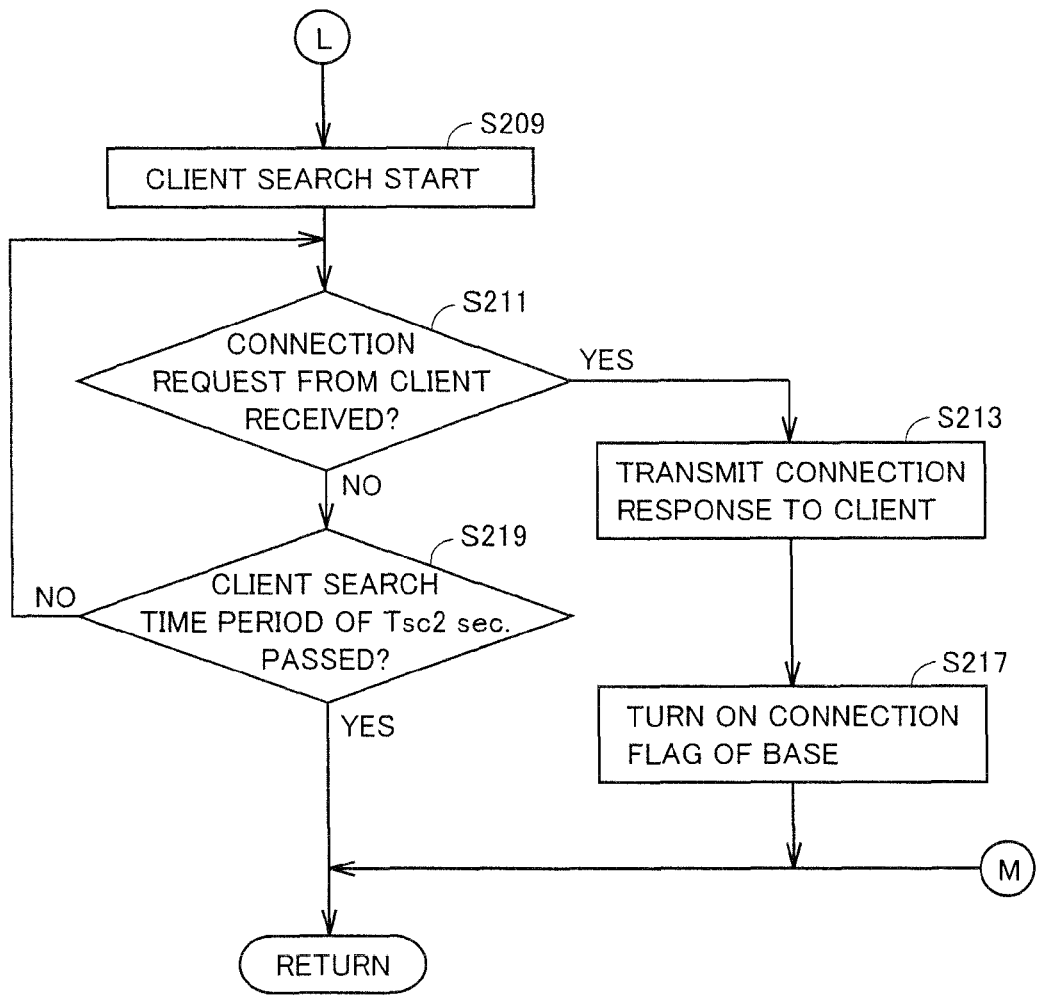
FIG. 27 is a (second) flowchart representing a communication partner search process (2).

FIGS. 26 and 27 are flowcharts representing communication partner search process (2).

Referring to FIG. 26, when communication search process (2) starts, at step S181, Tsc1 is determined at random in a range from 0 to (Tcycle−Tsp). As described above, in communication partner search process (2), Tcycle and Tsp are fixed values and, therefore, when Tsc1 is determined, Tsc2 is also determined.

Following steps S183 to S193 are the process steps executed in Tsc1 mentioned above, in which the game machine operates as a base and searches for a client. Steps S195 to S207 are the process steps executed in Tsp mentioned above, in which the game machine operates as a client and searches for a base. Further, steps S209 to S219 are the process steps executed in Tsc2 mentioned above, in which the game machine operates as a base and searches for a client.

At step S183, searching for a client starts. Though not shown, a timer circuit starts here. Next, at step S185, whether or not the connection request signal including the exchange determination data has been received from a client is determined.

If the connection request signal including the exchange determination data has been received from a client (YES at S185), a connection response signal including the exchange determination signal of a base is transmitted to the client at step S187, and a connection flag as a base is turned on at step S191 and the communication partner search process (2) returns. Specifically, it is made clear that the game machine is capable of communication connection as a base to another game machine.

Though not shown in FIG. 26, as in communication search process (1), when communication partner search process (2) starts, the connection flag as a client and the connection flag as a base are turned off.

If a connection request signal including the exchange determination data is not received from any client (NO at S185), at step S193, whether or not the period of Tsc1 seconds as the client search time period, that is, the period in which the game machine is a base and connection from another game machine is tried, has passed is determined.

If the client search time period of Tsc1 seconds has not been expired at step S193 (NO at S193), the flow directly returns to step S185.

If the client search time period of Tsc1 seconds has passed (YES at step S193), searching for a base starts at step S195, that is, the timer circuit is reset and started, and at step S197, the connection request signal including the exchange determination data is transmitted to unspecified addresses.

Next, at step S199, whether or not the connection response signal is received from a base is determined. If the connection response signal is received from a base (YES at S199), the connection flag as a client is turned on at step S203, and communication partner search process (2) is returned. Specifically, it is made clear that the game machine is capable of communication connection as a client to another game machine.

If the connection response signal including the exchange determination data is not received from a base (NO at step S199), at step S205, the control waits for 64 ms, and at step S207, whether or not the period of Tsp seconds as the base search time period, in which the game machine as a client tries to connect to another game machine has passed, is determined. If the base search time period of Tsp seconds has not yet passed (NO at step S207), the flow directly returns to step S211.

If the base search time period of Tsp seconds has passed (YES at step S207), searching of a client starts at step S209 shown in FIG. 27. At this time, the timer circuit is reset and started.

Next, at step S211, whether or not the connection request signal including the exchange determination signal is received from a client is determined.

If the connection response signal including the exchange determination data is received from a client (YES at step S211), a connection response signal including the exchange determination data is transmitted to the client at step S213, and at step S217, a connection flag as a base is turned on and communication partner search process (2) is returned.

If a connection request signal including the exchange determination data is not received from any client (NO at step S211), at step S219, whether or not the period of Tsc2 seconds as the client search time period has passed is determined.

If the client search time period of Tsc2 seconds has not yet passed (NO at step S219), the flow directly returns to step S211.

If the client search time period of Tsc2 seconds has passed (YES at step S219), it is determined that the period of Tcycle has passed, and communication partner search process (2) is returned.

The giving/receiving of exchange data in accordance with an embodiment of the present invention will be described with reference to FIG. 28.

Figure 28:
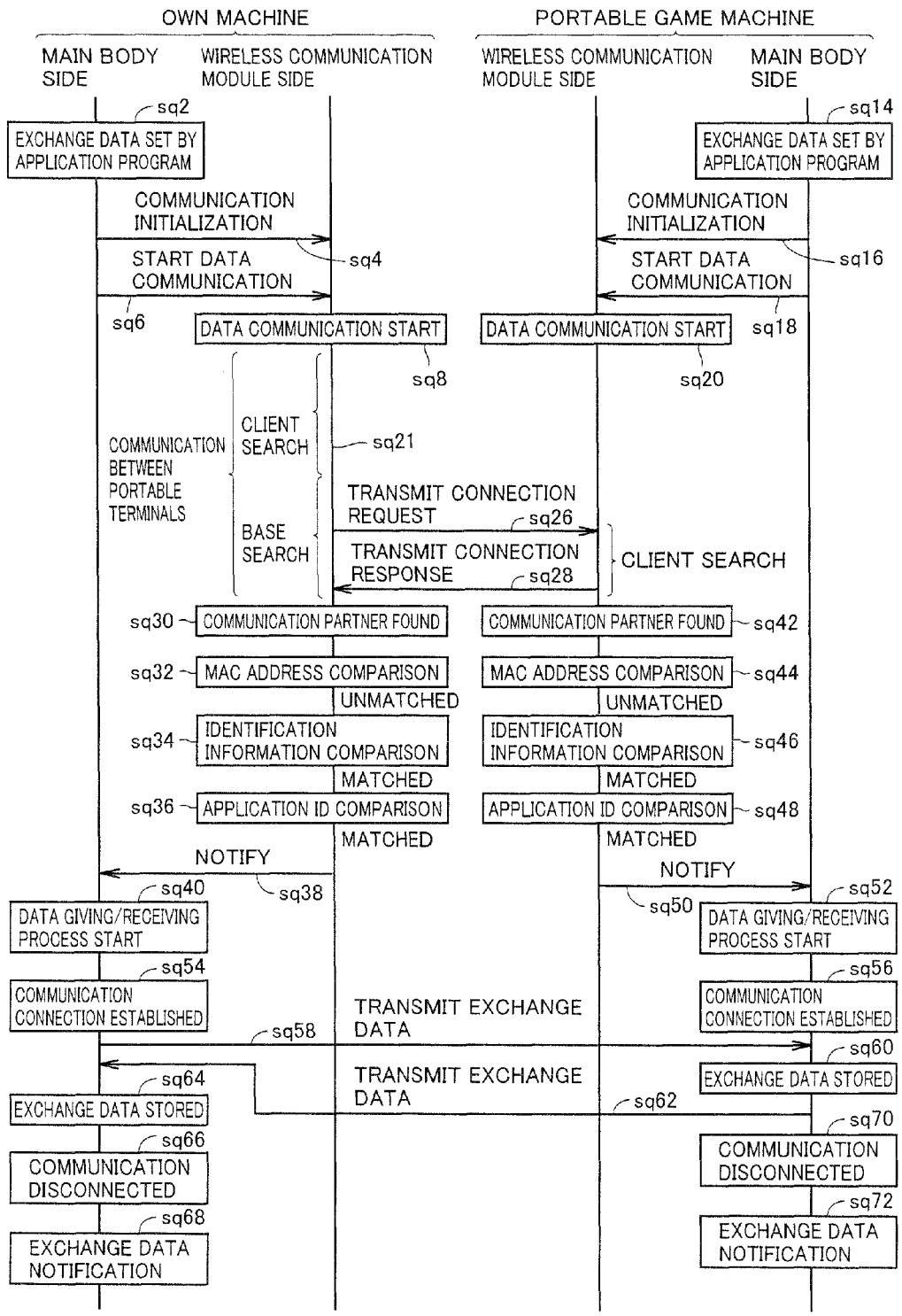
FIG. 28 shows how the data is passed when the exchange data is given/received in accordance with an embodiment of the present invention.

Referring to FIG. 28, in CPU 31 on the main body side, exchange data is set by the execution of an application program (sequence sq2). Then, CPU 31 on the main body side outputs data for communication initialization to wireless communication module 38 (sequence sq4). Specifically, it outputs data related to an application ID list of the exchange data and the MAC address list. The application ID list of the exchange data is stored in application ID saving area 68, and the MAC address list is stored in MAC address list saving area 70.

Then, CPU 31 on the main body side outputs a data communication start instruction to wireless communication module 38 (sequence sq6).

In response to the data communication start instruction, data communication process by wireless communication module 38 starts (sequence sq8). First, in wireless communication module 38, the communication between portable terminals as the exchange partner searching process, for searching for a communication partner to exchange the exchange data, starts.

On the other hand, in game machine 3, the exchange data is set by the execution of an application program, by the CPU on the main body side (sequence sq14). Then, the CPU on the main body side outputs data for communication initialization to wireless communication module 38P (sequence sq16). Specifically, it outputs data related to an application ID list of the exchange data and the MAC address list. The application ID list of the exchange data is stored in application ID saving area 68P, and the MAC address list is stored in MAC address list saving area 70P.

Then, the CPU on the main body side outputs a data communication start instruction to wireless communication module 38P (sequence sq18).

In response to the data communication start instruction, data communication process by wireless communication module 38P starts (sequence sq20). Then, the communication between portable terminals start in the similar manner as described above.

Again, in game machine 1, a client search is executed in the communication between portable terminals, in the manner as described above (sequence sq21). Then, a base search is executed (sequence sq22).

Then, in the base search, if the connection request signal including the exchange determination data is transmitted from wireless communication module 38 of game machine 1 to wireless communication module 38P of game machine 3 (sequence sq26), wireless communication module 38P of game machine 3 receives the exchange determination data from game machine 1 and transmits a connection response signal including the exchange determination data of game machine 3 to wireless communication module 38 of game machine 1 (sequence sp28).

Then, wireless communication module 38 receives the input of connection response signal including the exchange determination data from wireless communication module 38P.

By this process, in game machine 1 as the own machine, the connection flag of a client is turned on. In game machine 3, the connection flag of a base is turned on.

Since the connection flag of a client is turned on, game machine 1 determines that communication connection with the base as a communication partner is possible, that is, a communication partner has been found (sequence sq30). Since the connection flag as a base is turned on, game machine 3 determines that communication connection with the client as a communication partner is possible, that is, a communication partner has been found (sequence sq42).

After the communication partner is found, in game machine 1, the MAC addresses are compared (sequence sq32).

If the addresses do not match, that is, if communication has not been done before with the partner, pieces of identification information are compared (sequence sq34).

If the pieces of identification information match, next, application IDs are compared (sequence sq36).

If it is determined that the application IDs match, wireless communication module 38 notifies the CPU on the main body side that game machine 3 capable of exchanging the exchange data corresponding to the matching application identification information (ID) has been found (sequence sq38).

Consequently, the CPU on the main body side recognizes, by the notification from wireless communication module 38, that an exchange partner capable of communication connection has been found, and the process for giving/receiving data starts (sequence sq40).

On the other hand, through similar processes, on the side of game machine 3, after the communication partner is found (sequence sq42), the MAC addresses are compared (sequence sq44), and if the addresses do not match, that is, if communication has not been done before with the partner, pieces of identification information are compared (sequence sq46), and if the pieces of information match, application IDs are compared (sequence sq48), and if the IDs match, a notice is given to the CPU on the main body side that game machine 1 capable of communication connection has been found (sequence sq50).

Thus, in game machine 3 also, the process for giving/receiving data starts (sequence sq52).

Next, after the start of data giving/receiving process, CPU 31 on the main body side of game machine 1 establishes the communication connection with game machine 3 (sequence sq54).

Similarly, after the start of data giving/receiving process, the CPU on the main body side of game machine 3 establishes the communication connection with game machine 1 (sequence sq56).

Thereafter, game machine 1 transmits the exchange data (sequence sq58).

The exchange data is the copy data obtained by copying the exchange data stored in the slot.

Game machine 3 receives the exchange data transmitted from game machine 1 and stores the exchange data (sequence sq60).

Then, game machine 3 transmits the exchange data (sequence sq62). The exchange data is copy data obtained by copying the exchange data stored in the slot.

Game machine 1 receives the exchange data transmitted from game machine 3, and stores the exchange data (sequence sq64).

Thereafter, the communication is disconnected (sequence sq66).

Then, the exchange data notifying process is executed (sequence sq68).

Similarly, in game machine 3, after the exchange data is stored, the communication is disconnected (sequence sq70). Then, the exchange data notifying process is executed (sequence sq72).

Then, receiving the notification of exchange data, when the user executes the application using the exchange data, the process for erasing the exchange data that has been stored in the slot is executed, and the process for exchanging the exchange data is completed.

In the sequence described above, sequences sq4, sq6, sq16, sq18, sq40, sq52 to sq72 are functions of the main body side of each game machine, realized by a system program stored in system program saving area 86, as described above. Sequences sq8, sq20 to sq38 and sq42 to sq50 are realized by a program read from ROM 72 stored in memory control unit 64 in wireless communication module 38, in each game machine, as described above.

According to the embodiment, by wireless communication, exchange data utilized in a prescribed application can be automatically exchanged with a game machine with which communication connection can be established, even when the application is not being executed. Therefore, chances of negotiating exchange data with acquaintances can be increased.

Further, according to the embodiment, by the wireless communication, no matter whether an application is executed or not in CPU 31 on the main body side, the exchange data utilized in a prescribed application can be automatically exchanged with a game machine with which communication connection can be established, even when the application is not being executed. Therefore, it is unnecessary to have a memory card 26 storing the application attached. Thus, it is highly convenient, and since what will be exchanged is unknown, higher zest can be added.

Further, the partner to exchange is not limited to acquaintances. Therefore, it is highly possible that the exchange data can be exchanged if the user goes to anywhere people gather. Thus, the fun of exchanging increases. The zest of application utilizing the exchange data increases.

Further, only after the communication process is executed between wireless communication modules and exchange is determined to be possible, the notice is given to the CPU on the main body side and the process for giving/receiving exchange data is executed. Thus, the processing load of the CPU can be alleviated, and power consumption can be reduced.

Next, the communication between a portable terminal and a fixed terminal will be described.

Figure 29:
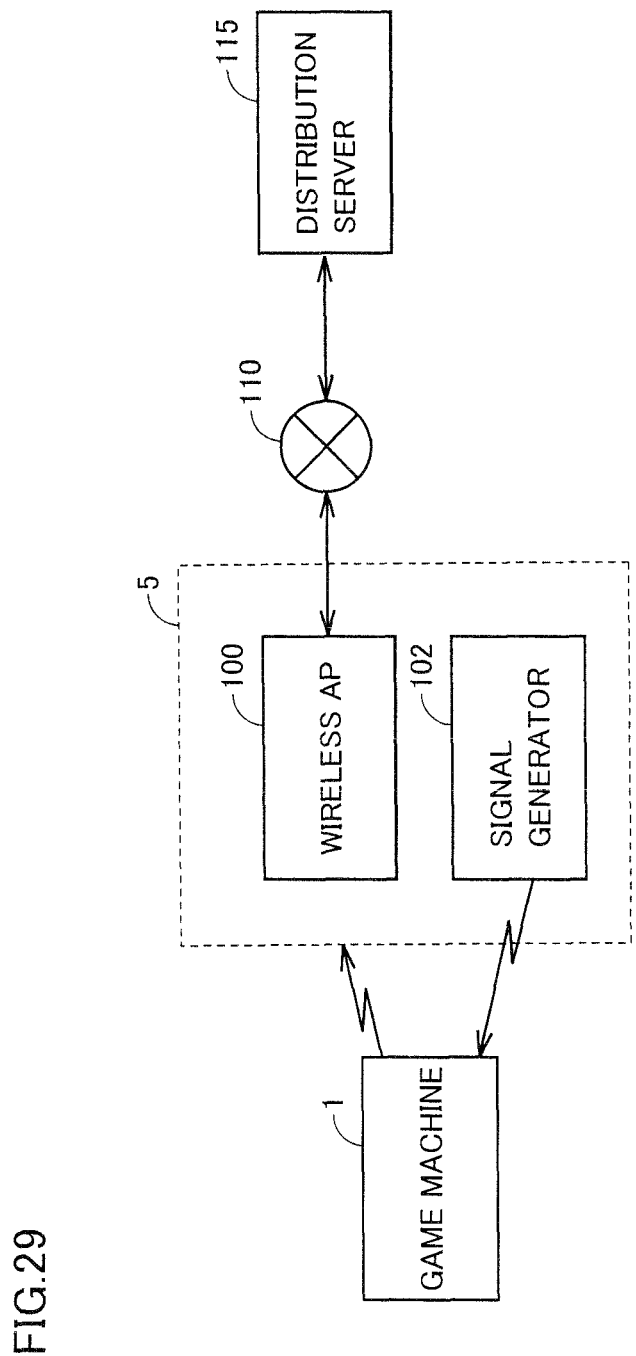
FIG. 29 is a schematic illustration related to a communication process between portable game machine 1 and fixed terminal 5 in accordance with an embodiment of the present invention.

Referring to FIG. 29, the communication process between portable game machine 1 and fixed terminal 5 in accordance with an embodiment of the present invention will be briefly described.

Referring to FIG. 29, fixed terminal 5 includes a wireless access point device 100 and a signal generator 102. Wireless access point device 100 is connected through a network 110 to a distribution server 115. Signal generator 102 transmits a distribution wireless frame including connection information required for connection with wireless access point device 100, to unspecified addresses.

Access point device 100 transmits distribution data obtained from distribution server 115 through network 110, in response to a request for the distribution data from game machine 1.

Figure 30:
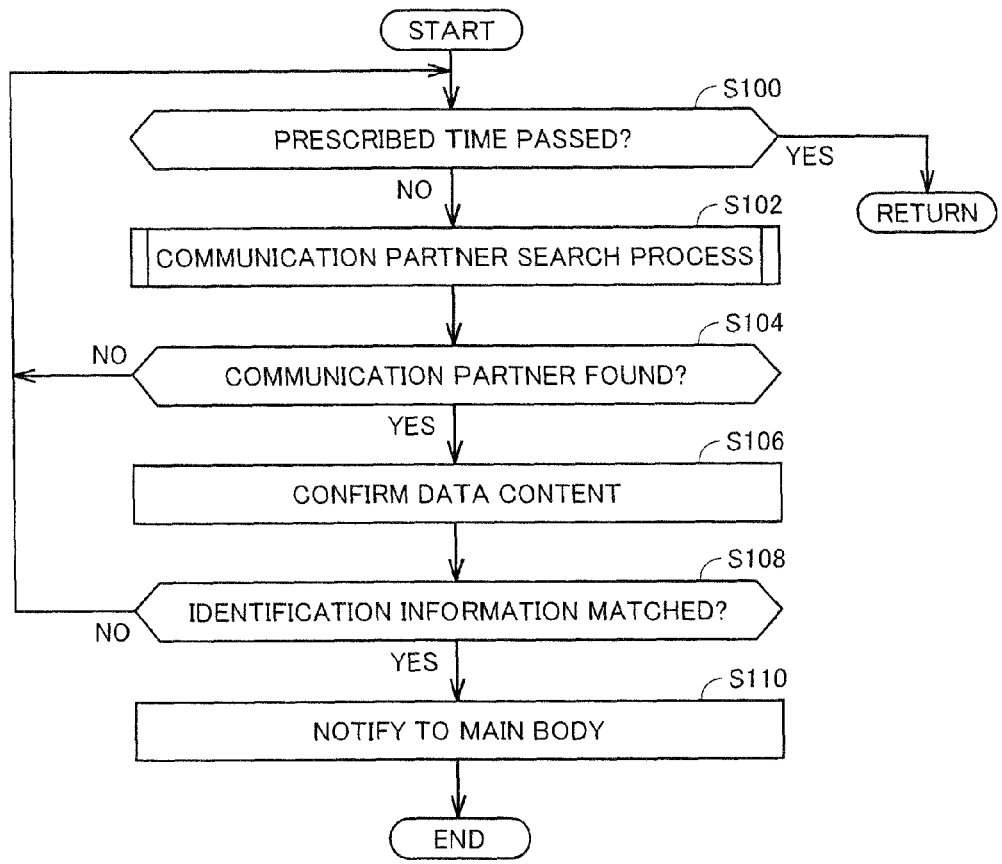
FIG. 30 represents communication between portable and fixed terminals in accordance with an embodiment of the present invention.

Referring to FIG. 30, the communication between a portable terminal and a fixed terminal in accordance with the embodiment of the present invention will be described. The process is a distribution partner searching process by wireless communication module 38 searching for a communication partner that provides the distribution data, which is realized by CPU 60 executing an application for executing the process between portable terminal and fixed terminal, stored in ROM 72.

Referring to FIG. 30, first, CPU 60 determines whether or not a prescribed time period has passed (step S100). If it is determined at step S100 that the prescribed time period has not passed (NO at step S100), CPU 60 executes a communication partner search process of searching for a communication partner (fixed terminal) (step S102). The communication partner search process will be described later.

Next, CPU 60 determines whether or not a communication partner has been found by the communication partner search process (step S104).

If the communication partner is found at step S104 (YES at step S104), CPU 60 confirms data content (step S106).

Figure 31:
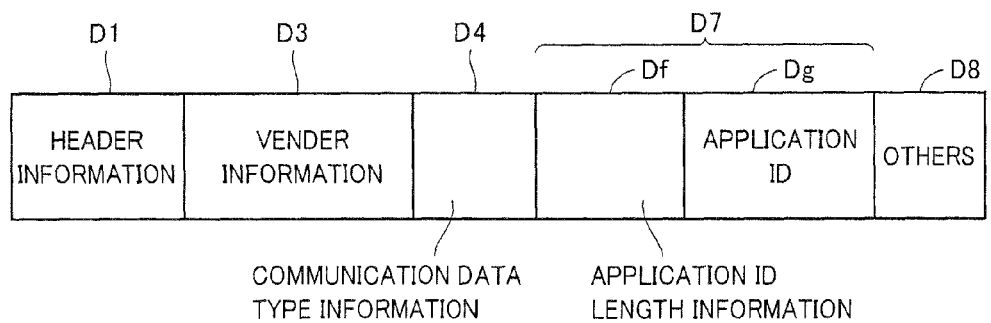
FIG. 31 shows a configuration of a distribution wireless frame received by a game machine, in the communication between portable and fixed terminals in accordance with an embodiment of the present invention.

Referring to FIG. 31, the configuration of distribution frame received by the game machine in the communication between portable and fixed terminals in accordance with the embodiment of the present invention will be described. The data is transmitted as the connection request signal, from signal generator 102 of fixed terminal 5.

Referring to FIG. 31, first, header information D1 is provided at the head. This portion includes the data length, MAC address and the like.

Next, vender information D3 for identifying a company providing the data and the like is provided.

Next, communication data type information D4 indicating the type of communication data included in the received data is provided. In the communication between portable and fixed terminals, the communication data representing the communication between portable and fixed terminals is stored.

Thereafter, application identification information (ID) D7 is provided. Application identification information (ID) D7 includes a piece of information Df indicating the length of application ID data, and application ID data Dg.

Further, "Others" information D8 is provided. As "others" information, data including an identification code used for wireless communication, SSID (Service Set Identifier), and wireless channel (frequency) set for avoiding radio wave interference are stored, as described above.

As will be described later, the distribution wireless frame is transmitted from fixed terminal 5 to unspecified partner (game machine), and received by an unspecified partner (game machine). Fixed terminal 5 as the base side repeatedly executes the transmission to communication partner as the client side without specifying any address.

Though a wireless frame including one IE (Information Element) data (vender information, communication data type information indicating type of communication data, application identification information) has been described as an example of distribution wireless frame here, the frame is not limited to the above. A wireless frame including a plurality of other IE data used for wireless communication may be used. In that case, header information of distribution wireless frame will be added to the plurality of IE data.

Again referring to FIG. 30, next, CPU 60 determines whether or not the pieces of identification information included in the received data match (step S108). Specifically, it determines whether or not the pieces of vender information, indicating a company or the like providing the data described with reference to FIG. 31 match. That the pieces of vender information match means sources of transmitted data are devices of the same type allowing communication connection, and that the pieces of information do not match means sources of transmitted data are devices of totally different types, and connection for communication is impossible.

Further, it determines whether pieces of communication data type information indicating the type of communication data match. That the pieces of communication data type information match means the data are data for communication between portable and fixed terminals. As described above, the communication data type information is different from that included in the data output from game machine 3 in the communication between portable terminals. Therefore, if the data output from game machine 3 happens to be received, the data can be rejected as the communication data type information is different, and thus, communication only with fixed terminal 5 is possible. It is assumed that the vendor information as the object of comparison on the side of game machine 1 is registered in advance in ROM 72. Further, the communication data type information as the object of comparison on the side of game machine 1 is also registered in advance in ROM 72. CPU 60 switches the communication data type information depending on whether the communication is between portable terminals or between a portable terminal and a fixed terminal, and determines whether or not the type matches the communication data type information included in the received data.

Specifically, if it is determined at step S108 that the pieces of identification information do not match (NO at step S108), CPU 60 returns to step S100.

Therefore, with the device not capable of communication connection, communication ends without performing the following process steps.

If it is determined at step S108 that the pieces of identification information match (YES at step S108), CPU 60 notifies the main body side that fixed terminal 5 having distribution data is found (step S110). Then, the process ends (END).

The following data obtaining process of establishing connection with fixed terminal 5 as a communication partner and obtaining the distribution data is executed as an application of CPU 31 on the main body side, using wireless communication module 38.

Therefore, with this notice that fixed terminal having the distribution data is found given to the main body side, data communication executed independently by CPU 60 of wireless communication module 38, that is, the distribution partner searching process of searching for a communication partner to obtain the distribution data carried out by wireless communication module 38, is completed.

Next, the flow of data obtaining process for obtaining the distribution data will be described with reference to FIG. 32.

Figure 32:
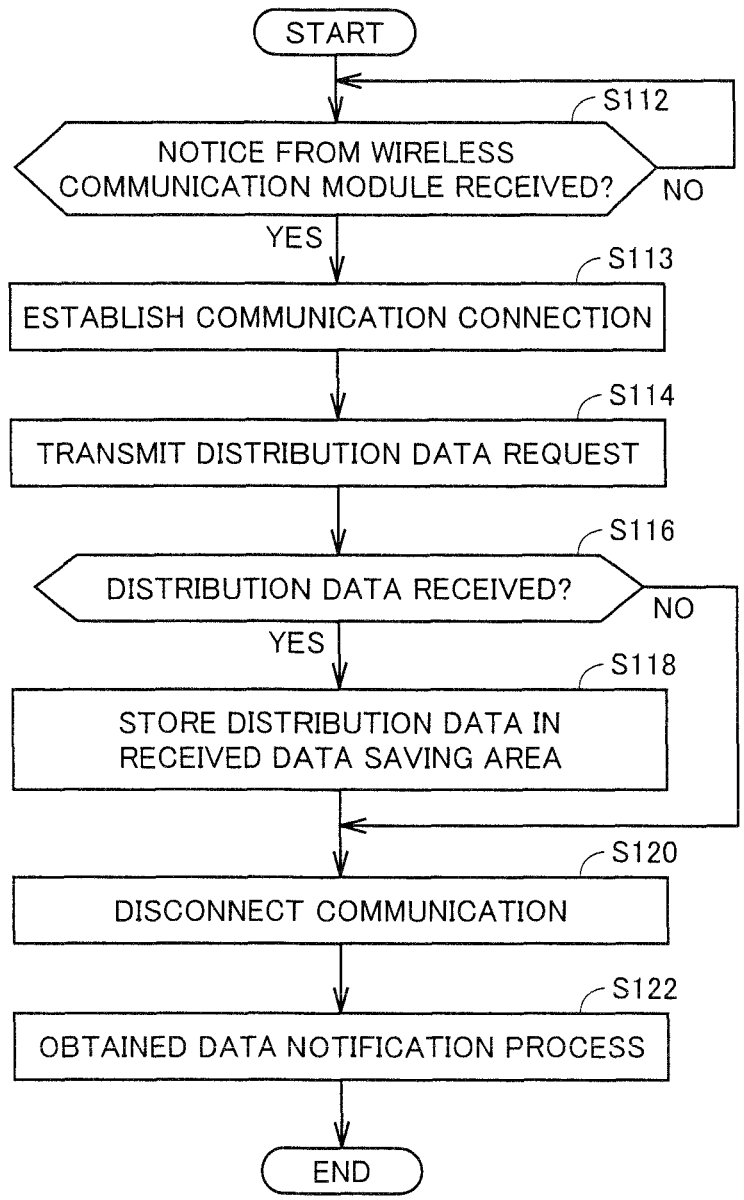
FIG. 32 is a flowchart of a data obtaining process for obtaining distribution data.

Referring to FIG. 32, first, CPU 31 determines whether or not a notice is received from wireless communication module 38 (step S112).

If it is determined at step S112 that the notice is received from wireless communication module 38 (YES at step S112), CPU 31 establishes communication connection with the communication partner based on the connection information of the communication partner included in the notice that a fixed terminal having the distribution data is found, received from communication module 38 (step S113). In this example, communication connection is established with wireless access point device 100 of fixed terminal 5.

Next, CPU 31 requests transmission of distribution data (step S114).

Next, CPU 31 determines whether or not the distribution data is received (step S116).

If it is determined at step S116 that the distribution data is received (YES at step S116), CPU 31 stores the distribution data in received data saving area 82 (step S118).

Then, CPU 31 disconnects communication with the communication partner (fixed terminal 5) (step S120).

Then, CPU 31 executes the obtained data notifying process (step S122). Then, the process ends (END). The obtained data notifying process is similar to that described with reference to FIG. 22, and when distribution data is obtained, it is notified to the user by giving a sound or displaying the content.

Figure 33:
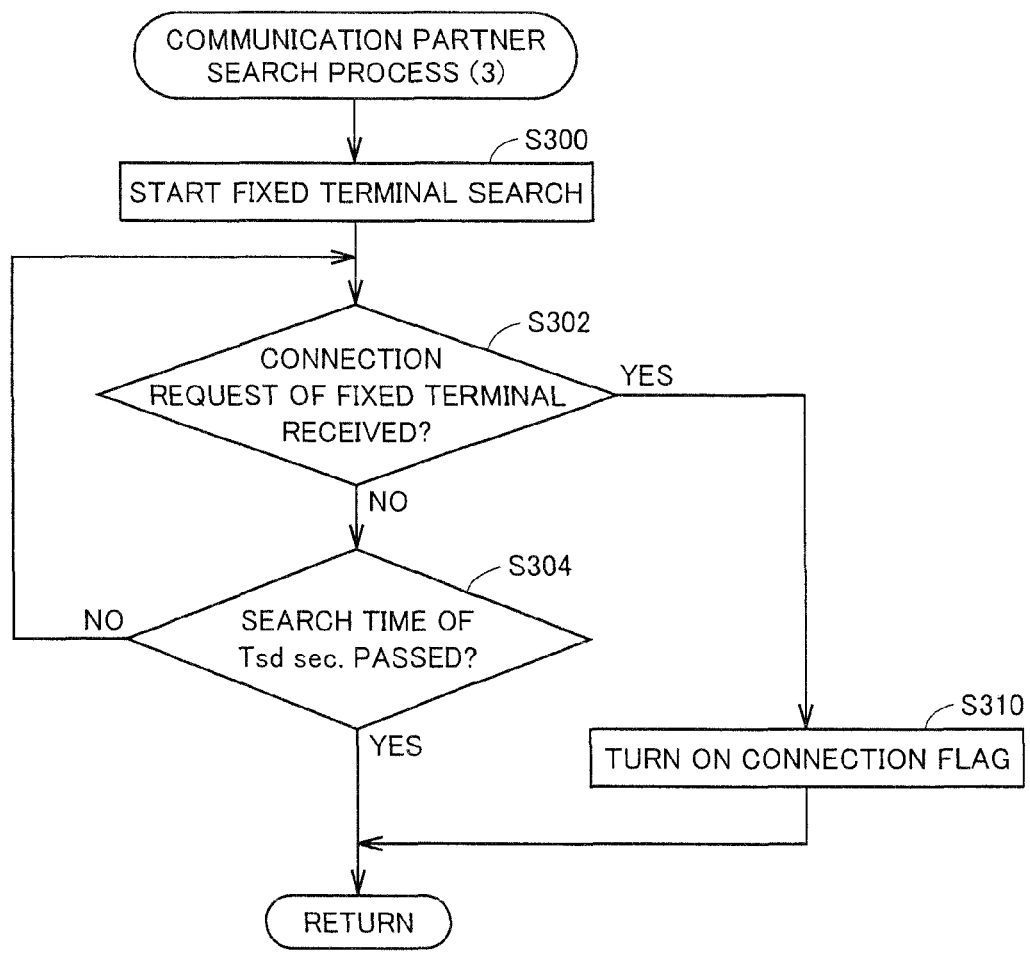
FIG. 33 is a flowchart representing a communication partner search process (3).

Referring to FIG. 33, a flowchart representing the communication partner search process (3) will be described.

In this process, game machine 1 as a client executes data communication with fixed terminal 5 as a base, and game machine 1 waits until a connection request signal is received from fixed terminal 5 as a base. In the communication partner search process, game machine 1 always operates as a client, and executes a process of searching for a base. Here, an example in which the connection request signal is transmitted only from fixed terminal 5 and game machine 1 waits for reception of the signal, is described. The reason for this is that, since fixed terminal 5 is an attached device, data communication can be executed with higher efficiency if the connection request signal is transmitted only from fixed terminal 5, than when the connection request signal is output from a portable game machine.

Referring to FIG. 33, when communication partner search process (3) starts, at step S300, fixed terminal searching starts. Though not shown, the timer circuit is started at this time.

At step S302, whether or not the connection request signal is received from fixed terminal 5 as a base is determined.

If the connection request signal is received from fixed terminal 5 (YES at step S302), a connection flag is turned on at step S310, and communication partner search process (3) is returned. Specifically, it is made clear that a client is capable of communication connection with fixed terminal 5 as the base.

Though not shown in FIG. 33, when communication partner search process (3) starts, the connection flag is turned off (reset).

If the connection request signal from the base is not at all received (NO at step S302), it is determined at step S304 whether or not the time period of Tsd seconds in which the client tries to connect to fixed terminal 5 has passed.

If the base search time period of Tsd seconds has not yet passed at step S304 (NO at step S304), the flow directly returns to step S302.

If the base search time period of Tsd seconds passed (YES at step S304), communication partner search process (3) is returned.

Figure 34:
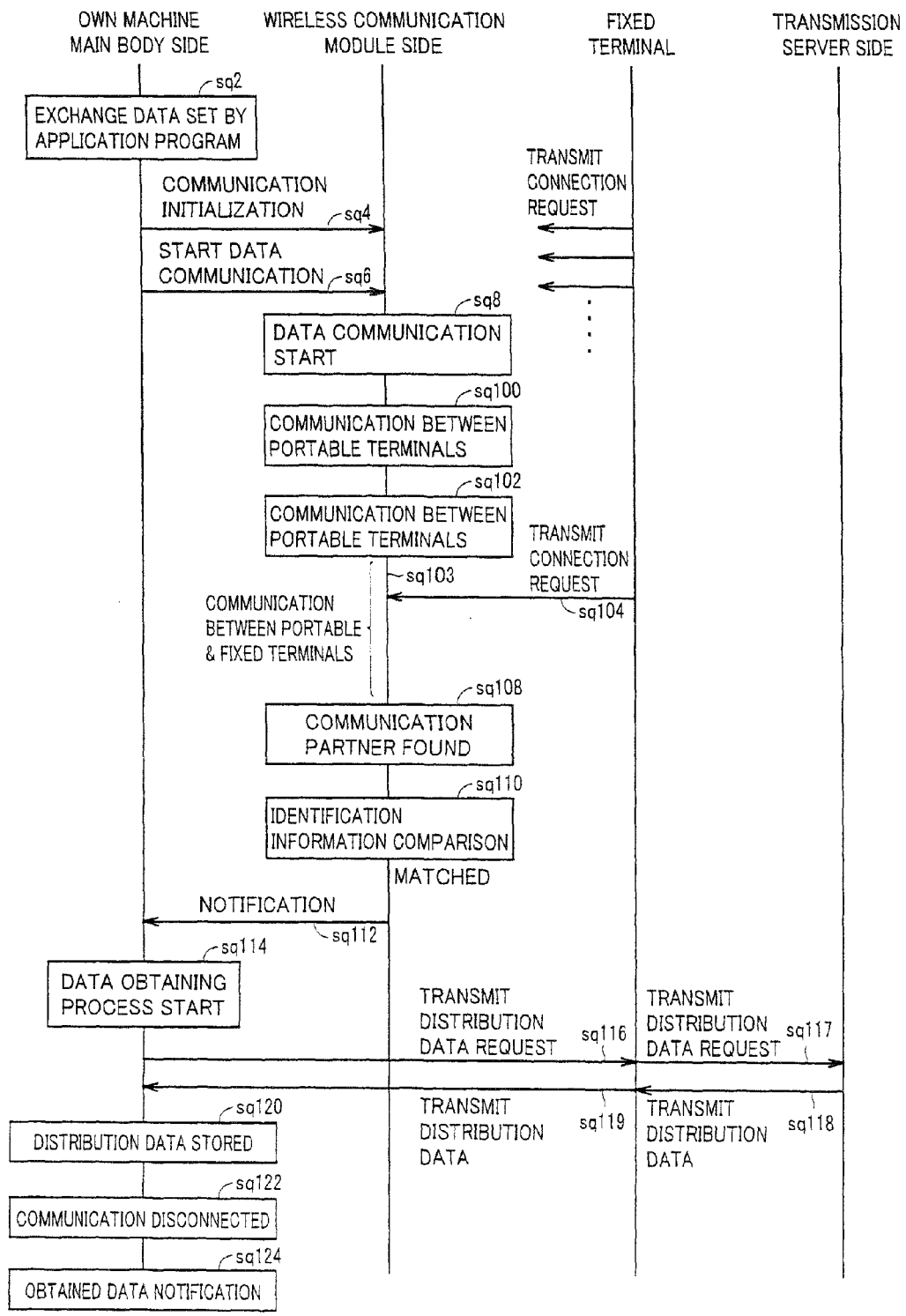
FIG. 34 shows how the data is passed when the distribution data is obtained, in accordance with an embodiment of the present invention.

Referring to FIG. 34, giving/receiving of distribution data in accordance with the embodiment of the present invention will be described.

Referring to FIG. 34, sequences sq2 to sq8 are the same as described with reference to FIG. 28, and by CPU 31 on the main body side, exchange data is set by the execution of application program (sequence sq2). Then, CPU 31 on the main body side outputs data for communication initialization to wireless communication module 38 (sequence sq4). Then, CPU 31 on the main body side outputs a data communication start instruction to wireless communication module 38 (sequence sq6).

In response to the data communication start instruction, data communication process by wireless communication module 38 starts (sequence sq8).

It is assumed that first, the communication between portable terminals searching for a communication partner to exchange data is started by wireless communication module 38 (sequence sq100), and the communication partner could not be found in a prescribed time period.

Assume that the communication between portable terminals starts thereafter (sequence sq102), and the communication partner could not be found in the prescribed time period, either.

Then, the communication between portable and fixed terminals starts (sequence sq103).

As described above, fixed terminal 5 repeatedly outputs (transmits) the connection request signal from signal generator 102.

Wireless communication module 38 of game machine 1 receives an input of connection request signal transmitted from fixed terminal 5 (sequence sq104).

Thus, the connection flag of game machine 1 as the own machine is turned on.

As the connection flag is turned on, wireless communication module 38 of game machine 1 determines that communication connection with the fixed terminal becomes possible, that is, a communication partner has been found (sequence sq108).

Then, wireless communication module 38 of game machine 1 compares pieces of identification information (sequence sq110).

If it is determined that the pieces of identification information match, wireless communication module 38 notifies the CPU on the main body side that fixed terminal 5 from which the distribution data can be provided, is found (sequence sq112).

Thus, by the notice from wireless communication module 38, the CPU on the main body side recognizes that communication connection with fixed terminal 5 that distributes distribution data is possible, and starts the data obtaining process (sequence sq114).

After the start of data obtaining process, CPU 31 on the main body side of game machine 1 transmits a distribution data request (sequence sq116).

Access point device 100 of fixed terminal 5 receives the distribution data request from game machine 1, and transmits the distribution data request to distribution server 115 through network 110 (sequence sq117).

Then, in accordance with the distribution data request from wireless access point device 100, distribution server 115 transmits the distribution data (sequence sq118).

After receiving the distribution data from distribution server 115 through network 110, wireless access point device 100 transmits the distribution data to game machine 1 (sequence sq119).

Then, game machine 1 receives the distribution data transmitted from wireless access point device 100 of fixed terminal 5, and stores the received distribution data (sequence sq120).

Then, the communication is disconnected (sequence sq122).

Then, the obtained data is notified (sequence sq124).

According to the embodiment, by wireless communication, it is possible to automatically obtain distribution data from fixed terminal 5 with which communication connection can be established.

By way of example, if the distribution data represents a coupon that can be used at a store, if one simply holds game machine 1, he/she can obtain the distribution data representing the coupon by wireless communication with fixed terminal 5, and this adds zest of obtaining the distribution data.

Further, by way of example, the obtained distribution data representing a coupon may be stored as exchange data, in the slot of exchange data saving area 80 described above. For example, the distribution data may include an application to have the data stored as exchange data in the exchange data saving area. By this process, it becomes possible to provide the distribution data to others as the exchange data, by the communication between portable terminals.

Specifically, even the distribution data that can be obtained only from fixed terminal 5 may be provided to other users through the communication between portable terminals, and this adds zest to the distribution data.

In fixed terminal 5 shown in FIG. 29, wireless access point device 100 and signal generator 102 are shown as separate components. These may be provided as one device. Specifically, wireless access point device 100 may include the function of signal generator 102 and it may output the connection request signal.

On the other hand, as in the configuration shown in FIG. 29, signal generator 102 may be provided as a device dedicated for transmitting the connection request signal, to alleviate the processing load on wireless access device 100, to enable efficient data communication of distribution data with a plurality of game machines.

Further, as signal generator 102, a game machine communicating with fixed terminal 5 may be used as a dedicated signal generator transmitting only the connection request signal. Since it has the same information including vender information as the game machine as a communication partner, the signal generator can be realized in a simple manner.

Figure 35:
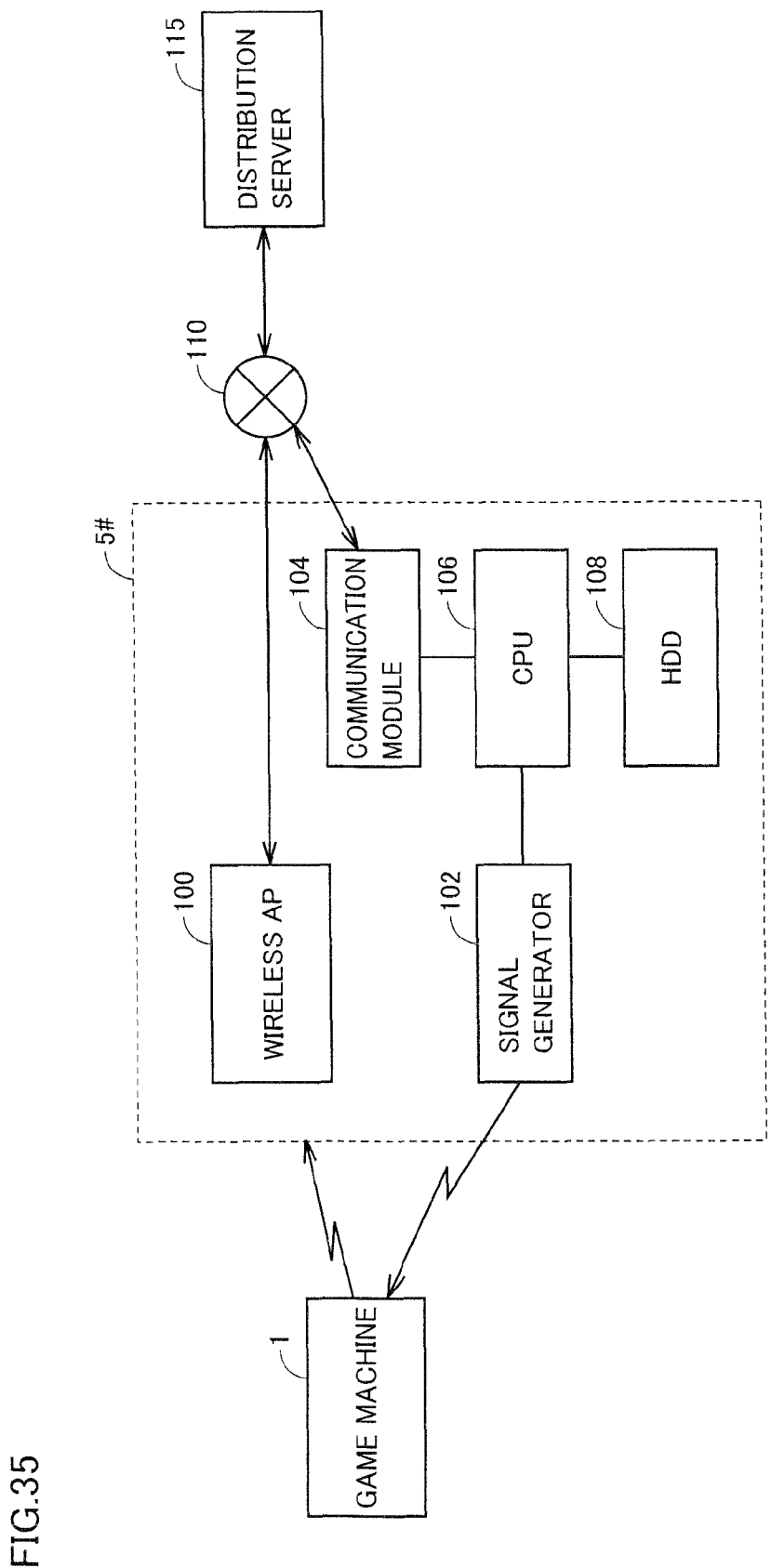
FIG. 35 is a schematic illustration related to a communication process between portable game machine 1 and a fixed terminal 5# in accordance with an embodiment of the present invention.

Referring to FIG. 35, communication process between portable game machine 1 and a fixed terminal 5# in accordance with an embodiment of the present invention will be briefly described.

Referring to FIG. 35, fixed terminal 5# is different from fixed terminal 5 shown in FIG. 29 in that it additionally includes a communication module 104, a CPU 106 and an HDD 108. Other configurations are the same as those described with reference to FIG. 29 and, therefore, detailed description thereof will not be repeated.

It is assumed that communication module 104 is connected to network 110. Further, it is assumed that CPU 106 is connected to communication module 104, HDD (Hard Disk Drive) 108 and signal generator 102, and controls these components. Here, as an example, it is assumed that CPU 106 can output the distribution data stored in HDD 108 to other device, through network 110 connected to communication module 104.

By such a configuration, it is possible for wireless access point device 100 to obtain the distribution data from distribution server 115 through the same process as described above. Further, it is also possible to connect to communication module 104 connected through network 110, to obtain the distribution data stored in HDD 108 and to transmit the data from wireless access point 100 to a game machine.

By way of example, assume that fixed terminal 5# is installed in each of a plurality of stores. If each store customizes the distribution data stored in HDD 108, it becomes possible to transmit the customized distribution data to a game machine, and this adds the zest of obtaining distribution data by a game machine.

Other Embodiment

Though game machine 1 has been described as a typical example of the information processing apparatus in accordance with the present invention, it is not limiting. As a program in accordance with the present invention, an application executable by a personal computer may be provided. In that case, the program in accordance with the present invention may be incorporated as a function of various applications executed by a personal computer.

Though only an information processing system using a portable game machine has been described in the embodiment above, the present invention is similarly applicable to a portable terminal such as a portable telephone and a PDA, in place of the portable game machine.

Although the present invention has been described and illustrated in detail, it is clearly understood that the same is by way of illustration and example only and is not to be taken by way of limitation, the scope of the present invention being interpreted by the terms of the appended claims.

We claim:

1. A system including at least first and second portable information processing apparatus each having corresponding apparatus identifier information associated therewith and each configured to selectively execute one or more applications, the first portable information processing apparatus comprising:
a first processing system;
a first memory storing first data associated with a first application executed by the first processing system, the first data being usable by a second application executed by the second portable information processing apparatus; and
a first wireless communication module operable in parallel with the first processing system and comprising a second processing system configured to execute a communication process for determining when communication with the second portable information processing apparatus is possible and for sending the first data to the second portable information processing apparatus and/or receiving second data from the second portable information processing apparatus when communication is possible,
wherein the first memory further stores apparatus identifier information associated with one or more other portable information processing apparatus with which the first portable information processing apparatus has previously established communication, and
the second portable information processing apparatus comprising:
a third processing system;
a second memory storing the second data, which is associated with the second application, the second data being usable by the first application; and
a second wireless communication module operable in parallel with the third processing system and comprising a fourth processing system configured to execute a communication process for determining when communication with the first portable information processing apparatus is possible and for sending the second data to the first portable information processing apparatus and/or receiving the first data from the first portable information processing apparatus when communication is possible,
wherein the second memory further stores apparatus identifier information associated with one or more other portable information processing apparatus with which the second portable information processing apparatus has previously established communication,
wherein the second processing system executes the communication process of the first portable information processing apparatus regardless of an execution state of the first application so that the first data can be sent to the second portable information processing apparatus and/or the second data can be received from the second portable information processing apparatus even when the first application is not executed by the first processing system, and wherein the communication process of the first portable information processing apparatus does not send the first data to the second portable information processing apparatus if apparatus identifier information associated with the second portable information processing apparatus is stored in the first memory, and
wherein the third processing system executes the communication process of the second portable information processing apparatus regardless of an execution state of the second application so that the second data can be sent to the first portable information processing apparatus and/or the first data can be received from the first portable information processing apparatus even when the second application is not executed by the third processing system, and wherein the communication process of the second portable information processing apparatus does not send the second data to the first portable information processing apparatus if apparatus identifier information associated with the first portable information processing apparatus is stored in the second memory.

2. The system according to claim 1, wherein the first portable information processing apparatus stores the second data in the first memory thereof and the second portable information processing apparatus stores the first data in the second memory thereof.

3. The system according to claim 1, wherein the first processing system determines, at a time of execution of the first application, whether the second data has been received and, if so, uses the second data during the execution of the first application.

4. The system according to claim 3, wherein:
the first application includes a process for determining, at the time of execution of the first application, whether the second data has been received and, if so, for using the second data during the execution of the first application.

5. The system according to claim 1, wherein the first portable information processing apparatus sends the first data and receives the second data based on a comparison between attribute information for the first data and attribute information for the second data.

6. The system according to claim 1, wherein
application identification information is associated with the first data and the second data,
the sending of the first data and the receiving of the second data by the first portable information processing apparatus is based on a comparison between the application identification information associated with the first and second data.

7. The system according to claim 6, wherein the comparison is based on one of a plurality of pre-set comparing methods.

8. The system according to claim 1, further comprising:
a data distribution terminal, wherein
the first portable information processing apparatus receives from the distribution terminal distribution data for an application, regardless of the execution state on the first portable information processing apparatus of the application with which the distribution data is associated.

9. The system according to claim 1, wherein
when the second data is received by the first portable information processing apparatus, the first data is erased from the first memory.

10. A portable information processing apparatus configured to selectively execute one or more applications, comprising:
a first processing system;
a memory storing first data associated with an application executed by the first processing system, the first data being usable by an application executed by at least one other portable information processing apparatus, each of the at least one other portable information processing apparatus having apparatus identifier information associated therewith; and
a wireless communication module operable in parallel with the first processing system and comprising a second processing system configured to execute a communication process for determining when communication with any of the at least one other portable information apparatus is possible and for sending the first data to one or more of the portable information apparatus with which communication is possible,
wherein the memory further stores apparatus identifier information associated with any of the at least one other portable information processing apparatus with which the portable information apparatus has previously established communication,
wherein the second processing system executes the communication process regardless of an execution state of the application so that the first data can be sent to the one or more of the portable information apparatus with which communication is possible even when the application is not executed by the first processing system, and
wherein the communication process does not send the first data to any portable information processing apparatus whose associated apparatus identification information is stored in the memory.

11. The portable information processing apparatus according to claim 10, wherein:
the application with which the first data is associated includes a process for storing the first data in the memory.

12. The portable information processing apparatus according to claim 10, wherein the first data is stored in the memory in a manner that allows identification of the application with which the first data is associated.

13. The portable information processing apparatus according to claim 12, wherein:
the application with which the first data is associated includes a process for storing the first data in the memory in a manner that allows identification of the application.

14. The portable information processing apparatus according to claim 10, wherein:
the first processing system is configured to execute multiple different applications,
each of the applications including a process for storing data associated therewith in the memory.

15. The portable information processing apparatus according to claim 10, wherein the memory stores a plurality of applications and respective memory areas of the memory are allocated to the applications.

16. The portable information processing apparatus according to claim 15, further comprising:
the first processing system is configured to execute the applications, the application with which the first data is associated including a process for storing the first data in the memory.

17. The portable information processing apparatus according to claim 10, wherein
the memory stores data associated with a plurality of different applications; and
the data associated with each of the applications is sent to the one or more of the portable information processing apparatus with which communication is possible.

18. The portable information processing apparatus according to claim 10, wherein the communication process repeatedly searches for any of the at least one other portable information processing apparatus and, when communication is possible with a portable information processing apparatus found by the search, communicates based on a matching of attribute information of the first data and attribute information of the second data.

19. The portable information processing apparatus according to claim 10, wherein the apparatus identification information stored in the memory is erased when one or more conditions are satisfied.

20. The portable information processing apparatus according to claim 19, wherein the apparatus identification information stored in the memory is erased after a specified time period.

21. The portable information processing apparatus according to claim 10, wherein
the application with which the first data is associated is stored in a storage device configured for selective attachment to the portable information processing apparatus, and
the communication process executes regardless of whether the storage device is attached to the portable information processing apparatus so that the first data is sent to the one or more of the portable information apparatus with which communication is possible even when the storage medium is detached from the information processing apparatus.

22. The portable information processing apparatus according to claim 10, wherein:
the application with which the first data is associated includes a process for erasing the first data stored in the memory.

23. The portable information processing apparatus according to claim 10, embodied as part of a telephone.

24. A portable information processing apparatus configured to selectively execute an application stored in a storage medium configured for detachable connection to the information processing apparatus, the portable information processing apparatus comprising:
a first processing system;
a memory storing first data associated with the application, the first data being usable by an application executed by at least one other portable information processing apparatus, each of the at least one other portable information apparatus having apparatus identifier information associated therewith; and
a wireless communication module operable in parallel with the first processing system and comprising a second processing system configured to execute a communication process for determining when communication with any of the at least one other portable information apparatus is possible and for sending the first data to one or more of the portable information apparatus with which communication is possible,
wherein the memory further stores apparatus identifier information associated with any of the at least one other portable information processing apparatus with which the portable information processing apparatus has previously established communication,
wherein the second processing system executes the communication process regardless of whether the storage medium is attached to the information processing apparatus so that the first data can be sent to the one or more of the portable information apparatus with which communication is possible even when the storage medium is detached from the information processing apparatus, and the communication process does not send the first data to any information processing apparatus whose associated apparatus identification information is stored in the memory.

25. A communication method for a portable information processing apparatus configured to selectively execute one or more applications, the method comprising:
storing, in a memory of the portable information processing apparatus, first data associated with an application program executed by a first processing system of the portable information processing apparatus, the first data being usable by an application executed by at least one other portable information processing apparatus, each of the at least one other portable information processing apparatus having apparatus identifier information associated therewith;
executing, by a second processing system of the portable information processing apparatus, a communication process for determining when communication with any of the at least one other portable information apparatus is possible;
sending the first data to one or more of the portable information apparatus with which communication is possible;
storing, in the memory, apparatus identifier information associated with any of the at least one other portable information processing apparatus with which the portable information processing apparatus has previously established communication,
wherein the communication process executes regardless of an execution state of the application on the portable information processing apparatus so that the first data can be sent to the one or more of the portable information apparatus with which communication is possible even when the application is not executed, and wherein the communication process does not send the first data to any information processing apparatus whose associated apparatus identification information is stored in the memory.

26. A portable information processing apparatus configured to selectively execute one or more applications, comprising:
a first processing system;
a first memory storing first data associated with an application executed by the first processing system, the first data being usable by an application executed by at least one other portable information processing apparatus, each of the at least one other portable information processing apparatus having apparatus identifier information associated therewith; and
a wireless communication module operable in parallel with the first processing system, the wireless communication module comprising a second memory for storing an application identifier for the executed application and a second processing system configured to execute a communication process for determining when communication with any of the at least one other portable information apparatus is possible and for sending the first data to one or more of the portable information apparatus with which communication is possible,
wherein the memory stores apparatus identifier information associated with any of the at least one other portable information processing apparatus with which the portable information processing apparatus has previously established communication,
wherein the communication process comprises a comparison involving the application identifier for determining the one or more of the portable information apparatus to which the first data is sent,
wherein the second processing system executes the communication process regardless of an execution state of the application so that the first data can be sent to the one or more of the portable information apparatus even when the application is not executed by the first processing system, and wherein the communication process does not send the first data to any information processing apparatus whose associated apparatus identification information is stored in the memory.

\* \* \* \* \*